United States Patent
Khaligh et al.

(10) Patent No.: US 10,103,644 B2
(45) Date of Patent: Oct. 16, 2018

(54) BRIDGELESS RESONANT AC-DC CONVERTERS AND SYSTEMS AND CONTROL SYSTEMS THEREFOR

(71) Applicant: University of Maryland, College Park, MD (US)

(72) Inventors: Alireza Khaligh, Arlington, VA (US); Yichao Tang, Sunnyvale, CA (US)

(73) Assignee: University of Maryland, College Park, College Park, MD (US)

( * ) Notice: Subject to any disclaimer, the term of this patent is extended or adjusted under 35 U.S.C. 154(b) by 304 days.

(21) Appl. No.: 14/872,768

(22) Filed: Oct. 1, 2015

(65) Prior Publication Data

US 2016/0099660 A1 Apr. 7, 2016

Related U.S. Application Data

(60) Provisional application No. 62/058,203, filed on Oct. 1, 2014, provisional application No. 62/235,055, filed on Sep. 30, 2015.

(51) Int. Cl.
*H02M 7/68* (2006.01)
*H02M 7/217* (2006.01)
*H02M 1/42* (2007.01)

(52) U.S. Cl.
CPC ......... *H02M 7/217* (2013.01); *H02M 1/4241* (2013.01); *Y02B 70/126* (2013.01); *Y02B 70/1441* (2013.01)

(58) Field of Classification Search
CPC ..... H02M 3/33569; H02M 2007/4815; H02M 2007/4818; H02M 1/083; H02M 3/33507;
(Continued)

(56) References Cited

U.S. PATENT DOCUMENTS 9,515,562 B2 * 12/2016 Dai ................... H02M 3/3353
2006/0262576 A1 * 11/2006 Przybyla .............. H02M 7/219
363/21.02

OTHER PUBLICATIONS

Khaligh et al., "Kinetic energy harvesting using piezoelectric and electromagnetic technologies—State of the art" IEEE Trans. Ind. Electron., vol. 57, No. 3, pp. 850-860, Mar. 2010.
(Continued)

*Primary Examiner* — Adolf Berhane
*Assistant Examiner* — Afework Demisse
(74) *Attorney, Agent, or Firm* — Carter, DeLuca, Farrell & Schmidt, LLP; George Likourezos

(57) ABSTRACT

An AC-to-DC converter includes a multi-resonant switching circuit including an AC-AC stage soft-switched LC network that converts a low-frequency low-amplitude alternating input voltage into a higher-frequency higher-amplitude alternating voltage and an AC-DC stage rectifying the higher-frequency higher-amplitude alternating voltage into a DC output voltage via a soft-switched diode. An AC-to-DC converter system includes at least two multi-resonant switching circuits that include at least two AC-AC stages and an AC-DC stage. A control system for the AC-to-DC converter includes at least two resonant gate drivers that each includes: one MOSFET gate configured to transmit a gate voltage signal to an AC-to-DC converter; an on/off logic module electrically coupled to the MOSFET gate; a resonant tank LC circuit electrically coupled to the on/off logic module; and a voltage bias module electrically coupled to the resonant tank LC circuit.

25 Claims, 33 Drawing Sheets

MODE (I)

(58) Field of Classification Search
CPC ............. H02M 1/4208; H02M 1/4225; H02M 3/33592; H02M 7/217
See application file for complete search history.

(56) References Cited

OTHER PUBLICATIONS

Szarka et al., "Review of power conditioning for kinetic energy harvesting systems" IEEE Trans. Power Electron., vol. 27, No. 2, pp. 803-815, Feb. 2012.
Ottman et al., "Adaptive piezoelectric energy harvesting circuit for wireless remote power supply" IEEE Trans. Power Electron., vol. 17, No. 5, pp. 669-676, Sep. 2002.
Stark et al., "Converter circuit design, semiconductor device selection and analysis of parasitics for micro-power electrostatic generators", IEEE Trans. Power Electron., vol. 21, No. 1, pp. 27-37, Jan. 2006.
Karpelson et al., "Design and fabrication of ultralight high-voltage power circuits for flapping-wing robotic insects" Proc. IEEE Appl. Power Electron. Conf., pp. 2070-2077, Mar. 2011.
Wang et al., "A bridgeless boost rectifier for low voltage energy harvesting applications" IEEE Trans. Power Electron., vol. 28, No. 11, pp. 5206-5214, Jan. 2013.
Dwari et al., "An efficient ac-dc step-up converter for low-voltage energy harvesting" IEEE Trans. Power Electron., vol. 25, No. 8, pp. 2188-2199, Aug. 2010.
Fardoun et al., "New efficient bridgeless Cuk rectifiers for PFC applications" IEEE Trans. Power Electron., vol. 27, No. 7, pp. 3292-3301, Jul. 2012.
Tang et al., "Miniaturized Bridgeless High-Frequency Resonant AC-DC Step-Up/Step-Down Converters", IEEE Transactions on Power Electronics, vol. 29, No. 12, pp. 6518-6533 (Dec. 2014).
Lee, "High-frequency quasi-resonant converter technologies" Proc. IEEE Conf., vol. 76, No. 4, pp. 377-390, Apr. 1988.
Tabisz et al., "Zero-voltage-switching multiresonant technique—A novel approach to improve performance of high-frequency quasiresonant converters", IEEE Trans. Power Electron., vol. 4, No. 4, pp. 450-458, Oct. 1989.
Tabisz et al., "Principles of quasi- and multi-resonant power conversion techniques" Proc. IEEE Intel. Sym. Circuits Syst., vol. 2, pp. 1053-1056, Jun. 1991.
Sebastian et al., "Voltage-follower control in zero-current-switched quasi-resonant power factor preregulators" IEEE Trans. Power Electron., vol. 13, No. 4, pp. 727-738, Oct. 1998.
Rancourt et al., "Evaluation of Centimeter-Scale Micro Wind Mills: Aerodynamics and Electromagnetic Power Generation", in Proc. PowerMEMS, pp. 93-96 (2009).
Bodur et al., "A new ZVT-PWM dc-dc converter" IEEE Trans. Power Electron., vol. 17, No. 1, pp. 40-47, Jan. 2002.
Aksoy et al., "A new ZVT-ZCT-PWM dc-dc converter" IEEE Trans. Power Electron., vol. 25, No. 8, pp. 2093-2105, Aug. 2010.
Redl et al., "Class E resonant regulated dc/dc power converters: analysis of operations and experimental results at 1.5 MHz", IEEE Trans. Power Electron., vol. PE-1, No. 2, pp. 111-120, Apr. 1986.
Tomescu, "A unified approach to class E versus quasi-resonant switch topologies" IEEE Trans. Circuits Syst. II: Analog Digit. Signal Process., vol. 45, No. 6, pp. 763-766, Jun. 1998.
Hu et al., "High-frequency resonant SEPIC converter with wide input and output voltage ranges" IEEE Trans. Power Electron., vol. 27, No. 1, pp. 189-200, Jan. 2012.
Pilawa-Podgurski et al., "Very-high-frequency resonant boost converters" IEEE Trans. Power Electron., vol. 24, No. 6, pp. 1654-1665, Jun. 2009.
Rivas et al., "New architectures for radio-frequency dc-dc power conversion" IEEE Trans. Power Electron., vol. 21, No. 2, pp. 380-392, Mar. 2006.
Yao et al., "A novel resonant gate driver for high frequency synchronous buck converters" IEEE Trans. Power Electron., vol. 17, No. 2, pp. 180-186, Mar. 2002.
Chen et al., "A resonant MOSFET gate driver with efficient energy recovery" IEEE Trans. Power Electron., vol. 19, No. 2, pp. 470-477, Mar. 2004.
Yahaya et al., "A review on design considerations & limitations of resonant gate drive circuit in VHF operations" Eng. Lett., vol. 17, No. 2, pp. 54-62, 2009.
Strydom et al., "A comparison of fundamental gate-driver topologies for high frequency applications" Proc. IEEE Appl. Power Electron. Conf. Expo., pp. 1045-1052, Feb. 2004.
Yang et al., "A new resonant gate drive circuit for synchronous buck converter" IEEE Trans. Power Electron., vol. 22, No. 4, pp. 1311-1320, 2007.
Lee et al., "A 580 kHz switching regulator using on-off control" J. Inst. Electron. Radio Eng., vol. 57, No. 5, pp. 221-226, Sep./Oct. 1987.
Song et al, "Class $\Phi 2$ dc-dc converter with PWM on-off control" Proc. IEEE 8th Intel. Conf. Power Electron. ECCE Asia, pp. 2792-2796, Jun. 2011.
Roundy, "Energy Scavenging for wireless sensor nodes with a focus on vibration to electricity conversion," Ph.D. dissertation, Dept. Mech. Eng., Univ. of California, Berkeley, CA, USA, 2003.
El-hami et al., "Design and fabrication of a new vibration-based electromechanical power generator" Sensors Actuators A: Phys., vol. 92, No. 1-3, pp. 335-342, Aug. 2001.
Beeby et al., "A micro electromagnetic generator for vibration energy harvesting" J. Micromech. Microeng., vol. 17, No. 7, pp. 1257-1265, Jul. 2007.
Rome et al., "Generating electricity while walking with loads" Science, vol. 309, No. 5741, pp. 1725-1728, Sep. 2005.
Yang et al., "Reducing detent force while harvesting energy from center of gravity: an 11-poles, 12-slots generator design", Proc. IEEE Energy Convers. Congr. Expo., pp. 380-387, Sep. 2012.
Cheng et al., "Modeling of magnetic vibrational energy harvesters using equivalent circuit representations" J. Micromech. Microeng., vol. 17, No. 11, pp. 2328-2335, Nov. 2007.
Mitcheson et al., "Power processing circuits for electromagnetic, electrostatis and piezoelectric inertial energy scavengers", Microsyst Technol, 13:1629-1635 (Jul. 2007).
Ottman et al., "Optimized Piezoelectric Energy Harvesting Circuit Using Step-Down Converter in Discontinuous Conduction Mode", IEEE Transactions on Power Electronics, vol. 18, No. 2, pp. 696-703 (Mar. 2003).
Tang et al., "An Ultracompact Dual-Stage Converter for Driving Electrostatic Actuators in Mobile Microrobots", IEEE Transactions on Power Electronics, vol. 29, No. 6, pp. 2991-3000 (Jun. 2014).
Tang et al., "A Novel Bridgeless High-Frequency Resonant AC-DC Converter", Power Electronics, Energy Harvesting and Renewable Energies Lab, www.ece.umd.edu/-khaligh, pp. 125-130 (IEEE Mar. 2014).
Lefeuvre et al., "Buck-Boost Converter for Sensorless Power Optimization of Piezoelectric Energy Harvester", IEEE Transactions on Power Electronics, vol. 22, No. 5, pp. 2018-2025 (Sep. 2007).
Le et al., "Piezoelectric Micro-Power Generation Interface Circuits", IEEE J. of Solid-State Circuits, vol. 41, No. 6, pp. 1411-1420 (Jun. 2006).
Jung et al., "Feasibility Study on a New Energy Harvesting Electromagnetic Device Using Aerodynamic Instability", IEEE Transactions on Magnetics, vol. 45, No. 10, pp. 4376-4379 (Oct. 2009).
Vijayan et al., "A Review of AC-DC Boost Converters for Low Voltage Energy Harvesting", Intl. J. of Emerging Tech and Adv Eng., www.ijetae.com, vol. 4, Issue 6, pp. 841-846 (Jun. 2014).
Badel et al., "Single Crystals and Nonlinear Process for Outstanding Vibration-Powered Electrical Generators", IEEE Transactions on Ultrasonics, Ferroelectrics, and Frequency Control, vol. 53, No. 4, pp. 673-684 (Apr. 2006).
Bawa et al., "Analysis, design, and implementation of a high-efficiency full-wave rectifier in standard CMOS technology", Analog Integr Circ Sig Process, 60:71-81 (Aug. 2009).
Chen et al., "A Low-power and High-gain Converter for Driving Dielectric Elastomer Actuators", Power Electronics, Energy Harvesting and Renewable Energies Lab, Univ of MD, www.ece.umd.edu/-khaligh, pp. 2755-2760 (IEEE Mar. 2013).

(56) References Cited

OTHER PUBLICATIONS

Bansal et al., "CM-Scale Air Turbine and Generator for Energy Harvesting from Low-Speed Flows", Dept. of Elec and Elec Eng, Imperial College, London, UK, M3P.128, pp. 529-532 (IEEE Jun. 2009).

Lallart et al., "High efficiency, wide load bandwidth piezoelectric energy scavenging by a hybrid nonlinear approach", Sensors and Actuators A: Physical, 165, pp. 294-302 (2011).

Tabesh et al., A Low-Power Stand-Alone Adaptive Circuit for Harvesting Energy From a Piezoelectric Micropower Generator; IEEE Transactionis on Industrial Electronics, vol. 57, No. 3, pp. 840-849, Mar. 2010.

Garbuio, "Mechanical Energy Harvester With Ultralow Threshold Rectification Based on SSHI Nonlinear Technique", IEEE Transactions on Industrial Electronics, vol. 56, No. 4, pp. 1048-1056 (Apr. 2009).

Guyomar et al., "Toward Energy Harvesting Using Active Materials and Conversion Improvement by Nonlinear Processing", IEEE Transactions on Ultrasonics, Ferroelectrics, and Frequency Control, vol. 52, No. 4, pp. 584-595 (Apr. 2005).

Colomer-Farrarons et al., "Power-Conditioning Circuitry for a Self-Powered System Based on Micro PZT Generators in a 0.13-um Low-Voltage Low-Power Technology", IEEE Transactions on Industrial Electronics, vol. 55, No. 9, pp. 3249-3257 (Sep. 2008).

Lefeuvre et al., "Piezoelectric Energy Harvesting Device Optimization by Synchronous Electric Charge Extraction", J of Intelligent Material Systems and Structures, vol. 16, pp. 865-876 (Oct. 2005).

Salmon, "Circuit Topologies for Single-Phase Voltage-Doubler Boost Rectifiers", IEEE Transactions on Power Electronics, vol. 8, No. 4, pp. 521-529 (Oct. 1993).

\* cited by examiner

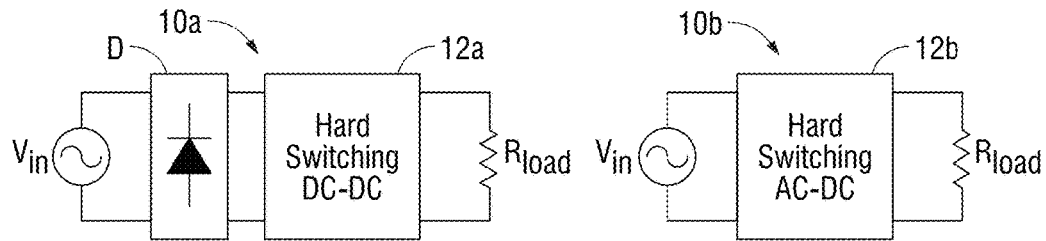
FIG. 1A
(Prior Art)
FIG. 1B
(Prior Art)
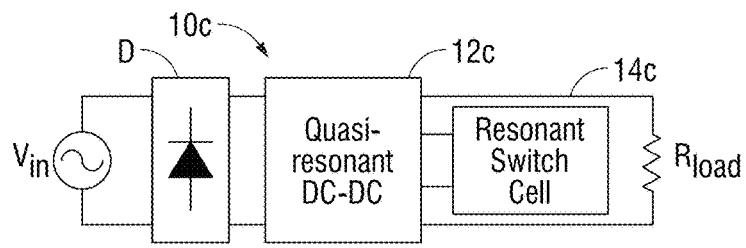
FIG. 1C
(Prior Art)
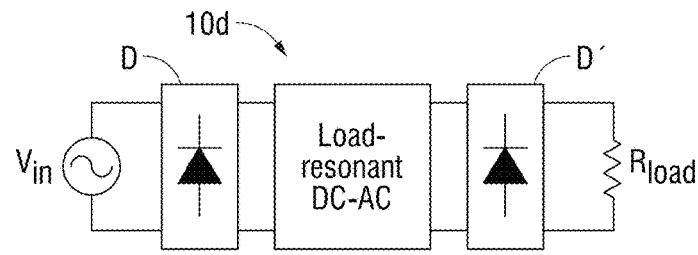
FIG. 1D
(Prior Art)
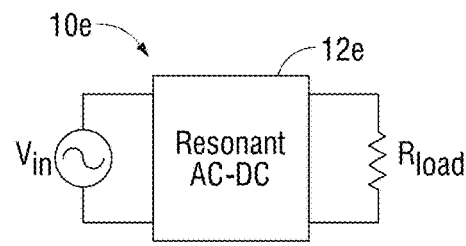
FIG. 1E

MODE (I)

MODE (II)

MODE (III)

MODE (IV)

MODE (I)

MODE (II)

MODE (III)

MODE (IV)

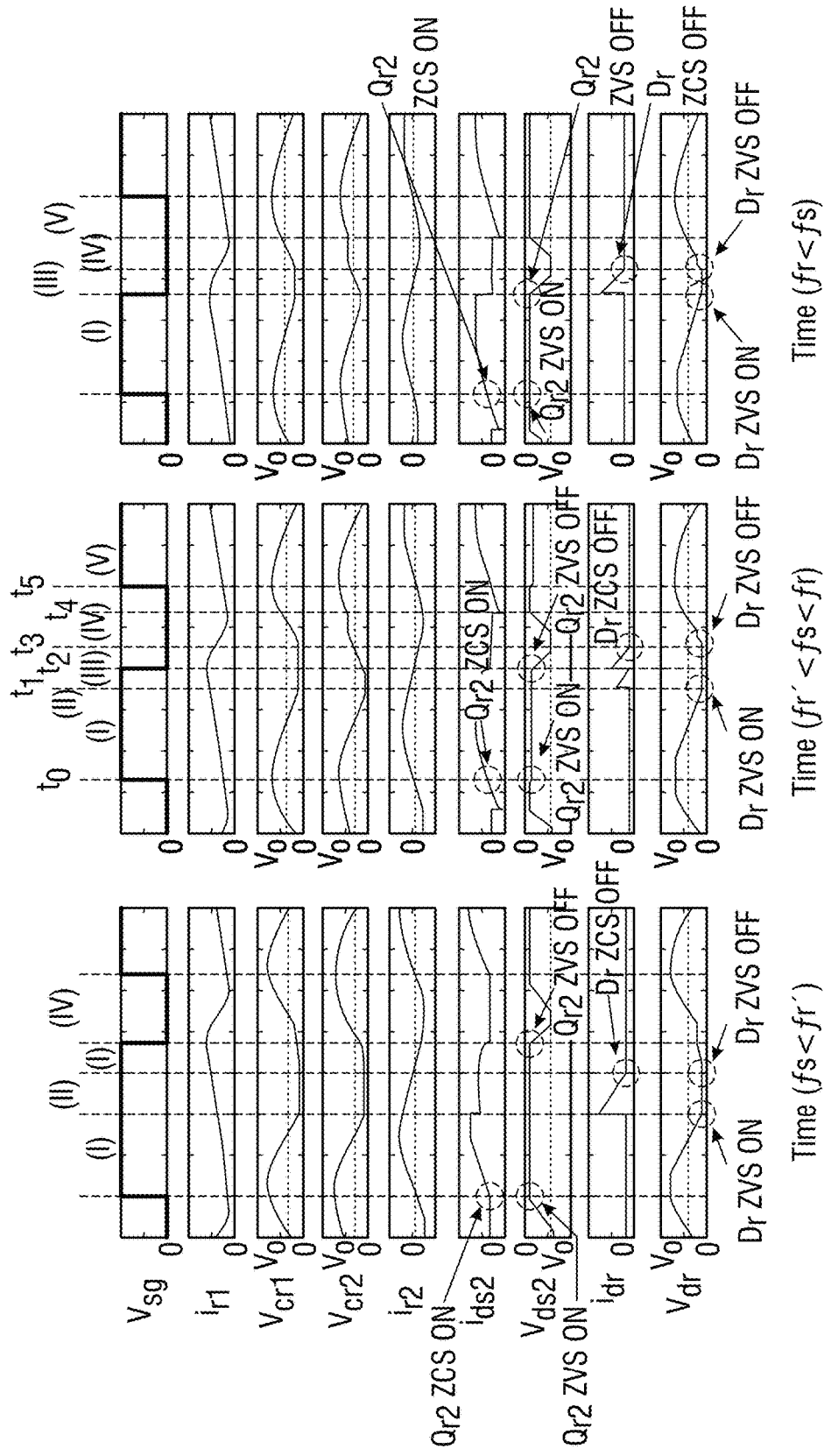
FIG. 5B1  FIG. 5B2  FIG. 5B3

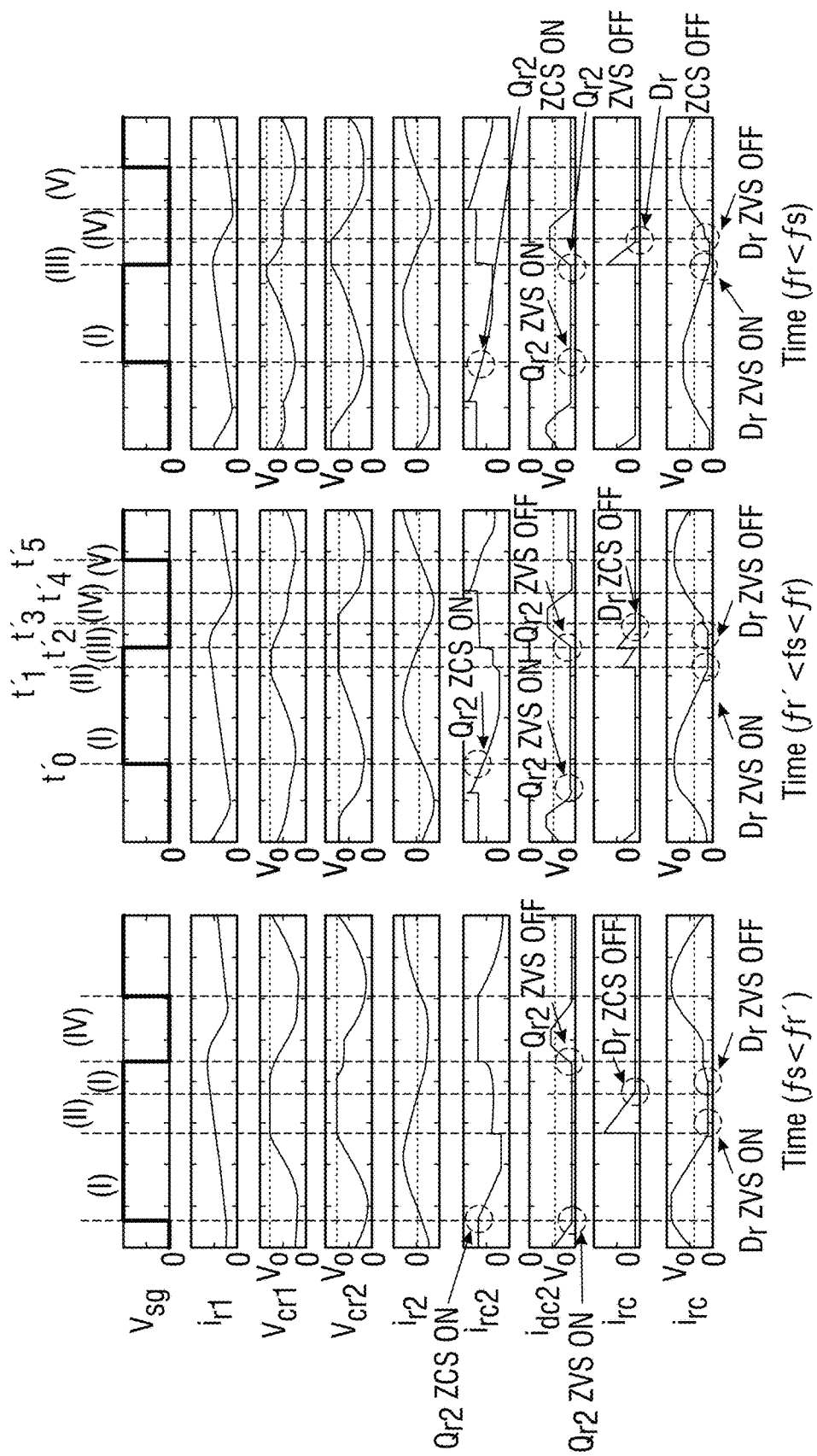
FIG. 6B1  FIG. 6B2  FIG. 6B3

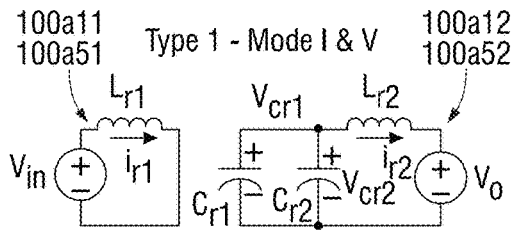
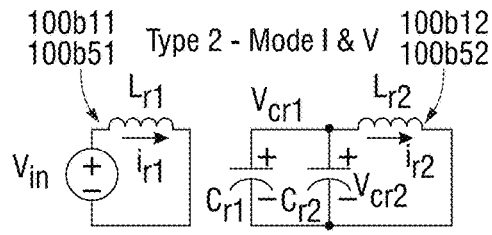
FIG. 7A1  FIG. 7A2
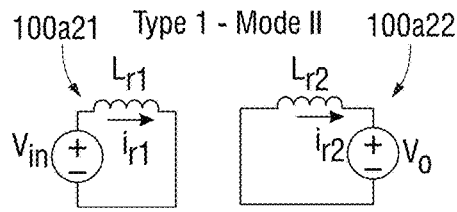
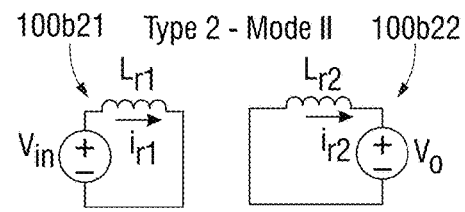
FIG. 7B1  FIG. 7B2
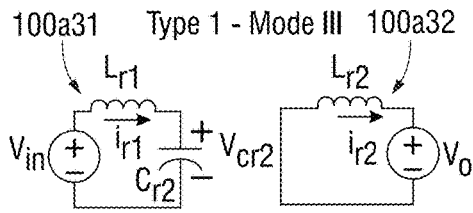
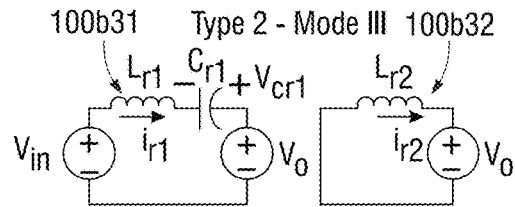
FIG. 7C1  FIG. 7C2
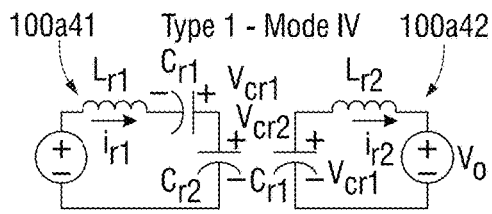
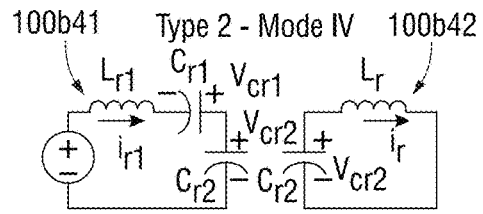
FIG. 7D1  FIG. 7D2

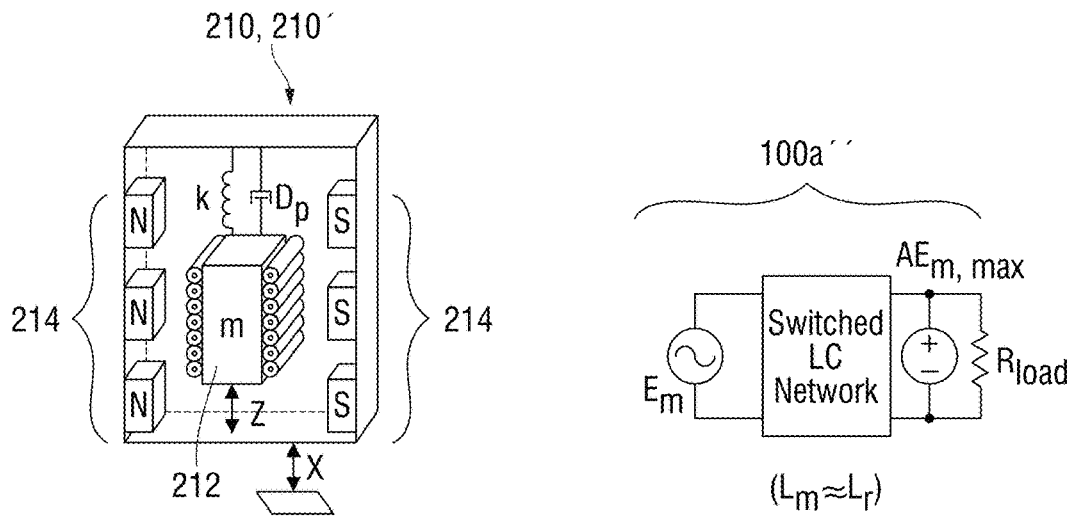
FIG. 15A
FIG. 15C
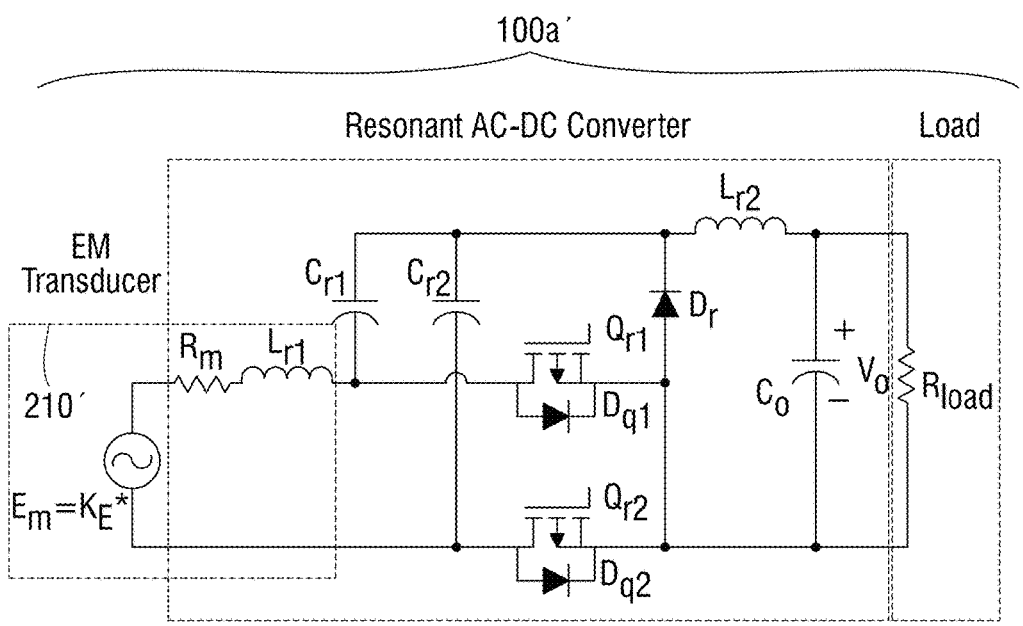
FIG. 15B

BRIDGELESS RESONANT AC-DC CONVERTERS AND SYSTEMS AND CONTROL SYSTEMS THEREFOR

CROSS-REFERENCE TO RELATED APPLICATIONS

This application claims priority to, and the benefit of, U.S. Provisional Patent Application 62/058,203 filed on Oct. 1, 2014, entitled "MULTI-INPUT BRIDGELESS AC-DC CONVERTER", by A. Khaligh et al., the entire contents of which is incorporated herein by reference and to U.S. Provisional Patent Application 62/235,055 filed on Sep. 30, 2015, entitled "MULTI-INPUT BRIDGELESS RESONANT AC-DC CONVERTER FOR ELECTROMAGNETIC ENERGY HARVESTING" by A. Khaligh et al., the entire contents of which is incorporated herein by reference.

BACKGROUND

1. Technical Field

The present disclosure relates to AC-DC converters and more particularly to bridgeless AC-DC converters.

2. Discussion of Related Art

Miniature power electronic interfaces (PEIs) are intended to address power conditioning for various types of low-power energy sources, such as battery cells or tiny transducers [1]-[4]. Power density and light-load efficiency are important performance metrics of power converters, especially for low-power applications. One of the main challenges toward fabricating ultra-compact power conditioning system is the miniaturization of PEIs with given energy storage and loss limitation of passive components. Miniaturization and system integration have an increasing demand in PEI design for low-power loads such as self-powered electronic devices [1] and autonomous mobile systems [5]. Furthermore, energy conversion efficiency is of critical importance in low-power PEI designs. Power loss reductions in transistors, passive components and gate drivers are challenging, due to small load and limited footprint.

SUMMARY

To address the foregoing disadvantages of the prior art, the present disclosure relates to an AC-to-DC converter that includes a multi-resonant switching circuit including an AC-AC stage and an AC-DC stage. The AC-AC stage is configured as a soft-switched LC network to convert a low-frequency low-amplitude alternating input voltage into a higher-frequency higher-amplitude alternating voltage. The AC-DC stage rectifies the higher-frequency higher-amplitude alternating voltage into a DC output voltage via a soft-switched diode.

In embodiments, the AC-DC converter is configured to electrically couple to an AC voltage source having a first feed in electrical communication with an input inductor, the input inductor in parallel electrical communication with a first resonant capacitor.

In some embodiments, the input inductor in parallel electrical communication with a first resonant capacitor is further in parallel communication with a first MOSFET and a resonant inductor, the first MOSFET and the resonant inductor in parallel with the first resonant capacitor.

In other embodiments, the AC voltage source has a second feed in electrical communication with a second resonant capacitor and a second MOSFET in parallel with the second resonant capacitor.

In still other embodiments, the first MOSFET and the resonant inductor in parallel with the first resonant capacitor are in electrical communication with an output diode, the output diode rectifying the higher-amplitude alternating voltage.

In yet other embodiments, the resonant inductor is further in parallel with the second resonant capacitor, and the second MOSFET and the resonant inductor in parallel with the first resonant capacitor are in electrical communication with the output diode, the output diode rectifying the higher-amplitude alternating voltage.

In further embodiments, the AC-DC converter further includes a dc capacitor coupled in parallel with the output diode, in the first feed, and the second feed.

In yet further embodiments, the AC-DC converter further includes a resistive load coupled in parallel between the first feed and the second feed.

In embodiments, the input inductor in parallel electrical communication with a first resonant capacitor is further in parallel communication with a first MOSFET and an output diode, the first MOSFET and the output diode in parallel with the first resonant capacitor.

In other embodiments, the AC voltage source has a second feed in electrical communication with a second resonant capacitor and a second MOSFET in parallel with the second resonant capacitor.

In yet other embodiments, the first MOSFET and the output diode in parallel with the first resonant capacitor are in electrical communication with a resonant inductor, the output diode rectifying the higher-amplitude alternating voltage.

In still further embodiments, the output diode is further in parallel with the second resonant capacitor, and the second MOSFET and the output diode in parallel with the first resonant capacitor are in electrical communication with the resonant inductor, the output diode rectifying the higher-amplitude alternating voltage.

In embodiments, the AC-to-DC converter further includes a dc capacitor coupled in parallel with the resonant inductor, in the first feed, and the second feed.

In other embodiments, the AC-to-DC converter further includes a resistive load coupled in parallel between the first feed and the second feed.

The present disclosure relates also to an AC-to-DC converter system that includes at least two multi-resonant switching circuits that include at least two AC-AC stages and an AC-DC stage. The AC-AC stages are configured as soft-switched LC networks to convert at least two low-frequency low-amplitude alternating input voltage into a higher-frequency higher-amplitude alternating voltage. The AC-DC stage rectifies the higher-frequency higher-amplitude alternating voltage into a DC output voltage via a soft-switched diode.

In embodiments, the AC-to-DC converter system includes a plurality of multi-resonant switching circuits that each includes an AC-AC stage and shares a common AC-DC stage. The AC-AC stage is configured as a soft-switched LC network to convert a low-frequency low-amplitude alternating input voltage into a higher-frequency higher-amplitude alternating voltage. The AC-DC stage rectifies the higher-frequency higher-amplitude alternating voltage into a DC output voltage via a soft-switched diode.

In other embodiments, the AC-DC converter includes an AC voltage source having a first feed in electrical communication with an input inductor, the input inductor in parallel electrical communication with a first resonant capacitor.

In still other embodiments, the input inductor in parallel electrical communication with a first resonant capacitor is further in parallel communication with a first MOSFET and a resonant inductor, the first MOSFET and the resonant inductor in parallel with the first resonant capacitor.

In yet other embodiments, the AC voltage source has a second feed in electrical communication with a second resonant capacitor and a second MOSFET in parallel with the second resonant capacitor.

In embodiments, the first MOSFET and the resonant inductor in parallel with the first resonant capacitor are in electrical communication with an output diode, the output diode rectifying the higher-amplitude alternating voltage.

In other embodiments, the resonant inductor is further in parallel with the second resonant capacitor and the second MOSFET and the resonant inductor in parallel with the first resonant capacitor are in electrical communication with the output diode, the output diode rectifying the higher-amplitude alternating voltage.

In embodiments, the AC-to-DC converter system further includes a dc capacitor coupled in parallel with the output diode, in the first feed, and the second feed.

In yet other embodiments, the AC-to-DC converter system further includes a resistive load coupled in parallel between the first feed and the second feed.

In still other embodiments, the AC-DC converter includes an AC voltage source having a first feed in electrical communication with an input inductor, the input inductor in parallel electrical communication with a first resonant capacitor.

In further embodiments, the input inductor in parallel electrical communication with a first resonant capacitor is further in parallel communication with a first MOSFET and a resonant inductor, the first MOSFET and the resonant inductor in parallel with the first resonant capacitor.

In further embodiments, the AC voltage source has a second feed in electrical communication with a second resonant capacitor and a second MOSFET in parallel with the second resonant capacitor.

In yet further embodiments, the first MOSFET and the resonant inductor in parallel with the first resonant capacitor are in electrical communication with an output diode, the output diode rectifying the higher-amplitude alternating voltage.

In still further embodiments, the resonant inductor is further in parallel with the second resonant capacitor, and the second MOSFET and the resonant inductor in parallel with the first resonant capacitor are in electrical communication with the output diode, the output diode rectifying the higher-amplitude alternating voltage.

The present disclosure also relates to a control system for an AC-to-DC converter that includes at least two resonant gate drivers that each includes: one MOSFET gate configured to transmit a gate voltage signal to an AC-to-DC converter; an on/off logic module electrically coupled to the MOSFET gate; a resonant tank LC circuit electrically coupled to the on/off logic module; and a voltage bias module electrically coupled to the resonant tank LC circuit.

In embodiments, the on/off logic module includes: a first bipolar junction transistor and a second bipolar junction transistor, the first bipolar junction transistor configured to receive a voltage on/off input signal from a pulse-width modulation circuit, the second bipolar junction transistor configured to receive a polarity identification voltage input, the first bipolar junction transistor electrically coupled to a common bus between the first bipolar junction transistor and the second bipolar junction transistor and the MOSFET gate.

In other embodiments, the control system further includes an oscillator generating a gate voltage input to the resonant gate driver and a pulse width modulation module electrically coupled to a load, the pulse width modulation module generating a voltage on/off input to the resonant gate driver.

In yet other embodiments, the resonant gate driver is electrically coupled to an AC/DC converter to transmit at least a first and second voltage signal to an AC-DC converter.

In still further embodiments, the control system further includes a voltage comparator electrically coupled to a voltage input to the AC-DC converter, the voltage comparator electrically coupled to the resonant gate driver to transmit a polarity identification voltage input.

In other embodiments, the AC-DC converter is a bridgeless resonant AC/DC converter.

BRIEF DESCRIPTION OF THE DRAWINGS

The above-mentioned advantages and other advantages will become more apparent from the following detailed description of the various exemplary embodiments of the present disclosure with reference to the drawings wherein:

FIG. 1A illustrates a diode bridge cascaded with hard-switching dc-dc converter according to the prior art;

FIG. 1B illustrates a bridgeless hard-switching ac-dc converter according to the prior art;

FIG. 1O illustrates a diode bridge cascaded with quasi-resonant dc-dc converter according to the prior art;

FIG. 1D illustrates a diode bridge cascaded with load-resonant dc-ac converter and diode bridge according to the prior art;

FIG. 1E illustrates a bridgeless resonant ac-dc converter according to one embodiment of the present disclosure;

FIG. 5B1 illustrates the voltage and current waveforms of the Type 1 converter with a positive input voltage wherein the switching frequency is less than the resonant frequency of the $L_{r1}C_{r1}C_{r2}$ network of FIG. 5A;

FIG. 5B2 illustrates the voltage and current waveforms of the Type 1 converter with a positive input voltage wherein the switching frequency is greater than the resonant frequency of the $L_{r1}C_{r1}C_{r2}$ network of FIG. 5A and less than the resonant frequency of the $L_{r1}C_{r2}$ and $L_{r2}C_{r1}$ networks of FIG. 5A;

FIG. 5B3 illustrates the voltage and current waveforms of the Type 1 converter with a positive input voltage wherein the switching frequency is greater than the resonant frequency of the $L_{r1}C_{r2}$ and $L_{r2}C_{r1}$ networks of FIG. 5A;

FIG. 6B1 illustrates the voltage and current waveforms of Type 2 converter with a positive input voltage wherein the switching frequency is less than the resonant frequency of the $L_{r1}C_{r1}C_{r2}$ network of FIG. 6A;

FIG. 6B2 illustrates the voltage and current waveforms of the Type 2 converter with a positive input voltage wherein the switching frequency is greater than the resonant frequency of the $L_{r1}C_{r1}C_{r2}$ network of FIG. 6A and less than the resonant frequency of the $L_{r1}C_{r2}$ and $L_{r2}C_{r1}$ networks of FIG. 6A;

FIG. 6B3 illustrates the voltage and current waveforms of the Type 2 converter with a positive input voltage wherein the switching frequency is greater than the resonant frequency of the $L_{r1}C_{r2}$ and $L_{r2}C_{r1}$ networks of FIG. 6A;

FIG. 7A1 illustrates an equivalent circuit model of the Type 1 converter corresponding to Mode I and Mode V;

FIG. 7B1 illustrates an equivalent circuit model of the Type 1 converter corresponding to Mode II;

FIG. 7C1 illustrates an equivalent circuit model of the Type 1 converter corresponding to Mode III;

FIG. 7D1 illustrates an equivalent circuit model of the Type 1 converter corresponding to Mode IV;

FIG. 7A2 illustrates an equivalent circuit model of the Type 2 converter corresponding to Mode I and Mode V;

FIG. 7B2 illustrates an equivalent circuit model of the Type 2 converter corresponding to Mode II;

FIG. 7C2 illustrates an equivalent circuit model corresponding to Mode III;

FIG. 7D2 illustrates an equivalent circuit model corresponding to Mode IV;

FIGS. 15A-15C represent an illustrative schematic and model of the converter according to embodiments of the present disclosure cascaded with an EM transducer wherein:
FIG. 15A illustrates an EM Transducer Model;
FIG. 15B illustrates a circuit schematic; and
FIG. 15C illustrates an Average Model;

DETAILED DESCRIPTION

Figure 2A:
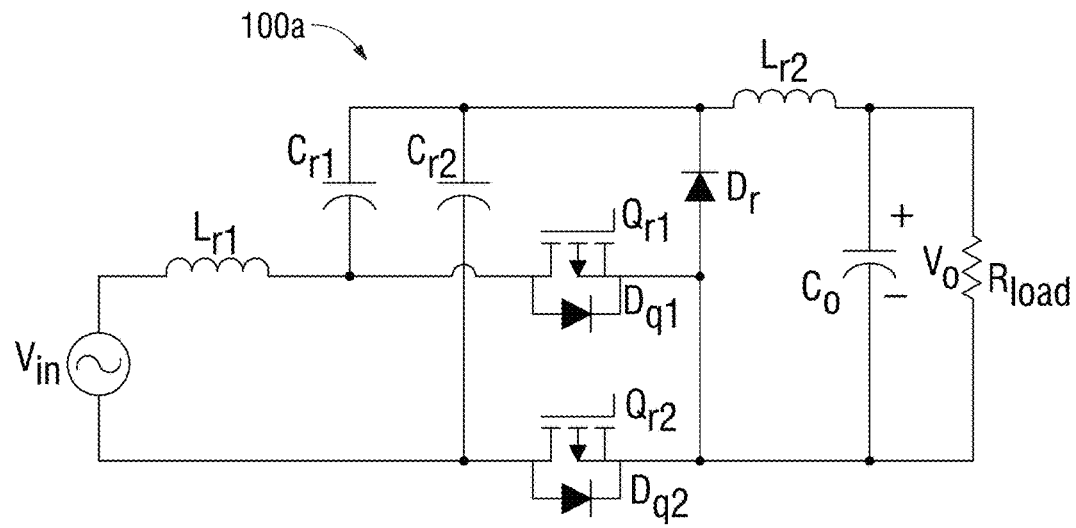
FIG. 2A illustrates a Type 1 bridgeless resonant ac-dc step-up/step-down converter.

For the purposes of promoting an understanding of the principles of the present disclosure, reference will now be made to the exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

The word "exemplary" is used herein to mean "serving as an example, instance, or illustration." Any embodiment described herein as "exemplary" is not necessarily to be construed as preferred or advantageous over other embodiments.

It is to be understood that the method steps described herein need not necessarily be performed in the order as described. Further, words such as "thereafter," "then," "next," etc., are not intended to limit the order of the steps. Such words are simply used to guide the reader through the description of the method steps.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, tablets, portable/personal digital assistants, and other devices that facilitate communication of information between end-users within a network.

The general features and aspects of the present disclosure remain generally consistent regardless of the particular purpose. Further, the features and aspects of the present disclosure may be implemented in system in any suitable fashion, e.g., via the hardware and software configuration of system or using any other suitable software, firmware, and/or hardware. For instance, when implemented via executable instructions, such as the set of instructions, various elements of the present disclosure are in essence the code defining the operations of such various elements. The executable instructions or code may be obtained from a computer-readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media may include any medium that may store or transfer information.

Section I

Introduction

Prior to discussing the embodiments of the present disclosure, in view of the Discussion of Related Art above, referring to FIG. 1A, the rectification of low-amplitude input voltage sources, such as electromagnetic (EM) transducers and electroactive polymer (EAP) transducers, is difficult, inefficient, and in some cases impractical, to be implemented by using conventional diode-bridge topologies, e.g., topology 10a, that include a voltage source Vin coupled to diode bridge D and a hard-switching DC-DC converter 12a further coupled to resistive load Rload [1]. The forward voltage on diodes causes large amount of power loss, which, in turn, significantly lowers the power conversion efficiency [6].

Referring to FIG. 1B, to address these challenges, single-stage bridgeless ac-dc converters, e.g., topology 10b, have been investigated [2], [6][8]. These topologies either use bidirectional transistors and split capacitors as hard switching AC-DC converters 12b or use parallel dc dc converters in order to condition alternating input voltage sources. However, these converters suffer from inefficient hard switching, which is even worse in the case of higher switching frequencies. The switching losses can be reduced through lower switching frequency; however, it accompanies bulky passive components, which, in turn, makes these topologies impractical for miniaturization. Additionally, some of these converters require high-side drive of transistors, which complicates the gate driver design. Miniaturization and system integration of the PEIs are heavily dependent on the required number and size of inductive and capacitive passive components. The sizes of passive components depend on the amount of transient energy storage [9]. There is a motivation to increase the converter switching frequency, since the required transient energy storage decreases at a higher frequency. However, frequency-dependent device loss mechanisms, including switching loss and gate driving loss, constrain the switching frequency. Soft switching techniques such as zero-voltage switching (ZVS) and zero-current switching (ZCS) are demanded to mitigate the voltage-current overlap and capacitive discharge losses [10]-[13]. High-frequency resonant converters allow small size of energy storage without suffering from switching losses.

Referring now to FIG. 1C, most investigations on soft-switching circuits have focused on modification of hard-switching converters by incorporating resonant switch cells 14c in, topology 10c. These resonant-switch converters, referred to as quasi-resonant DC-DC converters 12c, utilize an auxiliary LC resonant circuit to primarily shape the current and voltage of main transistors during the turn-on and turn-off of the switching components. Some resonant-switch converters connect passive resonant elements in series or in parallel with main transistors, such as quasi-resonant buck converters [11], [14], while others adopt auxiliary transistors and diodes as active switch cells, such as ZVS-ZCS-pulse width-modulated (PWM) converters [15], [16]. However, additional switching losses or conduction losses in switch cell would degrade the efficiency. Switching losses of main transistors and diodes are reduced but not eliminated. The overall size of topology also increases by adding resonant switch cells while maintaining the main passive components.

FIG. 1D illustrates another approach of soft-switching wherein passive resonant networks 10d are adopted as low impedance branches across transistors such as class D converters and class E converters, for energy transmission around the resonant frequency [17], [18]. The passive resonant network 10d includes a front-end diode bridge D that is electrically coupled an input voltage source Vin and electrically coupled to a load-resonant DC-AC converter 12d that is, in turn, electrically coupled to a post-end diode bridge D, that is further electrically coupled to load $R_{load}$.

Switching losses are reduced through the oscillating load voltage and current. The main passive components are not necessary in the operation. Load-resonant converters are simple and efficient at high-frequency or very-high-frequency operation. However, an additional post-end rectification stage such as dual-stage resonant DC-AC boost converter is required for dc-dc voltage conversion [19]-[20] [21]. The switching frequency range is limited by the resonant frequency in these converters. Unlike the quasi-resonant converters, the load has an influence on the voltage conversion of these load-resonant topologies. In addition, most of quasi-resonant and load-resonant converters suffer from high peak voltage and current associated with the transistor and the resonant LC elements. They also require additional front-end diode bridges to address alternating input voltage sources.

In embodiments of the present disclosure, turning now to FIG. 1E, two types of single-stage bridgeless high-frequency resonant ac-dc step-up/step-down converters 10e are described to efficiently convert arbitrary input voltages into a regulated dc voltage. The AC-DC step-up/step-down converters 10e include a resonant AC-DC converter 12e. The topologies provide reasonably high efficiency from light-load to full-load condition, due to the elimination of switching losses and gating losses. Moreover, high-frequency operation (up to 2 MHz) of the converters allows miniaturization through using substantially smaller capacitive and inductive passive components. There is no need of large passive components. The topologies are capable of addressing alternating input voltage sources without additional passive components, which consequently reduces the footprint. Furthermore, these topologies have advantages such as reduced voltage stress on power transistors. Although the description which follows focuses on small load condition, the topological concepts can be adapted to other higher power applications This disclosure is organized as follows. Section II presents the details of proposed topologies along with their soft-switching operation modes. The steady state analyses and electrical stresses are investigated in Section III, followed by the resonant gate drive (RGD) circuit and the control scheme in Section IV. The design specification for EM energy harvesting and experimental results are carried out in Section V for validation of low-power energy conversion.

Section II

Proposed Bridgeless Resonant Ac-Dc Converters

A. Circuit Description

Figure 2B:
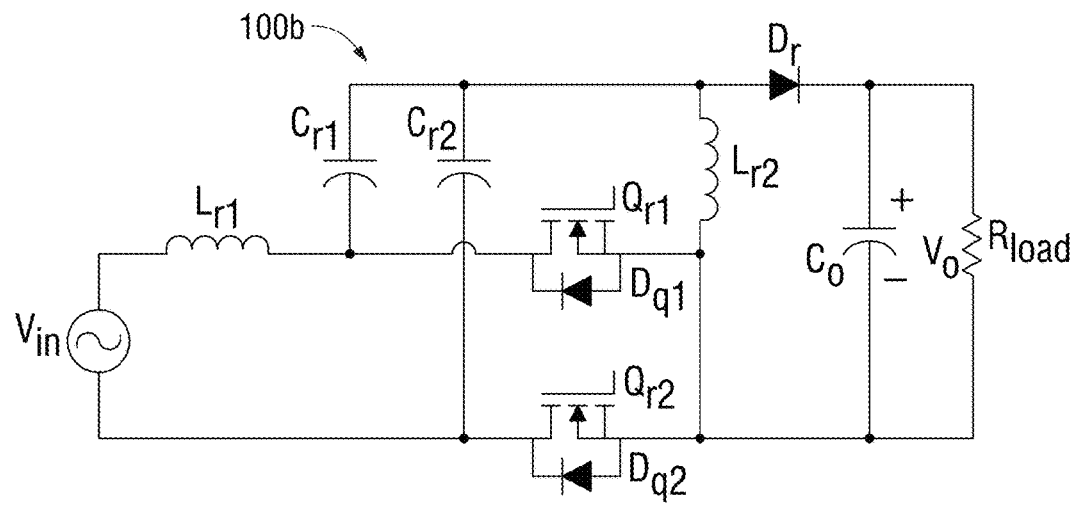
FIG. 2B illustrates a Type 2 bridgeless resonant ac-dc step-up/step-down converter.
Figure 3A:
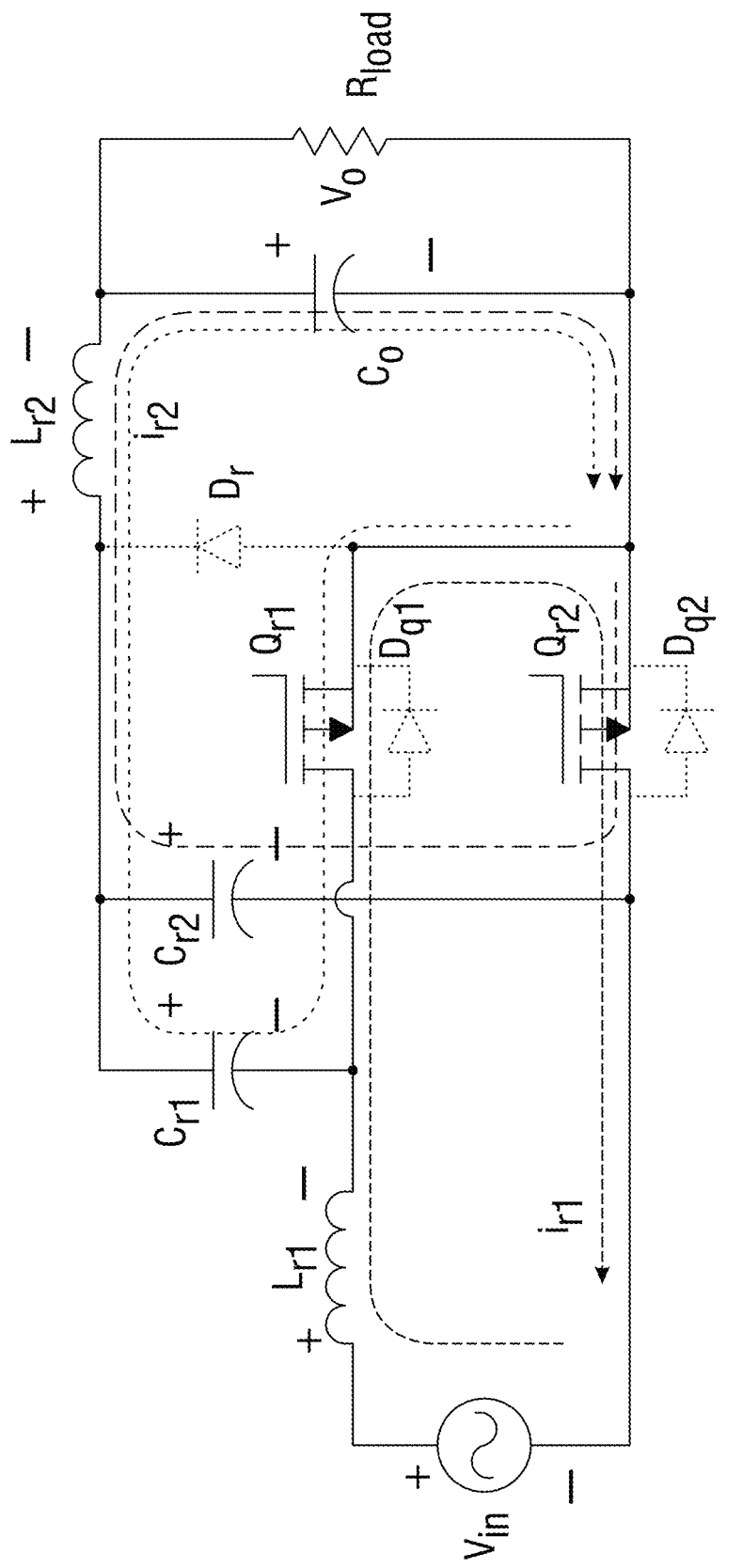
FIG. 3A illustrates a first switching operation mode of the Type 1 converter with a positive voltage input source during one switching cycle.
Figure 3B:
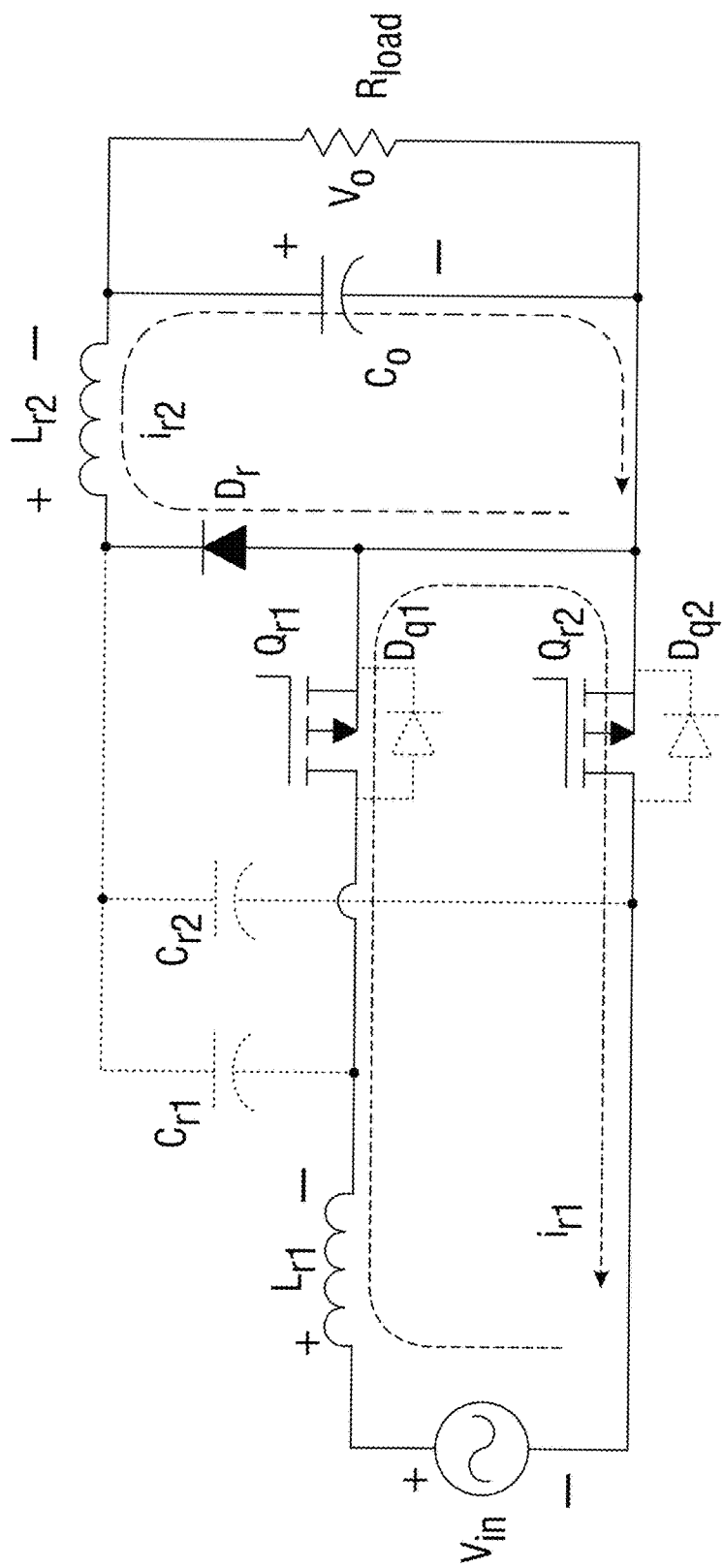
FIG. 3B illustrates a second switching operation mode of the Type 1 converter with a positive voltage input source during one switching cycle.
Figure 3C:
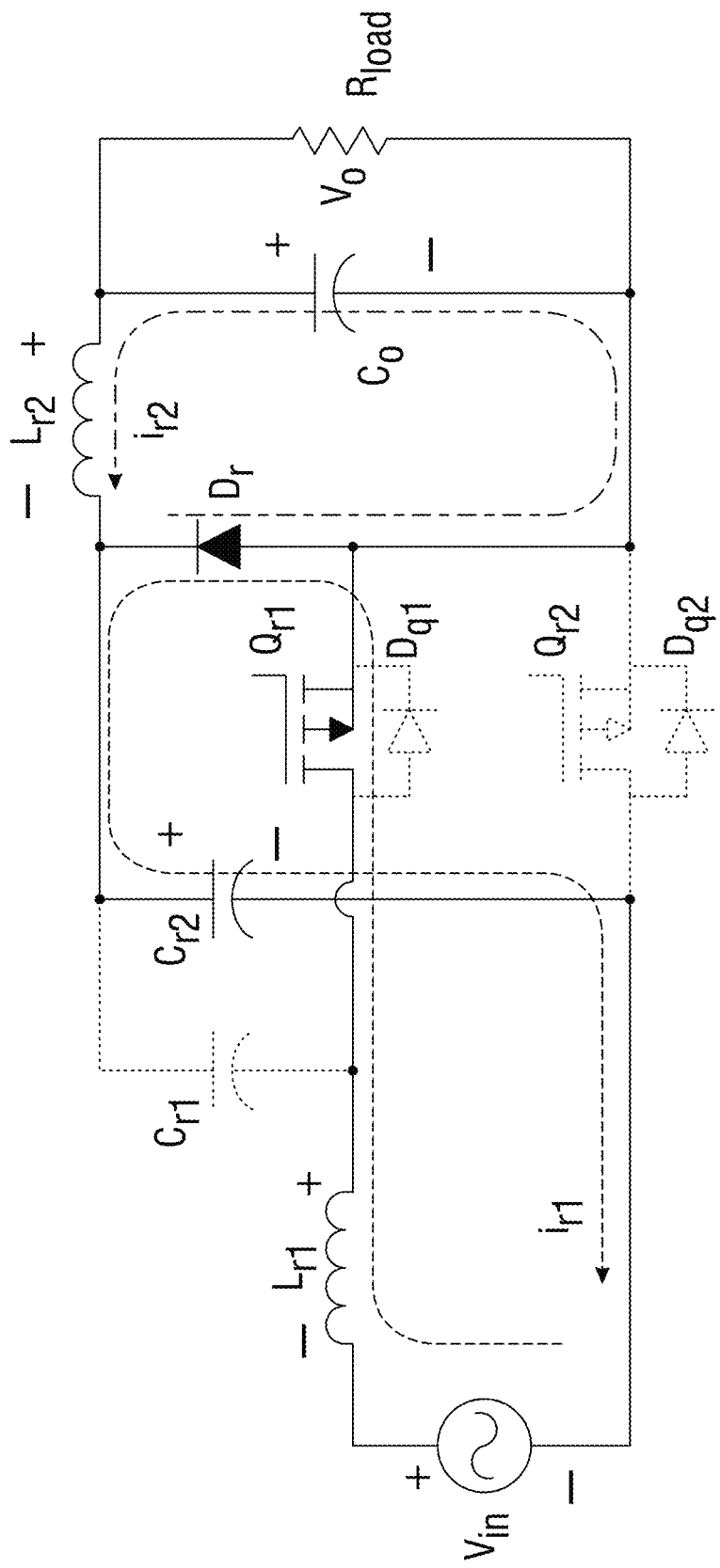
FIG. 3C illustrates a third switching operation mode of the Type 1 converter with a positive voltage input source during one switching cycle.
Figure 3D:
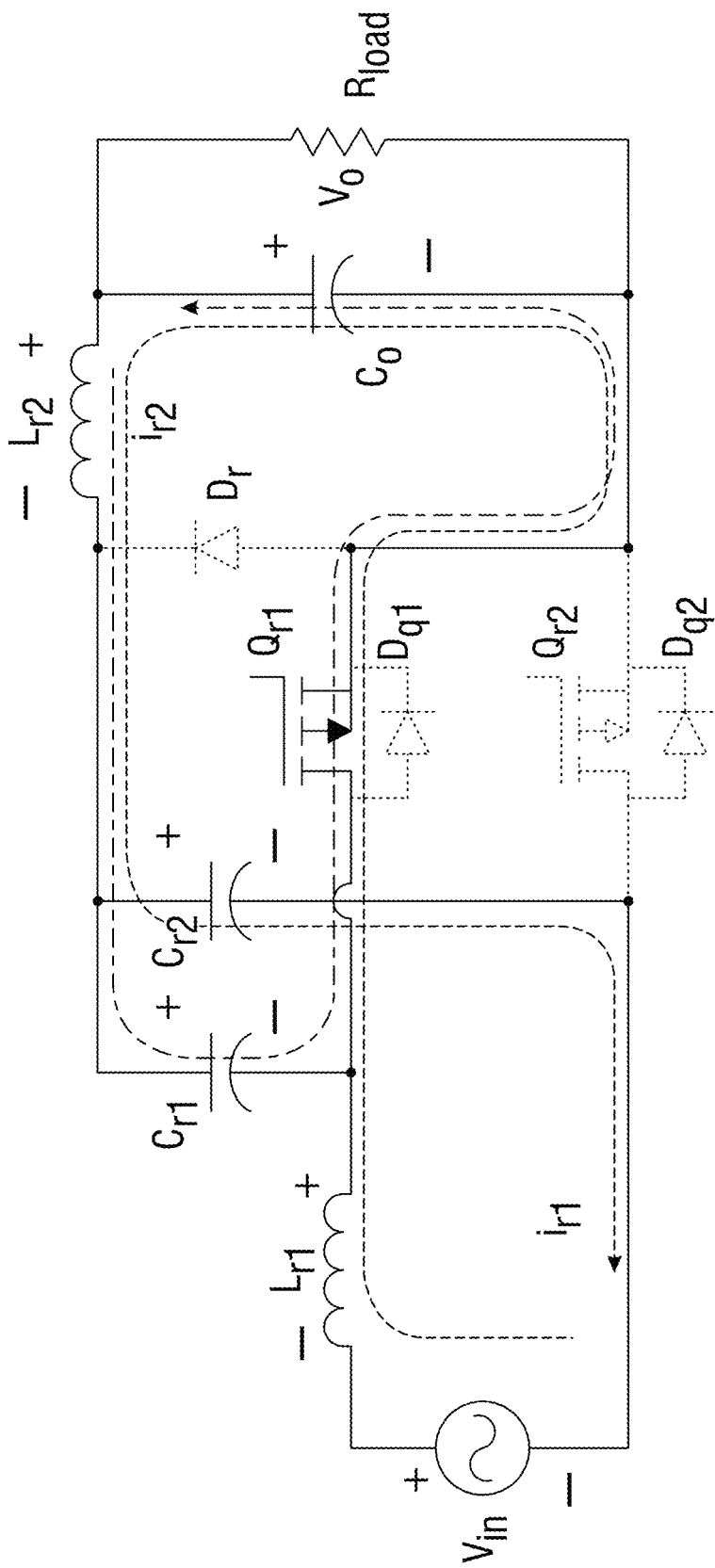
FIG. 3D illustrates a fourth switching operation mode of the Type 1 converter with a positive voltage input source during one switching cycle.
Figure 3E:
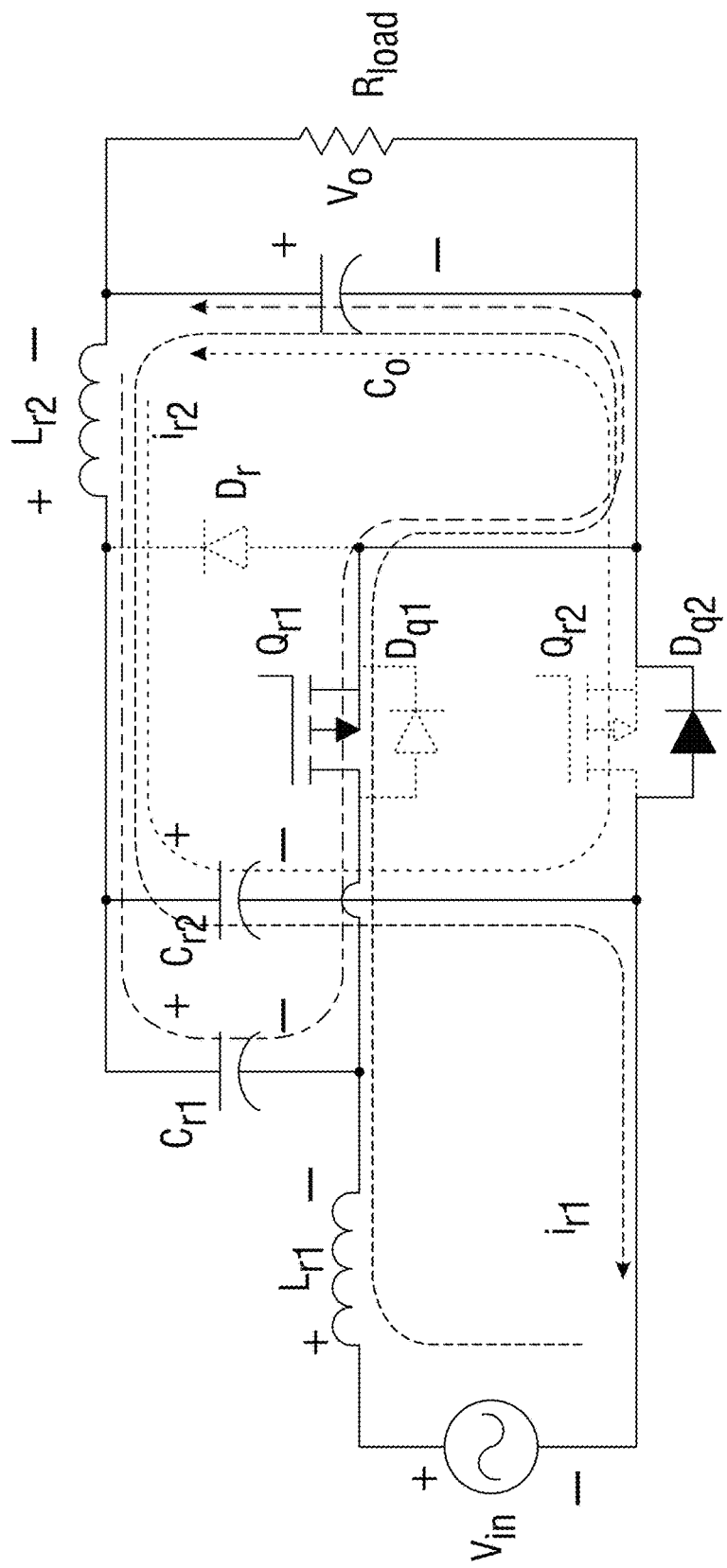
FIG. 3E illustrates a fifth switching operation mode of the Type 1 converter with a positive voltage input source during one switching cycle.

FIGS. 2A and 2B illustrate two types of single-stage bridgeless resonant ac-dc step-up/step-down converters 100a and 100b as represented generically in FIG. 1E above as AC-DC step-up/step-down converters 10e according to embodiments of the present disclosure which are suitable for miniaturization with reasonably high efficiencies and which present the following significant non-obvious advantages over the prior art described above with respect to FIGS. 1A-1D.

The two topologies 100a and 100b, representing Type 1 and Type 2 converters respectively share the same principle of operation. Both circuits are capable of operating with multiresonant switching. Each topology is formed by two inductors Lr1 and Lr2, two resonant capacitors Cr1 and Cr2, two power transistors Qr1 and Qr2 in parallel with two body diodes Dq1 and Dq2, and one rectifier diode Dr. In 100a, the anodes of the two body diodes Dq1 and Dq2 connect to AC voltage source Vin and the input inductor Lr1, and the cathodes of the two body diodes Dq1 and Dq2 connect to the rectifier diode Dr. In 100b, the cathodes of the two body diodes Dq1 and Dq2 connect to AC voltage source Vin and the input inductor Lr1, and the anodes of the two body diodes Dq1 and Dq2 connect to the resonant inductor Lr2. The input inductor $L_{r1}$ is sharply tuned with one resonant capacitor Cr1 or Cr2 contributing to half of the resonant oscillation. The resonant inductor $L_{r2}$ is tuned with the two split resonant capacitors $C_{r1}$ and $C_{r2}$ to resonate near the fundamental component of switching frequency fs. Ideally, the components $L_{r2}$, $C_{r1}$, and $C_{r2}$ present a lossless low drain-to-source impedance branch across transistors near fs. $C_{r1}$ and $C_{r2}$ are in parallel with the transistors and the diode to ensure ZVS at turning-on and turning-off. Switching losses are eliminated through the oscillating voltage and current, while the input energy is stored and released to the load through the active LC network, which includes Cr1, Cr2, Lr2, but not Lr1. Furthermore, the tuned networks Cr1, Cr2, Lr2 eliminate overvoltage spikes as well as diode reverse recovery issues while simultaneously maintaining low peak voltage stresses on the power transistors Qr1 and Qr2.

Power transistors $Q_{r1}$ and $Q_{r2}$ are actively turned on and off in order to generate drain-to-source pulse voltage at the input of LC network. The amplitude of drain-to-source pulse voltage is higher than $v_{in}$ due to the energy stored in $L_{r1}$. The fundamental component of drain-to-source pulse voltage passes through the LC network and generates an amplified oscillating voltage near the switching frequency fs across the rectifier diode $D^r$, also referred to in the art as an output diode. ZVS and ZCS operation of $Q_{r1}$ and $Q_{r2}$ provide energy recovery to drain-to-source parasitic capacitor $C_{ds}$ of power transistors (Cds being internal to Qr1 and Qr and is not shown), which, in turn, increases the efficiency. The overvoltage spikes on drain-to-source voltage is eliminated, thereby no snubber circuit is required. The diode $D_r$ rectifies the amplified oscillating voltage after the tuned network into a dc output voltage. The rectifier or output diode Dr generates a freewheeling path for the resonant inductor current (Lr1 AND Lr2) as well as a charging path for the resonant capacitors Cr1 and Cr2. The rectifier or output diode $D_r$ can be replaced with a transistor if bidirectional configuration is required. The body diodes $D_{q1}$ and $D_{q2}$ serve as freewheeling diodes for ZVS and ZCS, when the switching frequency is higher than the first resonant frequency of the resonant inductor Lr2 tuned with the two split resonant capacitors Cr1 and Cr2, the second resonant frequency of the input inductor Lr1 tuned with the resonant capacitor Cr2, and the third resonant frequency of the input inductor Lr1 and the resonant inductor Lr2 tuned with the two split resonant capacitors Cr1 and Cr2.

According to the directions of the body diodes Dq1 and Dq2 and source nodes of the transistors, p-channel MOSFETs are preferred for the Type 1 converter 100a while n-channel MOSFETs are preferable for the Type 2 converter 100b, for the ease of gate driver design. Due to the different doping processes of p-type and n-type, n-channel MOSFETs usually have faster transient response than p-channel MOSFETs. In addition, p-channel MOSFETs require negative gate drive voltage, which increases the complexity of gate driver design. Therefore, the Type 2 converter 100b may be expected to have advantages over the Type 1 converter 100a in terms of higher switching frequency capability and easier gate driver design.

More particularly, the single-stage bridgeless resonant ac-dc step-up/step-down converters 100a and 100b may provide the following significant, non-obvious advantages over the prior art:

Capability of efficient operation in the case of alternating low-amplitude input voltages;
Capability of high-frequency switching operation;
Small number and size of passive components;
Theoretically no switching losses;
Low loss caused by diode forward voltage;
No requirement for additional snubber circuits;
No diode reverse recovery issues; and
Low voltage stresses on transistors.

Additionally, the advantages of the Type 1 and Type 2 converters 100a and 100b also include the following:

The Type 1 and Type 2 converters 100a and 100b are each capable of achieving AC/DC rectification, voltage step-up or step-down and MPPT all in one stage.
They can be used to increase energy conversion efficiency by eliminating diode voltage drops (diodes are replaced by resonant capacitors, in comparison to conventional diode bridge and boost rectifier).
In this interface, resonant capacitors act as the main energy storage devices, and therefore there is no need to increase the input inductance $L_{cell}$ (in comparison to a boost rectifier which requires large input inductance to step up voltage).
The output current is continuous, which leads to a better performance in case of connection to a load, which requires continuous current such as a battery.

B. Principle of Operation

Figure 4A:
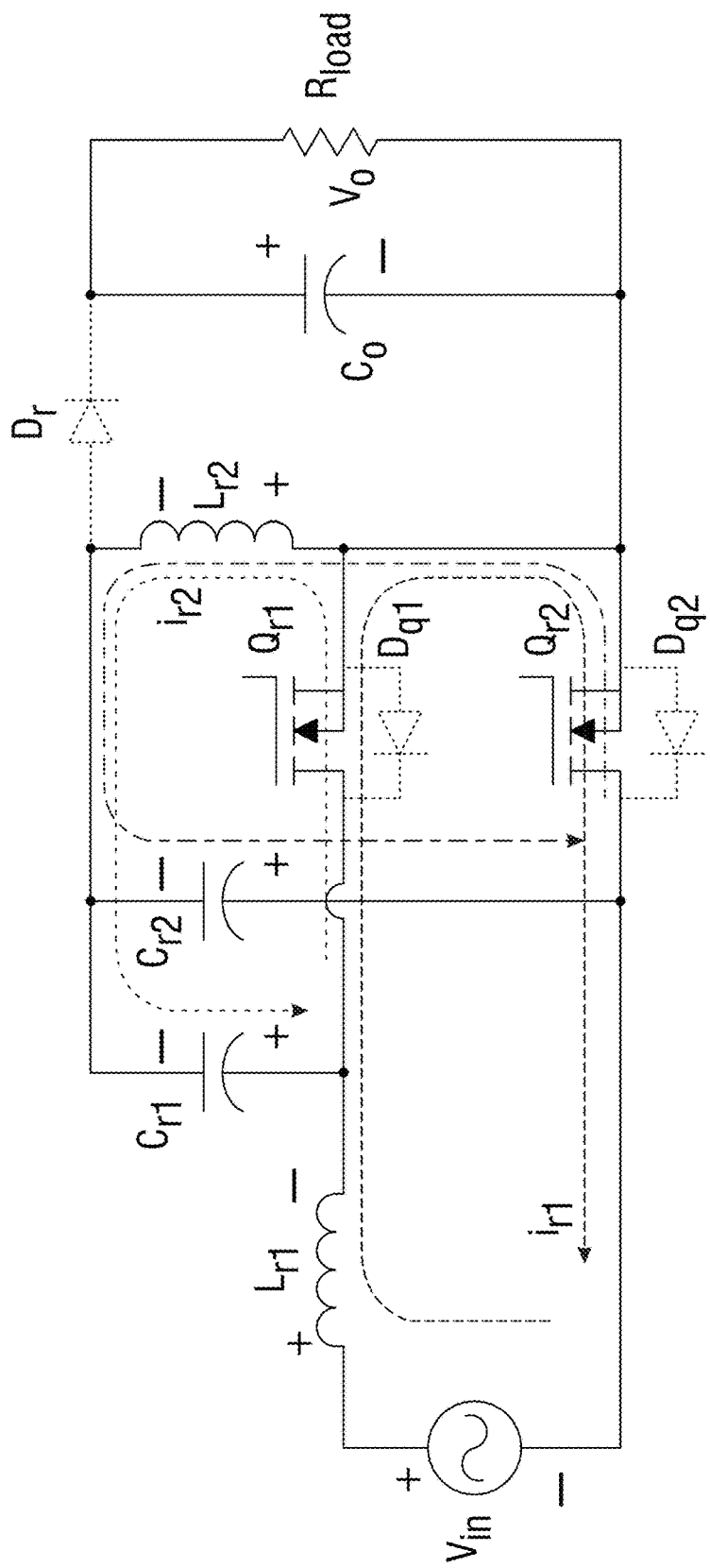
FIG. 4A illustrates a first switching operation mode for the Type 2 converter with a positive voltage input source during one switching cycle.
Figure 4B:
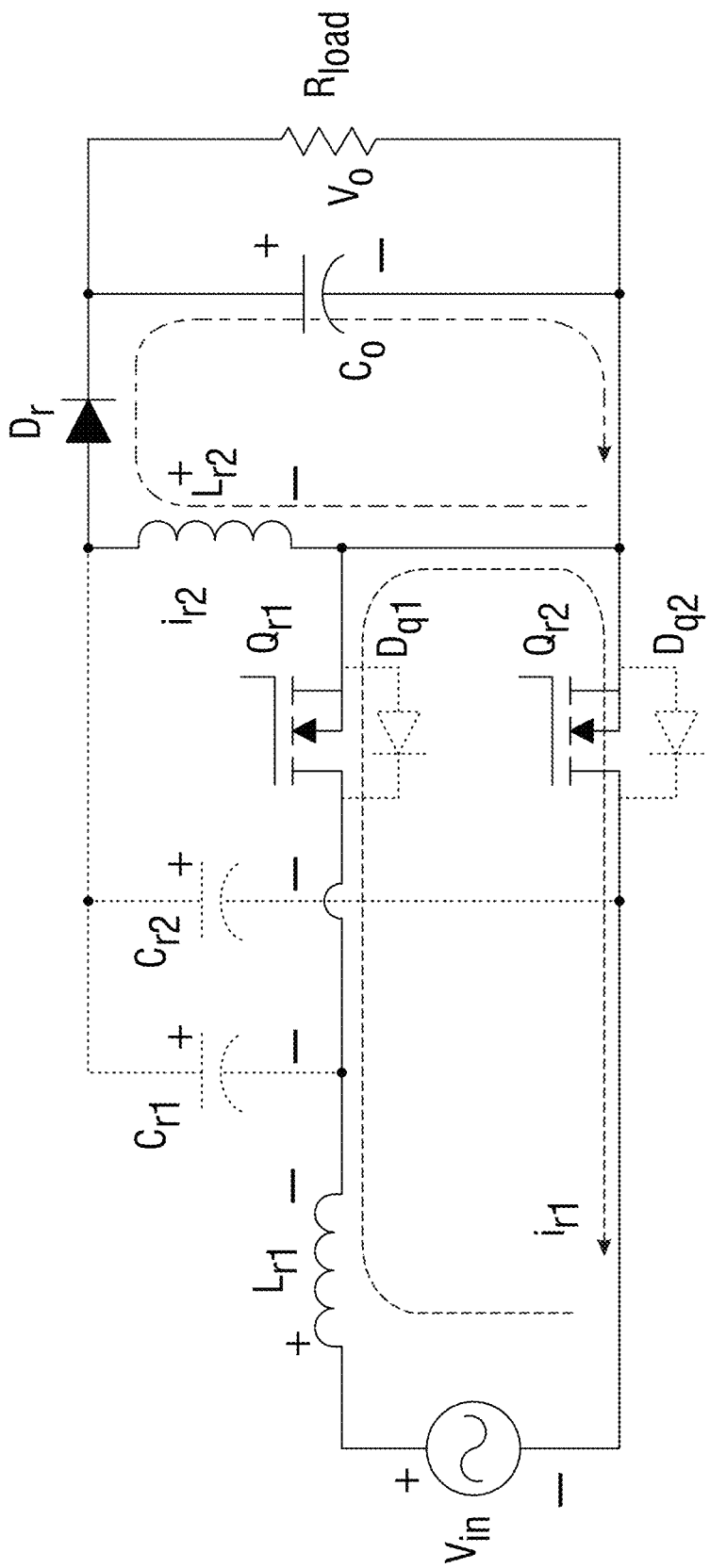
FIG. 4B illustrates a second switching operation mode of the Type 2 converter with a positive voltage input source during one switching cycle.
Figure 4C:
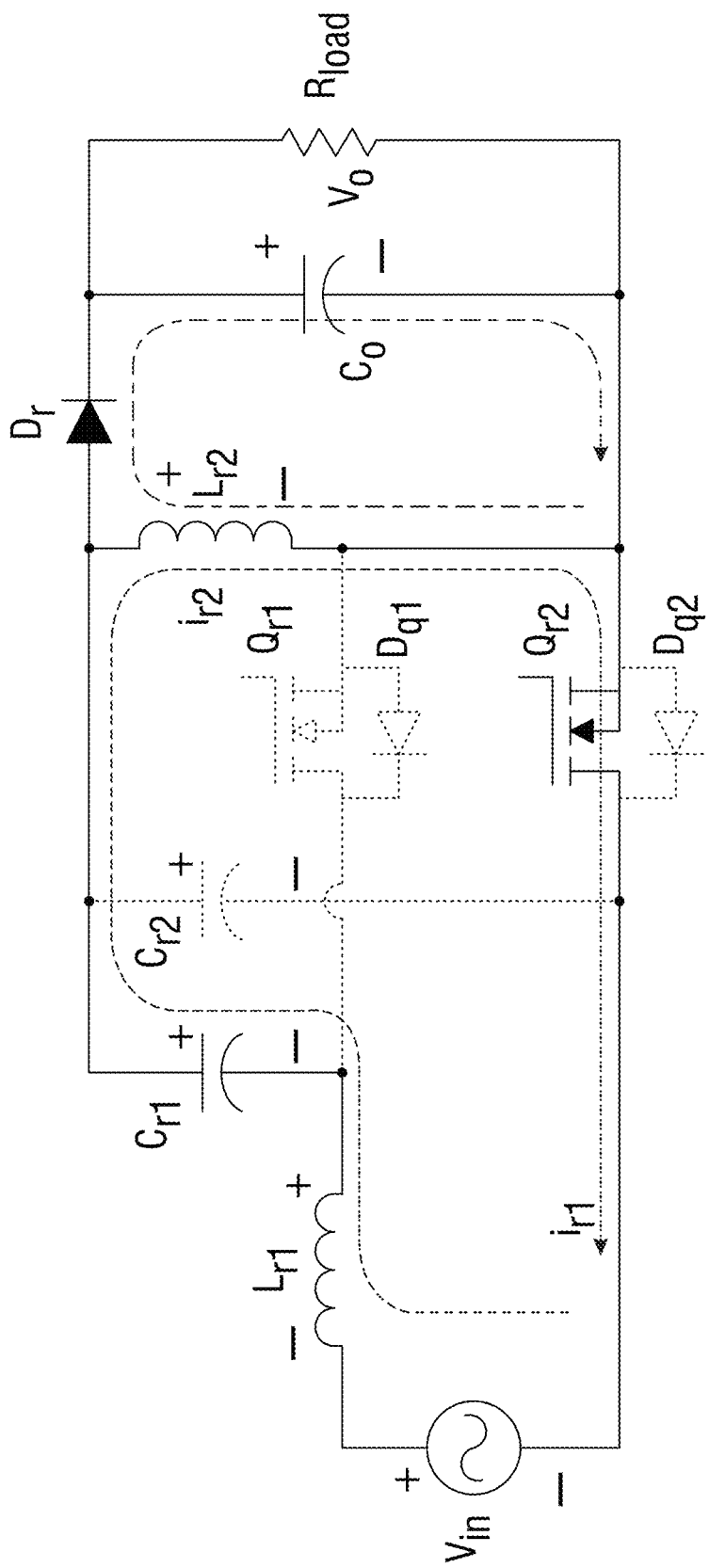
FIG. 4C illustrates a third switching operation mode of the Type 2 converter with a positive voltage input source during one switching cycle.
Figure 4D:
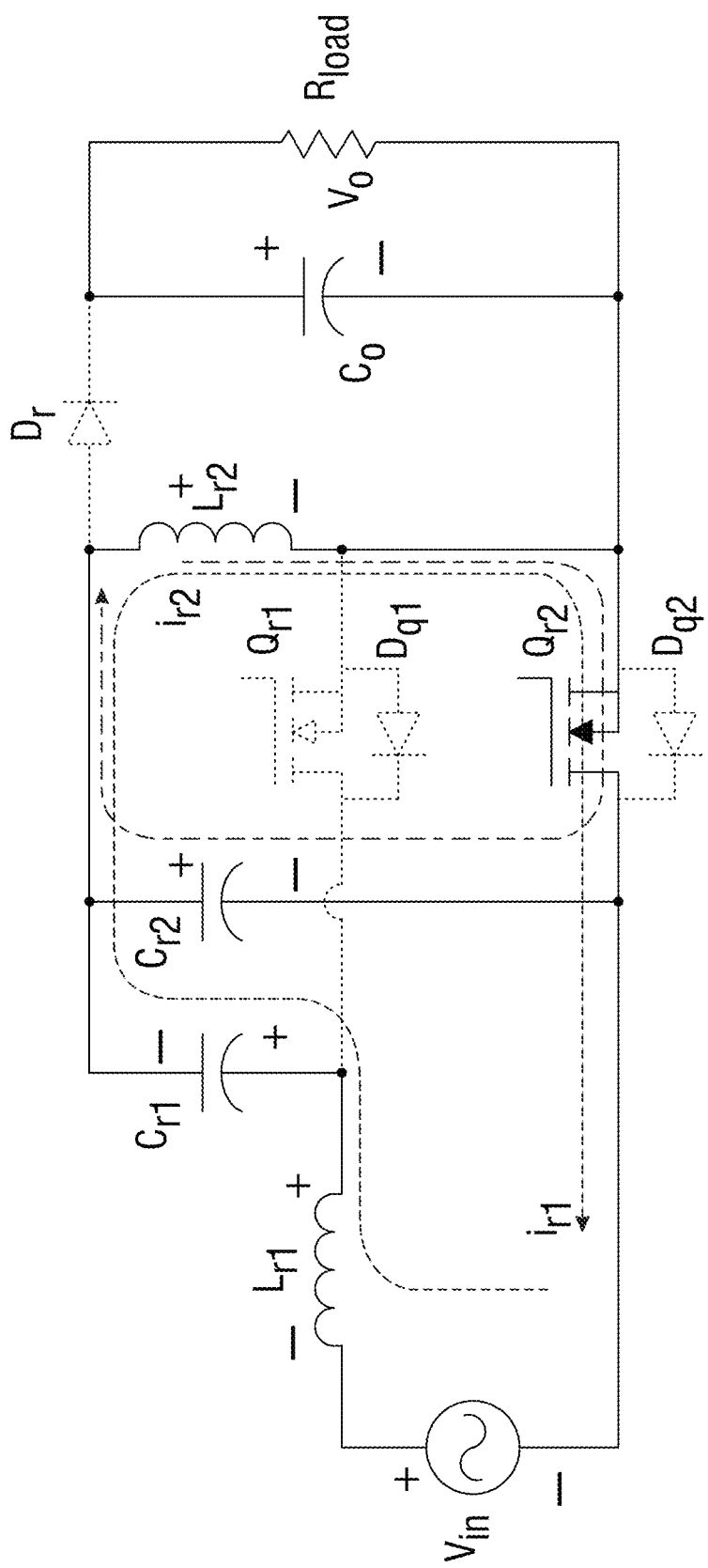
FIG. 4D illustrates a fourth switching operation mode of the Type 2 converter with a positive voltage input source during one switching cycle.
Figure 4E:
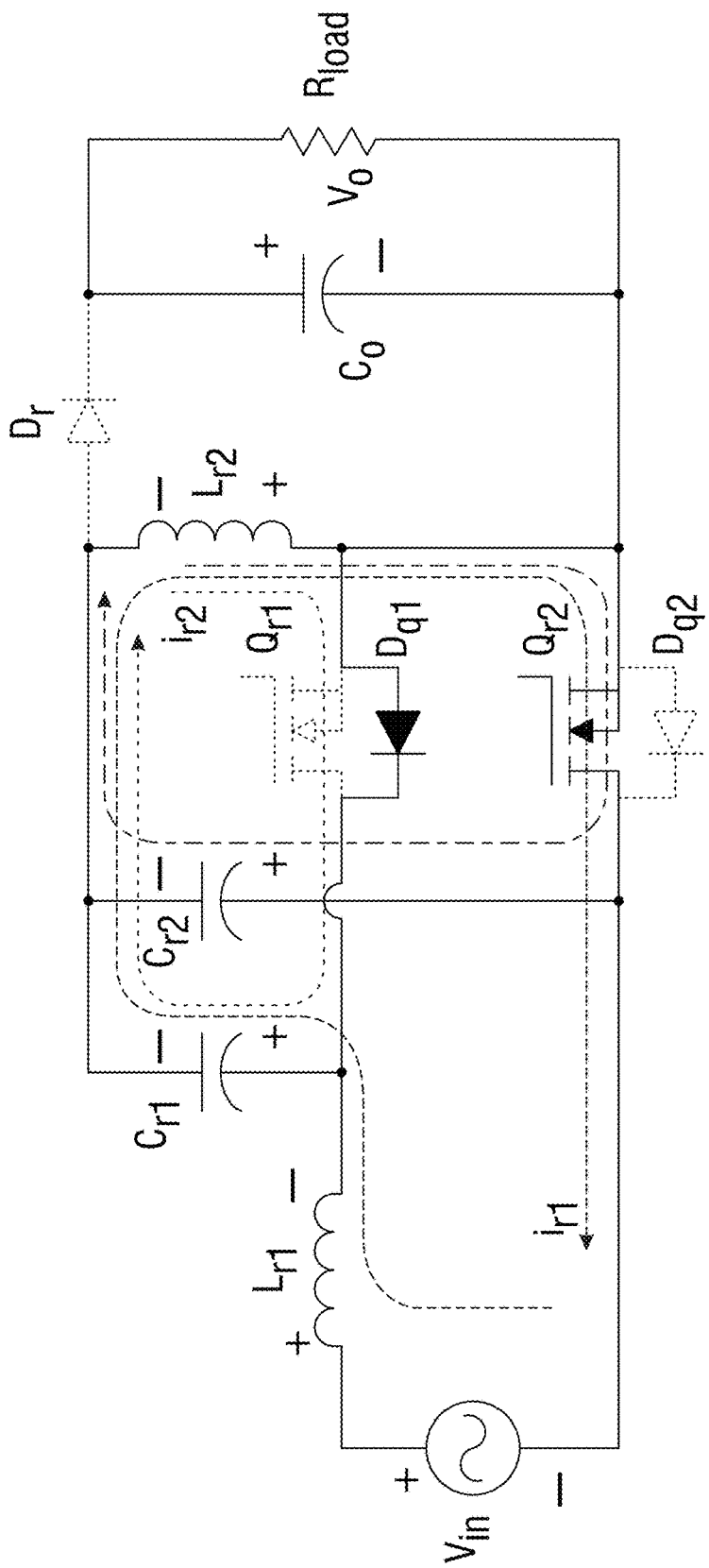
FIG. 4E illustrates a fifth switching operation mode of the Type 2 converter with a positive voltage input source during one switching cycle.

FIG. 3A-3E illustrate the switching operation modes of Type 1 converter 100a with a positive voltage input source, during one switching cycle. FIG. 4E illustrate the switching operation modes for Type 2 converter 100b with a positive voltage input source, during one switching cycle.

More particularly, FIGS. 3A-3E illustrate respectively equivalent circuits 100a1 for Mode I, 100a2 for Mode II, 100a3 for Mode III, 100a4 for Mode IV and 100a5 for Mode V of Type 1 converter 100a during one switching cycle with a positive voltage input source.

FIGS. 4A-4E illustrate respectively equivalent circuits 100b1 for Mode I, 100b2 for Mode II, 100b3 for Mode III, 100b4 for Mode IV and 100b5 for Mode 5 of Type 2 converter 100b, during one switching cycle with a positive input voltage source.

The solid portions of each figure represent portions of the respective circuit that are active during the respective mode of the switching cycle. The dashed portions of each figure represent portions of the respective circuit that are inactive during the respective mode of the switching cycle. The dashed arrowed lines of each figure represent directions of the current flowing in the respective circuit during the respective mode of the switching cycle.

Figure 5A:
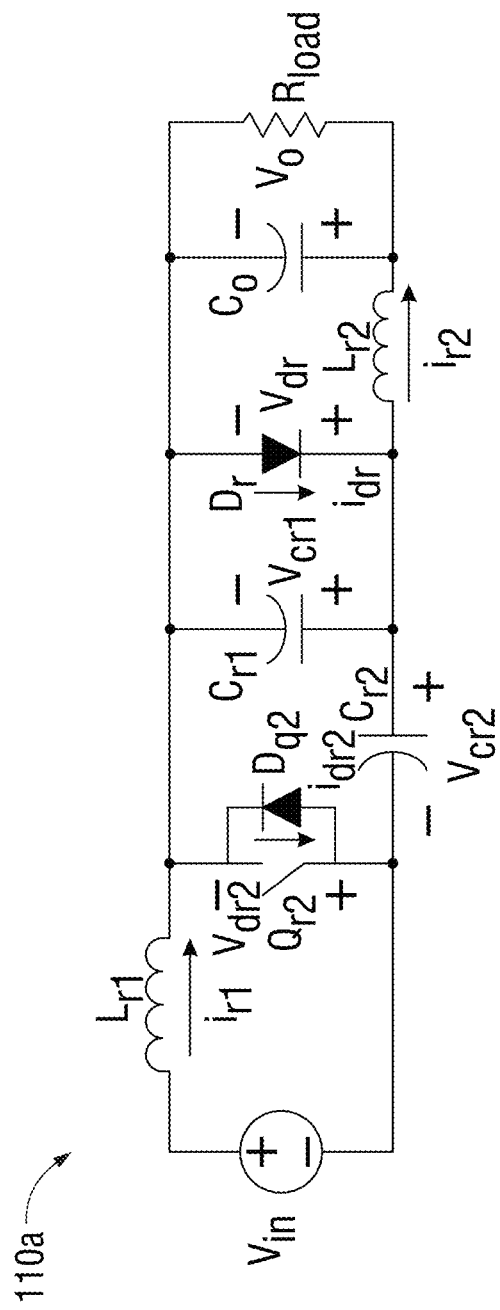
FIG. 5A illustrates a simplified topology of the Type 1 converter with a positive input voltage.
Figure 6A:
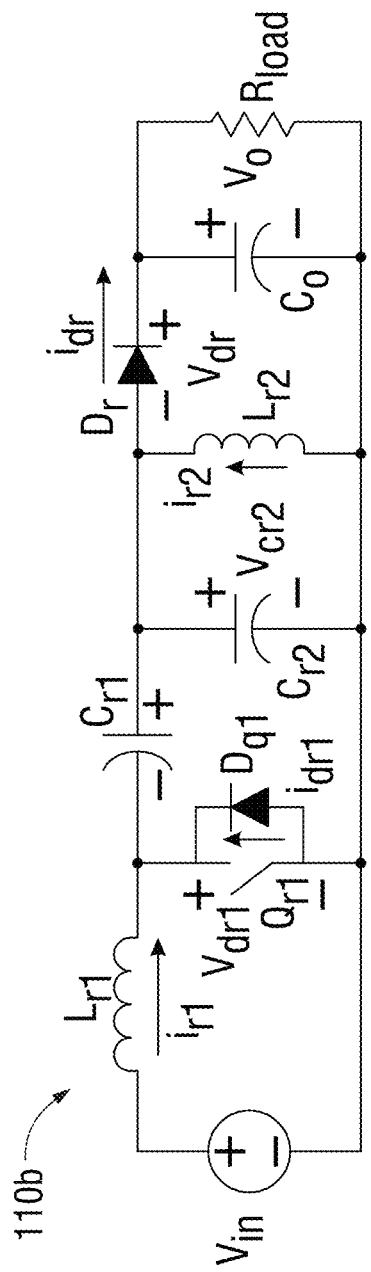
FIG. 6A illustrates a simplified topology of the Type 2 converter with a positive input voltage.

The simulation waveforms of transient voltage and current, with different switching frequencies of the Type 1 converter 100a as well as the Type 2 converter 100b, are demonstrated in FIGS. 5A and B1, B2, B3 and FIGS. 6A and B1, B2, B3, respectively.

More particularly, FIG. 5A illustrates the equivalent simplified circuit 110a for the Type 1 converter 100 having a positive input voltage Vin. FIGS. 5B1, 5B2, 5B3 illustrate the voltage and current waveforms of Type 1 converter 100a with a positive input voltage and different switching frequencies.

Similarly, FIG. 6A illustrates the equivalent simplified circuit 110b for the Type 2 converter 100b having a positive input voltage Vin. FIGS. 6B1, 6B2, 6B3 illustrate the voltage and current waveforms of Type 2 converter 100b with a positive input voltage and different switching frequencies.

There are two resonant frequencies in these circuits 110a and 110b, $f'_r$ is the resonant frequency of $L_{r2}C_{r1}C_{r2}$ network and $f_r$ ($f_{r1}=f_{r2}=f_r$) is the resonant frequency of $L_{r1}C_{r2}$ and $L_{r2}C_{r1}$ networks. Depending on the switching frequency (fs), there are three different operating regions: (a) $f_s<f'_r$, (b) $f'_r<f_s<f_r$, and (c) $f_s>f_r$. In the case of $f_s<f'_r$ and $f_s>f_r$, there are four modes of operation, while the case of $f'_r<f_s<f_r$ is composed of five operation modes. Each switching operation mode of Type 1 converter for $f'_r<f_s<f_r$ is described briefly below, as it contains all the other operation modes in the case of $f_s<f'_r$ and $f_2>f_r$.

At $t_0$: (Circuit initial state) Assume that $i_{r1}$ has an initial value and $i_{r2}$ is equal to zero. v Cr1 and vCr2 have the same maximum positive value. $Q_{r1}$ is conducting in all modes during a positive input voltage. As indicated above, the simplified topology of Type 1 converter 110a with a positive input voltage is illustrated in FIG. 5A.

Mode I ($t_0$-$t_1$): At $t_0$, $Q_{r2}$ is turned on at zero voltage [$u_{ds2}(t_0)$] (equal to [$v(t_0)-v_{ji}(t_0)$]) and zero current [$i_{ds2}(t_0)$]. $L_{r1}$ starts to be charged by the input voltage source, thereby $i_{r1}$ increases linearly. $C_{r1}$, $C_{r2}$ ($C_{r1}=C_{r2}$ are small resonant capacitors) and $L_{r2}$ begin to resonate near $f_s$ while $C_{r1}$ and $C_{r2}$ release the stored transient energy to $C_o$. v and v are equal and decrease sinusoidally.

Mode II ($t_1$-$t_2$): At $t_1$, v and v drop to zero. $D_r$ turns on at zero voltage [$v_{dr}(t_1)$], allowing $i_{r2}$ to freewheel through $D_r$ ($i_{dr}=i_{r2}$), $i_{r1}$ continuously increases and $i_{r2}$ linearly decreases until $t_2$.

Mode III ($t_2$-$t_3$): At $t_2$: $Q_{r2}$ is turned off at zero voltage [$v_{ds2}(t_2)$]. $i_{r1}$ begins to freewheel through $D_r$ ($i_{dr}=i_{r1}-i_{r2}>0$). $L_{r1}$ and $C_{r2}$ begin to resonate. $C_{r2}$ stores the energy from $L_{r1}$ and vCr2 increases; while vCr1 is still zero. $i_{r2}$ reverses the direction and increases linearly.

Mode IV ($t_3$-$t_4$): At $t_3$, $i_{r1}$ is less than $i_{r2}$. $D_r$ turns off at both zero voltage [$v_{dr}(t_3)$] and zero current [$i_{dr}(t_3)$]. $L_{r2}$ resonates with $C_{r1}$ and its energy is transferred to $C_{r1}$, vCr1 continuously increases until it is equal to v at $t_4$, where $v_{ds2}$ is equal to zero.

Mode V ($t_4$-$t_5$): From $t_4$ to $t_5$, v and vCr2 increase equally. At $t_4$, the body diode $D_{q2}$ is conducting at zero voltage [$v_{ds2}(t_4)$]. $C_{r1}$, $C_{r2}$, and $L_{r2}$ again resonate near $f_s$ while $C_{r1}$ and $C_{r2}$ store the transient energy. vCr1 and vCr2 increases sinusoidally until they reach the maximum value at $t_5$, $L_{r1}$ stores the energy from the input source and $i_{r1}$ linearly increases to its initial value.

At $t_5$: $D_{q2}$ turns off, followed by turning on $Q_{r2}$, both at zero voltage and zero current. Then, the circuit returns to the original state.

$L_{r2}$, $C_{r1}$, and $C_{r2}$ serve as a lossless low drain-to-source impedance branch across $Q_{r2}$ near the switching frequency. The fundamental component of $v_{ds2}$ passes through the $L_{r2}C_{r1}C_{r2}$ network, and then it is rectified to a dc voltage by $D_r$. The tuned network stops resonating in Mode II due to zero state of vCr1 and vCr2. The input energy is first stored in $L_{r1}$ during Modes I, II, and V. Afterward, the transient energy of $L_{r1}$ is released to the tuned network during Modes III and IV. The LC network transfers the energy to the load through the rectifier diode $D_r$ during Modes II and III.

When $f_2<f'_r$: $Q_{r2}$ is turned off after $i_{r2}$ drops to zero. The circuit returns to Mode I after Mode II; in other words, $L_{r2}$, $C_{r1}$, and $C_{r2}$ begin to resonate again after $i_{r2}$ drops to zero. As soon as $Q_{r2}$ is tuned off, no current freewheels through $D_r$ and the circuit jumps into Mode IV instead of Mode III.

For the case of $f_s>f_r$, $Q_{r2}$ is turned off at the end of Mode I, while vCr1 and vCr2 drop to zero, thereby eliminating Mode II.

During the negative voltage input source, the operational circuit of each mode is similar to that in FIGS. 3A-3E. The direction of $i_{r1}$ is reversed. $Q_{r2}$ is conducting in all modes, while $Q_{r1}$ is switching analogues to $Q_{r2}$ during positive input voltage cycle. In other words, $Q_{r1}$ changes its role with $Q_{r2}$. Meanwhile, $C_{r1}$ switches its role with $C_{r2}$.

FIGS. 4A-4E illustrate the Type 2 converter 100b having a modified topology 110b in terms of $D_r$, $L_{r2}$, and transistor body diodes, which consequently changes the transient states of operation. Each switching operation mode of Type 2 converter for $f'_r<f_s<f_r$ with a positive voltage input source is presented.

At $t_0'$: (Circuit initial state) Assume that $i_{r1}$ has an initial value and $i_{r2}$ is equal to zero. Initially, $v_{cr1}$ and $v_{cr2}$ have the same maximum negative value. $Q_{r2}$ is conducting in all modes during a positive input voltage. FIG. 6A depicts the simplified topology of Type 2 converter with a positive voltage input source.

FIG. 6B1 illustrates the voltage and current waveforms of Type 2 converter with a positive input voltage wherein the switching frequency is less than the resonant frequency of the $L_{r1}C_{r2}$ and $L_{r2}C_{r2}$ network of FIG. 6A.

FIG. 6B2 illustrates the voltage and current waveforms of the Type 2 converter with a positive input voltage wherein the switching frequency is greater than the resonant frequency of the $L_{r1}C_{r1}C_{r2}$ network of FIG. 6A and less than the resonant frequency of the $L_{r1}C_{r2}$ and $L_{r2}C_{r1}$ networks of FIG. 6A.

FIG. 6B3 illustrates the voltage and current waveforms of the Type 2 converter with a positive input voltage wherein the switching frequency is greater than the resonant frequency of the $L_{r1}C_{r2}$ and $L_{r2}C_{r1}$ networks of FIG. 6A.

Mode I ($t_0'\sim t_1'$): At $t_0'$, $Q_{r1}$ is turned on at zero voltage $[v_{ds1}(t_0')]$ (equal to $[v_{cr2}(t_0')-v_{cr1}(t_0')]$) and zero current $[i_{ds1}(t_0')]$. $L_{r1}$ begins to store energy, thereby $i_{r1}$ increases linearly. $C_{r1}$, $C_{r2}$ and $L_{r2}$ resonate at a frequency close to $f_s$, while $C_{r1}$ and $C_{r2}$ release the transient energy to $L_{r2}$. $v_{cr1}$ and $v_{cr2}$ are equal and vary sinusoidally until they are equal to $V_o$ at $t_1'$.

Mode II ($t_1'\sim t_2'$): From $t_1'$, $v_{cr1}$ and $v_{cr2}$ are equal to $V_o$. $D_r$ turns on at zero voltage $[v_{dr}(t_1')]$, allowing $i_{r2}$ to freewheel through $D_r$ ($i_{dr}=i_{r2}$)

Mode III ($t_2'\sim t_3'$): At $t_2'$, $Q_{r1}$ is turned off at zero voltage $[v_{ds1}(t_2')]$. $i_{r2}$ reverses the direction and linearly increases, but it is less than $i_{r1}$. The current freewheels through $D_r$ ($i_{dr}=i_{r1}-i_{r2}>0$) to compensate the difference between $i_{r1}$ and $i_{r2}$. $L_{r1}$ and $C_{r1}$ begin to resonate. $C_{r1}$ releases the energy to $C_o$ and $v_{cr1}$ decreases; however, $v_{or2}$ is still equal to $V_o$.

Mode IV ($t_3'\sim t_4'$): From $t_3'$ to $t_4'$, $i_{r1}$ less than $i_{r2}$, leaving no current to freewheel through $D_r$. $D_r$ turns off at both zero voltage $[v_{dr}(t_3')]$ and zero current $[i_{dr}(t_3')]$ at $t_3'$. $L_{r2}$ and $C_{r2}$ resonate until $v_{or2}$ is equal to $v_{cr1}$ at $t_4'$.

Mode V ($t_4'\sim t_5'$): From $t_4'$ to $t_5'$, $v_{cr2}$ and $v_{cr2}$ are negative and equally increase until they reach the maximum. At $t_4'$, the body diode $D_{q1}$ is conducting at zero voltage $[v_{ds1}(t_4')]$.

At $t_5'$: $D_{q1}$ turns off, followed by turning on $Q_{r1}$ both at zero voltage and zero current. Then the circuit returns to the original state.

During the negative voltage input source, the direction of $i_{r1}$ is reversed. $Q_{r1}$ is conducting in all modes, while $Q_{r2}$ is switching analogues to $Q_{r1}$ during a positive input voltage cycle. The LC network in Type 2 converter 100b serves the same functionality as that in Type 1 converter 100a. However, vcr1 and vcr2 are alternating, which leads to a smaller root-mean-square (RMS) value than those in Type 1 converter 100a.

Section III

Circuit Analyses and Modeling

A. Steady-State Operating Characteristics

FIGS. 7A1-7D1 and 7A2-7D2 illustrate the analyses of the steady-state characteristics based on equivalent circuit models corresponding to different switching operation modes. All the analyses are based on Type 1 converter 100a in the operating region $f'_r<f_2<f_r$ (see FIG. 5B2), while a similar procedure can be adapted for Type 2 converter 100b. $C_o$ has much smaller impedance at switching frequency in comparison to $R_{load}$, thereby it performs similar to a voltage source $V_o$. The values of $C_{r1}$ and $C_{r2}$ are set equal to $C_r$ for the symmetry of the configuration. The transient waveforms and time intervals are inspected from FIG. 5B2.

In Mode I and V, $L_{r1}$ is directly connected to $V_{in}$ as equivalent circuits 100a11 and 100a51, respectively, while the network $L_{r2}C_{r1}C_{r2}$ is connected to $V_o$ as equivalent circuits 100a12 and 100a52, respectively [see FIG. 7A1]. $C_{r1}$ and $C_{r2}$ release the energy to the load Rload during resonance. The governing equations in terms of $i_{r1}$, $i_{r2}$, vCr1 and vCr2 are presented as $$\begin{cases} \dfrac{\partial i_{r1}(t)}{\partial t} = \dfrac{V_{in}}{L_{r1}} & (1) \\ \dfrac{\partial i_{r2}(t)}{\partial t} = \dfrac{v(t) - V_o}{L_{r2}} & (2) \\ \dfrac{\partial v(t)}{\partial t} = -\dfrac{i_{r2}(t)}{2C_r} & (3) \\ v(t) = v(t) & (4) \end{cases}$$

Applying the initial condition $i_{r2}(t_0)=0$, the transient states can be written as $$\begin{cases} i^I_{r1}(t) = \dfrac{V_{in}}{L_{r1}}(t-t_0) + i_{r1}(t_0) & (5) \\ i^I_{r2}(t) = \dfrac{v(t_0) - V_o}{Z_{r1}}\sqrt{2}\sin\dfrac{1}{\sqrt{2}}\omega_{r1}(t-t_0) & (6) \\ v^I(t) = v^I(t) = [v(t_0) - V_o]\times\cos\dfrac{1}{\sqrt{2}}\omega_{r1}(t-t_0) + V_o & (7) \end{cases}$$

where $\omega_{r1}=1/\sqrt{L_{r2}C_{r2}}$ is the angular resonant frequency of $L_{r2}C_{r1}$ network, and $Z_{r1}=\sqrt{L_{r2}/C_r}$ is the characteristic impedance of $L_{r2}C_{r1}$ network.

During Mode II [see FIG. 7B1], relating to equivalent circuit 100a21, the voltage across $L_{r1}$ is $V_{in}$ and, relating to equivalent circuit 100a22, the voltage across $L_{r2}$ is $V_o$. The governing equations can be written as $$\begin{cases} \dfrac{\partial i_{r1}(t)}{\partial t} = \dfrac{V_{in}}{L_{r1}} & (8) \\ \dfrac{\partial i_{r2}(t)}{\partial t} = -\dfrac{V_o}{L_{r2}} & (9) \end{cases}$$

The transient states are calculated as $$\begin{cases} i_{r1}^{II}(t) = \frac{V_{in}}{L_{r1}}(t-t_1) + i_{r1}(t_1) & (10) \\ i_{r2}^{II}(t) = -\frac{V_o}{L_{r2}}(t-t_1) + i_{r2}(t_1) & (11) \\ v^{II}(t) = v^{II}(t) = 0 & (12) \end{cases}$$

During Mode III [see FIG. 7C1], $C_{r2}$ stores the energy from $L_{r1}$ via equivalent circuit 100a31, while $L_{r2}$ releases the energy to the load via equivalent circuit 100a32. The governing equations are presented as $$\begin{cases} \frac{\partial i_{r1}(t)}{\partial t} = \frac{V_{in} - v(t)}{L_{r1}} & (13) \\ \frac{\partial i_{r2}(t)}{\partial t} = -\frac{V_o}{L_{r2}} & (14) \\ \frac{\partial v(t)}{\partial t} = \frac{i_{r1}(t)}{C_r} & (15) \end{cases}$$

Therefore, $i_{r2}$ decreases linearly to zero and v linearly increases, with the boundary condition $v(t_2)=0$, yielding $$\begin{cases} i_{r1}^{III}(t) = i_{r1}(t_2)\cos\omega_{r2}(t-t_2) + \frac{V_{in}}{Z_{r2}}\sin\omega_{r2}(t-t_2) & (16) \\ i_{r2}^{III}(t) = \frac{V_o}{L_{r2}}(t-t_2) + i_{r2}(t_2) & (17) \\ v^{III}(t) = 0 & (18) \\ v^{III}(t) = -V_{in}\cos\omega_{r2}(t-t_2) + i_{r1}(t_2)Z_{r2}\sin\omega_{r2}(t-t_2) + V_{in} & (19) \end{cases}$$

where $\omega_{r2}=1/\sqrt{L_{r1}C_r}$ is the angular resonant frequency of $L_{r1}C_{r2}$ network 100a31, and $Z_{r2}=\sqrt{L_{r1}/C_r}$ is the characteristic impedance of $L_{r1}C_{r2}$ network 100a31.

Referring to FIG. 7D1, in Mode IV, $L_{r1}$ is resonating with $C_{r1}$ and $C_{r2}$, via equivalent circuit 100a41 while $L_{r2}$ is resonating with $C_{r1}$ via equivalent circuit 100a42, yielding $$\begin{cases} \frac{\partial i_{r1}(t)}{\partial t} = \frac{V_{in} + v(t) - v(t)}{L_{r1}} & (20) \\ \frac{\partial i_{r2}(t)}{\partial t} = \frac{v(t) - V_o}{L_{r2}} & (21) \\ \frac{\partial v(t)}{\partial t} = \frac{i_{r1}(t) + i_{r2}(t)}{C_r} & (22) \\ \frac{\partial v(t)}{\partial t} = \frac{i_{r1}(t)}{C_r} & (23) \end{cases}$$

By applying the boundary conditions $v(t_3)=0$, $v(t_3)=V_o$, $i_{r1}(t_3)+i_{r2}(t_3)=0$, one can find that $$\begin{cases} i_{r1}^{IV}(t) = i_{r1}(t_3)\cos\omega_{r2}(t-t_3) + \frac{V_{in}-V_o}{Z_{r2}}\sin\omega_{r2}(t-t_3) & (24) \\ i_{r2}^{IV}(t) = i_{r2}(t_3)\cos\omega_{r1}(t-t_3) - \frac{V_o}{Z_{r1}}\sin\omega_{r1}(t-t_3) & (25) \\ v^{IV}(t) = -V_o\cos\omega_{r1}(t-t_3) + V_o & (26) \\ v^{IV}(t) = [V_o - V_{in}]\cos\omega_{r2}(t-t_3) + i_{r1}(t_3)Z_{r2}\sin\omega_{r2}(t-t_3) + V_{in} & (27) \end{cases}$$

where $L_{r1}$ and $L_{r2}$ are set equal to $L_r$ for impedance matching of multi-resonant network ($\omega_{r1}=\omega_{r2}=\omega_r$ and $Z_{r1}=Z_{r2}=Z_r$). In steady-state operation, the integral of the resonant inductor voltage ($v_{Lr1}$) over one switching period must be zero, which yields $$\int_{t_0}^{t_0+T_s} v_{Lr1}(t)dt = \int_{t_0}^{t_0+T_s}[v(t)-v(t)+V_{in}]dt = 0. \quad (28)$$

By setting the resonant period $t_{r2}=t_{4-t}=T_{r2}/4=\pi/2\omega_r$, one can find that $$F[V_{in}, V_o, i_{r1}(t_2)] = 0. \quad (29)$$

On the other hand, the integral of the output capacitor current (i) over one switching period being zero, yields $$\int_{t_0}^{t_0+T_s} i(t)\,dt = \int_{t_0}^{t_0+T_s}\left[i_{dr}(t) - \frac{V_o}{R_L}\right]dt = 0. \quad (30)$$

Applying the boundary condition $v(t_3)=V_o$, one can find another relationship that $$G[V_{in}, V_o, i_{r1}(t_2), R_L, f_s] = 0. \quad (31)$$

Figure 8:
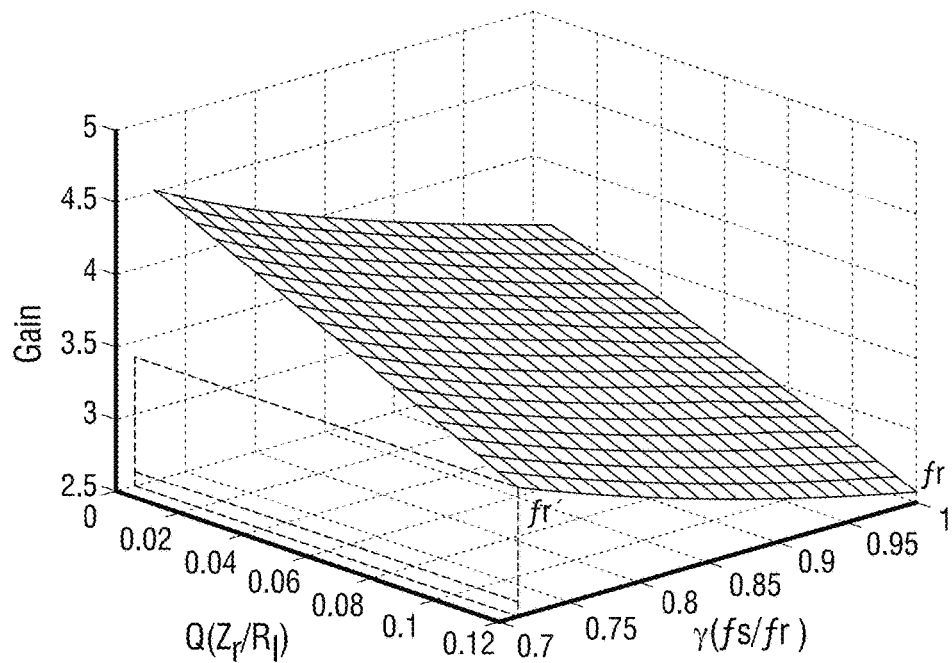
FIG. 8 illustrates voltage gain characteristics of the Type 1 and Type 2 resonant converter.

Solving (29)-(31) yields $$\begin{cases} A_x\left(\frac{1}{f_s} + \frac{2-\pi}{2\omega_r} + \frac{\sin\theta_y}{\omega_r}\right) + A_y\frac{\pi-4}{2\omega_r} - \\ A_xA_y\frac{2}{f_sR_L} + \frac{Z_r(\cos\theta_y - 2)}{\omega_r} = 0 & (32) \\ A_x(1-\cos\theta_y) - A_y + Z_r\sin\theta_y = 0 & (33) \end{cases}$$

where $A_x=V_{in}i_{r1}(t_2)$, $A_y=V_o/i_{r1}(t_2)$, and $\theta_y=2\omega_rV_o/f_sR_Li_{r1}(t_2)$. Therefore, the dc voltage conversion ratio of the converter in steady state can be calculated as $$A = 1 + \frac{1}{(1/4Q)\left[1 - \sqrt{(1+2Q)^2 - 8Q(1+((8-\pi)/4\pi)\gamma)}\right] - (1/2)} \quad (34)$$

where $Q=Z_r/R_L$ is the characteristic impedance of multi-resonant network, $\gamma=f_s/f_r$ denotes the normalized switching frequency. The voltage ratio is load-dependent; meanwhile, it decreases as the switching frequency increases, shown in FIG. 8. The steady-state analyses are valid for Type 2 converter 100b, even though the transient states are different from the steady-state conditions.

By applying boundary condition $i_{r2}(t_0)=0$ and setting the transistor turn-on period to $t_{on}=t_1-t_0=T_s/2$ in (6) and (11), one can find that $f_r=\sqrt{2}f_r'$. The switching period should be larger than addition of the resonant periods, corresponding to $f_r$ and $f_r'$ $$\frac{1}{2}t_r + \frac{1}{2\sqrt{2}}t_r' < \frac{1}{f_s}. \quad (35)$$

Therefore, the soft-switching frequency range can be presented as $$\frac{1}{\sqrt{2}} < \gamma < 1. \quad (36)$$

According to (34), the load impedance should match the network impedance and satisfy (37)

$$Q < \frac{1}{2} + \frac{8-\pi}{4\pi}\gamma - \frac{1}{2}\sqrt{\left(1 + \frac{8-\pi}{2\pi}\gamma\right)^2 - 1}. \quad (37)$$

The Type 2 circuits are shown in FIG. 7(a2) for Modes I and V, 7(b2) for Mode II, 7(c2) for Mode III and 7(d2) for Mode IV.

In FIG. 7A2, equivalent circuits 100b11 and 100b51 are identical to equivalent circuits 100a11 and 100a51 whereas in equivalent circuits 100b12 and 100b52, the voltage $V_0$ is not included as compared to equivalent circuits 100a12 and 100a52.

In FIG. 7B2, equivalent circuits 100b21 and 100b22 are identical to equivalent circuits 100a21 and 100a2.

In FIG. 7C2, equivalent circuit 100b31 differs from equivalent circuit 100a31 by the addition of output voltage $V_0$ in series with Lr1 and Cr1. Equivalent circuit 100b32 is identical to equivalent circuit 100a32.

In FIG. 7D2, equivalent circuit 100a42 is identical to equivalent circuit 100a41. Equivalent circuit 100a42 includes an output voltage $V_0$ not included in equivalent circuit 100b42.

For the Type 2 circuits in FIGS. 7A2 to 7D2, the electrical transient states have slight differences from the Type 1 circuits in FIGS. 7A1 to 7D1. The differences relate to Eq. 1 to Eq. 27. However the steady state response of the Type 2 circuits is the same as the response of the Type 1 circuits and as expressed by Eq. 31 to Eq. 37.

B. Electrical Stress

For Type 1 converter 100a, the maximum values of voltages across the resonant capacitors, at are equal, and by applying the boundary condition $v(t_1)=0$ into (7), one can find that $$v_{,max} = v_{,max} = \left(1 - \cos^{-1}\frac{\pi}{\sqrt{2}\,\gamma}\right)AV_{in} \quad (38)$$

where $v_{,max}$ and $v_{,max}$ and are close to twice of $V_o$ if $\gamma$ is close to $1/\sqrt{2}$. Since the transistors $Q_{r1}$ and $Q_{r2}$ are in parallel with two resonant capacitors, the drain-to-source voltage across each transistor ($v_{ds}$) is equal to the voltage compensation between two capacitors $$v_{ds}(t) = v(t) - v(t). \quad (39)$$

The transistor voltage reaches its maximum value during Mode IV. By applying the boundary condition $v(t_4) - v(t_4)=0$ into (26) and (27), one can find the maximum voltage stress on the transistor from the differential equation $[v^{IV}(t) - v^{IV}(t)]' = 0$ $$v_{ds,max} = -\left[\left(2 - \frac{1}{A}\right)\sqrt{\frac{1}{1+((A-1)/(2A-1))^2}} + \left(1 - \frac{1}{A}\right)\sqrt{\frac{1}{1+((2A-1)/(A-1))^2}} - \left(1 - \frac{1}{A}\right)\right]AV_{in} \quad (40)$$

where $v_{ds,max}$ is close to $-V_o$, which is half of $-vCr1,max$. Note that vCr1,max and vCr2, max increase as the switching frequency increases, while $v_{ds,max}$ remains nearly constant. Since the rectifier diode Dq1 is in parallel with one resonant capacitor Qr1, the maximum voltage stress on diode Dq1 is equal to the maximum voltage stress on the resonant capacitor Qr1

$$vdr,max = vCr1,max \quad (41)$$

For Type 2 converter 100b, the maximum voltage stresses on resonant capacitors are vCr1, max=vCr2, max=

$$v_{,max} = v_{,max} = \left(\cos^{-1}\frac{\pi}{\sqrt{2}\,\gamma}\right)AV_{in} \quad (42)$$

where vCr1, max and vCr2, max are close to $-V_o$ if $\gamma$ is close to $1/\sqrt{2}$. However, $v_{ds,max}$ is the same as that in Type 1 converter 100a. Therefore, Type 2 converter 100b has less voltage stresses across resonant capacitors and rectifier diode in comparison to Type 1 converter 100a; nevertheless, the voltage stresses across transistors are equal. In addition, both converters have less voltage stresses on the transistors due to existence of two-split resonant capacitors.

For both converters 100a and 100b, when the particular converter is operating in steady-state condition, one can obtain from the input/output power balance that $$V_{in}I_{in} = \frac{V_o^2}{R_L}. \quad (43)$$

Therefore, the average current in a switching period carried by $L_{r1}$ can be obtained as $$i_{r1,Avg} = \frac{A^2}{R_L}V_{in}. \quad (44)$$

Since the peak current $i_{r1,pv}$ carried by $L_{r1}$ appears at $t_2$, it can be calculated by solving (5), (30), and (44)

$$i_{r1,pk} = i_{r1}(t_2) = \frac{V_{in}}{2}\left[\frac{A^2}{R_L} + \frac{1}{2L_rf_s} - \frac{1}{8L_rf_r} + \sqrt{\left(\frac{A^2}{R_L} + \frac{1}{2L_rf_s} - \frac{1}{8L_rf_r}\right)^2 - \frac{4A}{f_sL_rR_L}}\right]. \quad (45)$$

Due to the fact that $L_{r2}$ is in series with the load, Rload, the average current in a switching period carried by $L_{r2}$ is equal to that carried by $R_L$, therefore $$i_{r2,avg} = \frac{A}{R_L}V_{in}. \quad (46)$$

The peak current $i_{r2,peak}$ carried by $L_{r2}$ appears during Mode I where $i_{r2}(t)$ satisfies (6), yielding $$i_{r2,pk} = \sqrt{2}\,\frac{v(t_0) - V_o}{R_L} = -\sqrt{2}\left(R_L\cos\frac{\pi}{\sqrt{2}\,\gamma}\right)^{-1}AV_{in}. \quad (47)$$

According to the analyses in Section II, the current through the transistors would be $$i_{ds}(t) = i_{r1}(t) + \tfrac{1}{2} i_{r2}(t). \tag{48}$$

Thereby, the average current and the peak current through the transistors Qr1 and Qr2 can be acquired from (5), (6), (10), and (11) as $$\begin{cases} i_{ds,avg} = \dfrac{1}{T_s} \int_{I,II,V} \left[ i_{r1}(t) + \dfrac{1}{2} i_{r2}(t) \right] dt \\ \qquad = \left[ \dfrac{\pi}{4 Z_r \gamma} + \dfrac{A\gamma}{2\pi Z_r}\left(1 - \cos^{-1}\dfrac{\pi}{\sqrt{2}\,\gamma}\right) \right] V_{in} \\ i_{ds,pk} \approx \dfrac{1}{2} i_{r1,pk} + \dfrac{1}{2} i_{r2,pk}. \end{cases} \tag{49} \tag{50}$$

Moreover, the average current and the peak current through the diode Dr can be expressed as $$\begin{cases} i_{dr,avg} = i_{r2,avg} = \dfrac{A}{R_L} V_{in} \\ i_{dr,pk} \approx \max(i_{r1,pk}, i_{r2,pk}). \end{cases} \tag{51} \tag{52}$$

Figure 10:
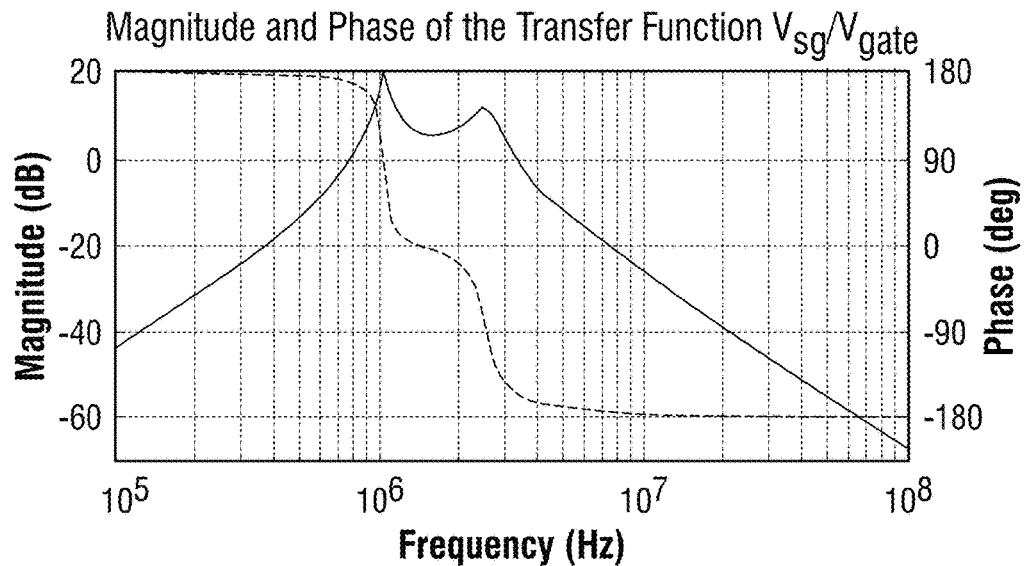
FIG. 10 illustrates the frequency response of the transfer function of the resonant tank of the resonant gate drive circuit of FIG. 9.

Note that the current stress on the diode Dr is much less than those on the transistors Qr1. The diode Dr is conducting for rectification during a very short period in comparison to quasi-resonant topologies such as illustrated in FIG. 10.

In summary, the electrical stresses of active components and passive components are load-dependent. They can be adjusted through a variable switching frequency. One can reduce the stresses by either increasing the switching frequency or reducing the load resistance. Furthermore, the voltage stresses across the transistors and the current stress on the diode are less than other resonant topologies [11], [13].

Section IV

Gate Drive and Control Scheme

A. Resonant Gate Drive

The effect of gate drive on overall performance and efficiency of the converter is important, especially in high switching frequency operation. Large amount of energy is dissipated by using conventional square voltage hard-switched gating, since there is no energy recovery [22], [23]. At high switching frequency, resonant gating can significantly reduce the gate drive losses by recovering gate charge energy each cycle. Many efforts focus on designing active RGD circuits, which consist of auxiliary switch bridges and passive components [22]-[27]. In these circuits, the turning-on and turning-off times are controllable, which makes them suitable to adjust duty ratio or switching frequency. However, the auxiliary switch bridges require additional drivers, which consequently increase the circuit size and losses. Furthermore, at high switching frequency, it becomes difficult to catch zero voltage and zero current crossing by using an active bridge drive.

To reduce driver complexity, passive RGD circuits are investigated for fixed frequency and fixed duty ratio gate drives [19]-[21]. Such drive circuits utilize LC resonant tank to generate trapezoidal or sinusoidal voltage gating. The gate signals, which are generated by relaxation oscillators, pass through LC resonant tanks. The LC networks behave as pass filters to acquire the demanded harmonics of gate signals, which cause no mutation in gating voltage. Passive RGD circuits generate gating signals with fixed frequency and fixed duty ratio. They are suitable for converters where fixed switching operation is demanded to acquire maximum efficiency, i.e. the proposed converter in this paper. The power control strategy can be achieved by using simple module on/off control, which has advantages in terms of fast response, easy implementation and high stability.

Figure 9:
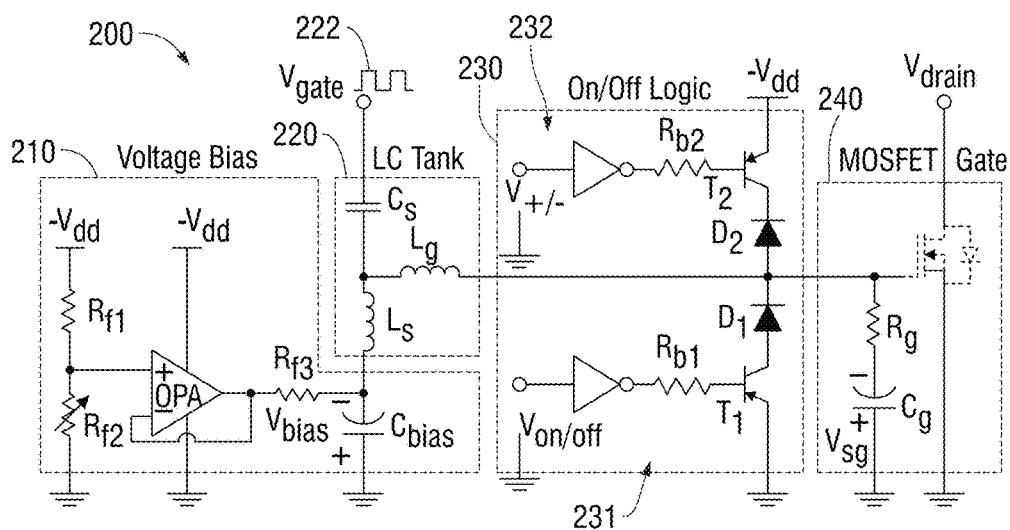
FIG. 9 illustrates a resonant gate drive circuit for the Type 1 converter.

FIG. 9 illustrates a low-loss passive RGD circuit 200 adopted according to one embodiment of the present disclosure to achieve resonant gating. The RGD circuit 200 includes a voltage bias module 210, a tuned LC resonant tank 220, an On/Off Logic module 230 and a MOSFET gate 240. The tuned LC tank 220 sets the transfer function from the oscillator at Vgate 222 to the MOSFET transistor gate 240. The resonant tank 220 is designed to extract the fundamental component of the gate signal Vgate, which consequently generates a sinusoidal gating. The input capacitor $C_s$ is resonant with the shunt inductor $L_s$ to perform as a high-pass filter. $L_g$ is selected to resonate with the parasitic gate capacitor $C_g$ for a sinusoidal gating at a fundamental component of switching frequency. A second resonant frequency apparent in the transfer function is damped by $L_g$ and the gate resistance $R_g$ in order to avoid higher frequency oscillation.

FIG. 10 illustrates the frequency response of the transfer function. By properly adjusting $C_s$ and $L_s$, one can set the magnitude and the bandwidth of oscillation.

Referring again to FIG. 9, a blocking capacitor $C_{bias}$ in the voltage bias circuit 210 is connected to $L_s$ in the shunt leg of the LC resonant tank 220. $C_{bias}$ is charged by a voltage follower effected by Vbias circuit 210, thereby maintaining a bias voltage Vbias close to MOSFET threshold voltage at its gate 240. By adjusting the resistor $R_{f2}$ of the voltage divider OPA, the bias voltage Vbias of the resonant gating 240 can be regulated, which, in turn, sets the switching duty ratio via On/Off logic module 230. The damping resistor $R_{f3}$ is located between $C_{bias}$ and the voltage follower OPA in order to block high-order harmonic feedback. In addition, $R_{f3}$ and $C_{bias}$ should be carefully selected to acquire fast transient response.

B. Control Strategy

The converters 100a and 100b are intended to operate at fixed switching frequency and fixed switching duty ratio to achieve high efficiency operation, though the voltage gain can be regulated by variable switching frequency. On the other hand, module on/off control strategy realizes the advantages in terms of easy implementation, fast transient response, wide load range and higher efficiency [19], [27]. The output voltage regulation is achieved through enabling the converter module and delivering power when the output voltage falls below a demanded threshold. When the output voltage rises above the threshold, the module is disabled, leaving the output capacitor to feed the load.

This control scheme separates the control and the power processing, which, in turn, increases the circuit efficiency and operation accuracy. When the module is enabled, the converter operates at a fixed high-efficiency point; when disabled, no power is delivered through the circuit, which consequently removes additional loss. A module hysteretic on/off control is a varied-module-frequency control and dependent on feedback sampling frequency. In comparison to hysteretic control, module PWM on/off control is a fixed-module-frequency control and is superior in terms of faster response and more accuracy [28]. Functionally, the converter module is enabled and disabled at a fixed on/off frequency and an adjustable on/off duty ratio. The load power is regulated by adjusting the module on/off duty ratio.

To achieve the PWM on/off control strategy, logical on/off module 230 is added on the gate driver 240 for Type 1 converter 100a, as demonstrated in FIG. 9. The directions of bi-polar junction transistor (BJT)-diode bridges 231 and 232 are reversed in the case of Type 2 converter 100b. The PWM comparator delivers the enabling signal $v_{on/off}$ to $T_1$, according to the controller feedback. When $T_1$ in BJT-diode bridge 231 is turned on, the MOSFET gate 240 is pulled to ground and disabled. High output resistance of $D_1$ and $T_1$ blocks the high-frequency oscillating signal from the LC tank 220. When $T_1$ is turned off, the voltage follower OPA starts to charge $C_{bias}$, thereby the biased resonant gating is recovered at MOSFET gate 240. The values of $R_{f3}$ and $C_{bias}$ in voltage bias module 210 determine the charging time, corresponding to the transient response to enable energy recovery.

Another logical bridge 232 including $T_2$ and $D_2$ is added on the gate driver 240 to implement input polarity identification. Based on the polarity of input, the comparator delivers $v_{+/-}$ to $T_2$ in On/Off Logical bridge 232 with a choice of either leaving the gate 240 resonant or enabling the gate all the time.

In conjunction with FIGS. 2-6 and 9, FIG. 11 presents the block diagram of the control system 300 for the bridgeless resonant AC/DC converters 100a or 100b.

As described above, FIG. 9 illustrates low-loss passive RGD circuit 200. Therefore, the RGD CIRCUIT 200 in FIG. 11 includes the voltage bias module 210, the LC tank 220 with gate voltage (Vgate)_222, the On/Off logic module 230 and the MOSFET gate 240 that are illustrated in FIG. 9. The MOSFET 240, dotted portion in FIG. 9, is one of the two MOSFETs of the Type 1 converter. Two such RGD circuits 200 provide voltage signals Vsg1 and Vsg2 from the MOSFET gate 240 in FIG. 9 to the Type 1 converter 100a. For Type 2 converter, the directions of bi-polar junction transistor (BJT)-diode bridges 231 and 232 are reversed in the case of Type 2 converter 100b, and the direction of MOSFET 240 is reversed.

Figure 11:
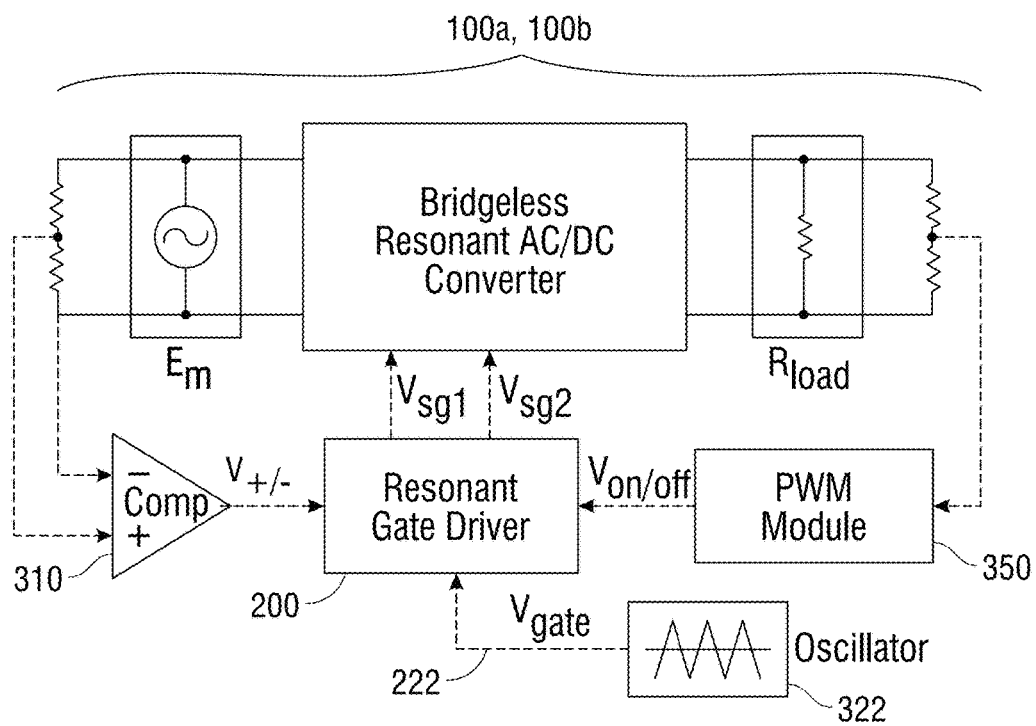
FIG. 11 illustrates a block diagram of module on/off control and polarity identification for resonant switching and gating.

In FIG. 11, the RGD 200 receives polarity identification voltage signal V+/− from voltage comparator 310 that compares the electromotive voltage Em that is input to the converter 100a or 100b.

Figure 12:
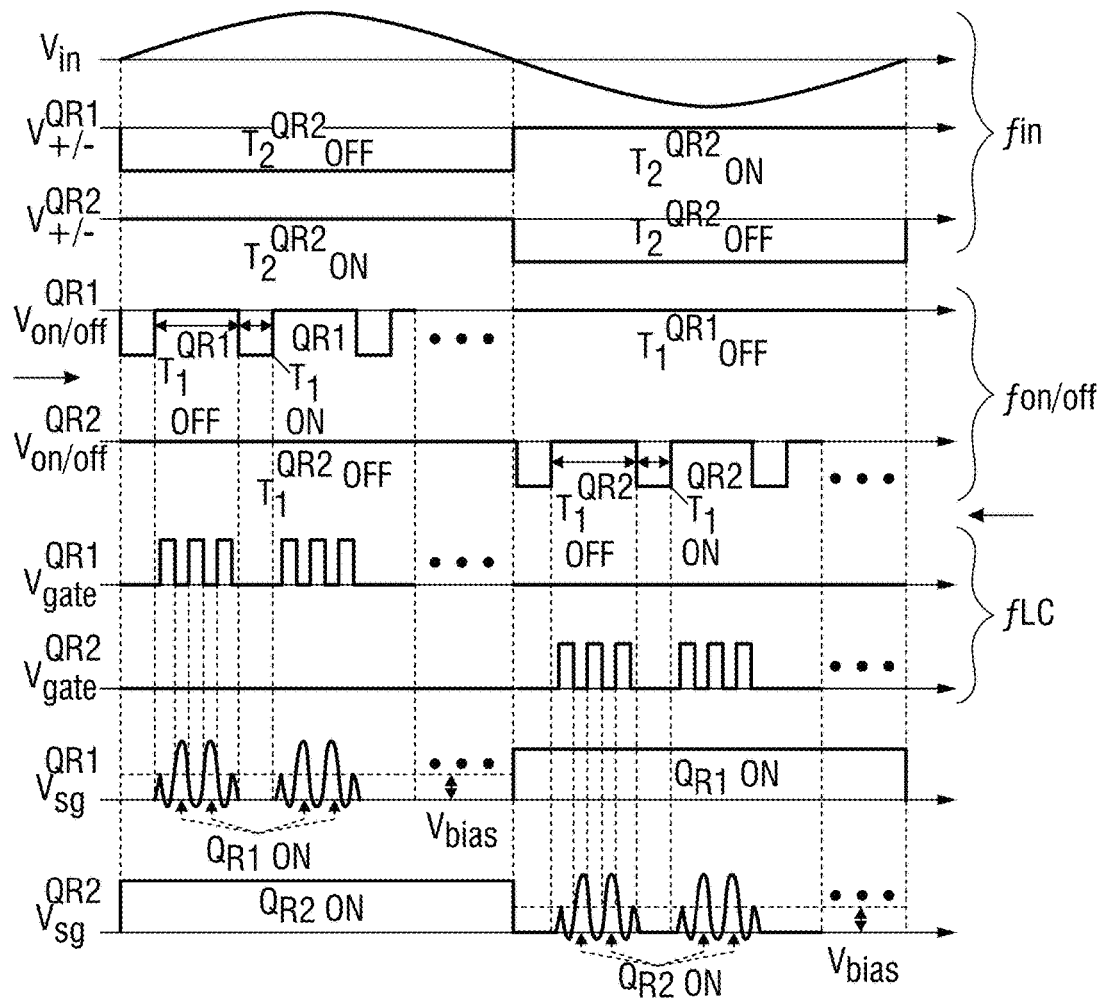
FIG. 12 illustrates a resonant gating signal corresponding to on/off control signal and polarity identification signal, in the case of the Type 1 converter.

Comparator 310 in FIG. 11 generates polarity identification V+/− which is input to on/off logical bridge 232 in FIG. 9. PWM module 350 in FIG. 11 has an output Von/off which is input to on/off logical bridge 231 in FIG. 9. Oscillator 322 has output Vgate 222 which is the input to LC resonant tank 220 in FIG. 9. The resonant gating signals, generated by the gate driver 200 and control system 300 include three main frequency components that are illustrated in FIG. 12, wherein fin is the input source frequency; fon/off is the on/off modulation frequency and fLC is the resonant frequency. During each half cycle of $v_{in}$, one of the MOSFETs 240 in FIG. 9 is enabled all the time while the other one is disabled during off time of PWM module 350. During the module-on time, one MOSFET gate is resonant at a switching frequency fs much higher than the on/off modulation frequency fon/off.

Figure 13:
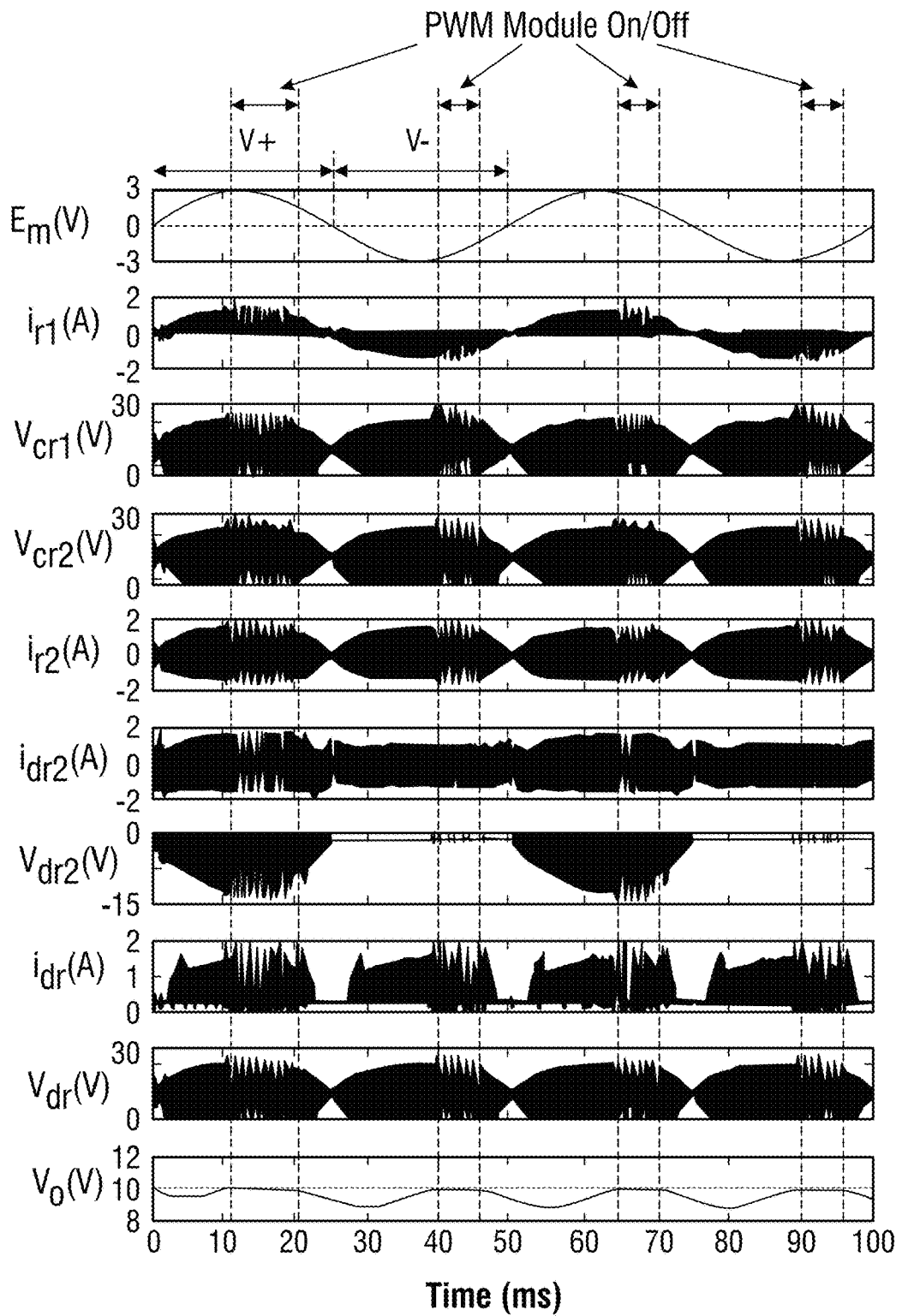
FIG. 13 illustrates simulation waveforms of the Type 1 converter with 2-$V_{rms}$ alternating input voltage, using module on/off control.

The closed-loop simulation with a low-frequency alternating input voltage is demonstrated in FIG. 13. The results confirm the fast transient response of module PWM on/off control scheme as well as good performance of the power converter at low-amplitude input voltages. Increasing the on/off modulation frequency can decrease the size of output capacitor. However, the driver efficiency decreases as the modulation frequency increases, which brings the tradeoff between the driver efficiency and capacitor size. In spite of this, most of main power components are based on high soft-switching frequency, enabling miniaturization and high efficiency operation.

Section V

Experimental Results

Figure 14:
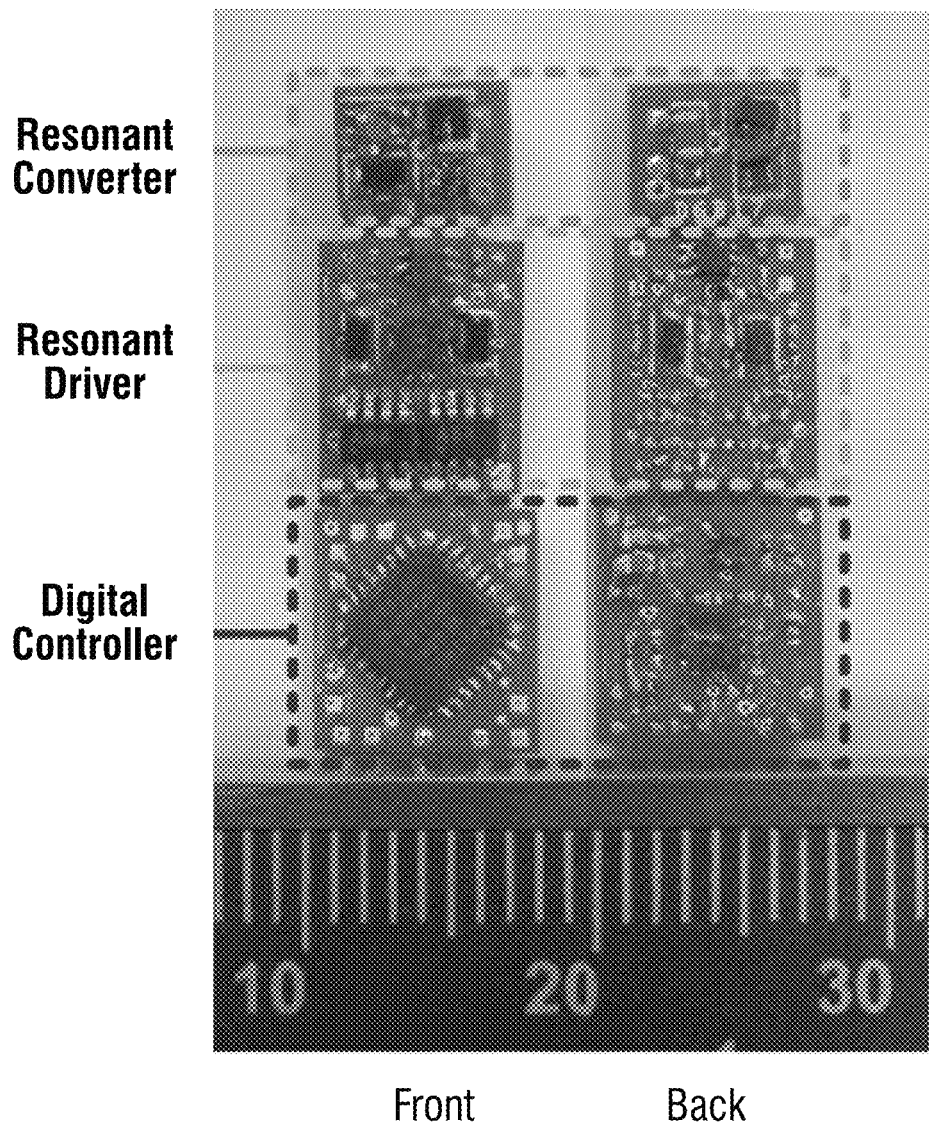
FIG. 14 illustrates Front ($L_{r1}$, $C_{r1}$, $C_{r2}$, $Q_{r1}$ and $Q_{r2}$) and back ($L_{r2}$, $D_r$ and $C_o$) views of 100 mg, 2 MHz experimental prototype of the Type 1 resonant ac-dc converter according to embodiments of the present disclosure, as well as the resonant driver and digital controller.
Figure 16A:
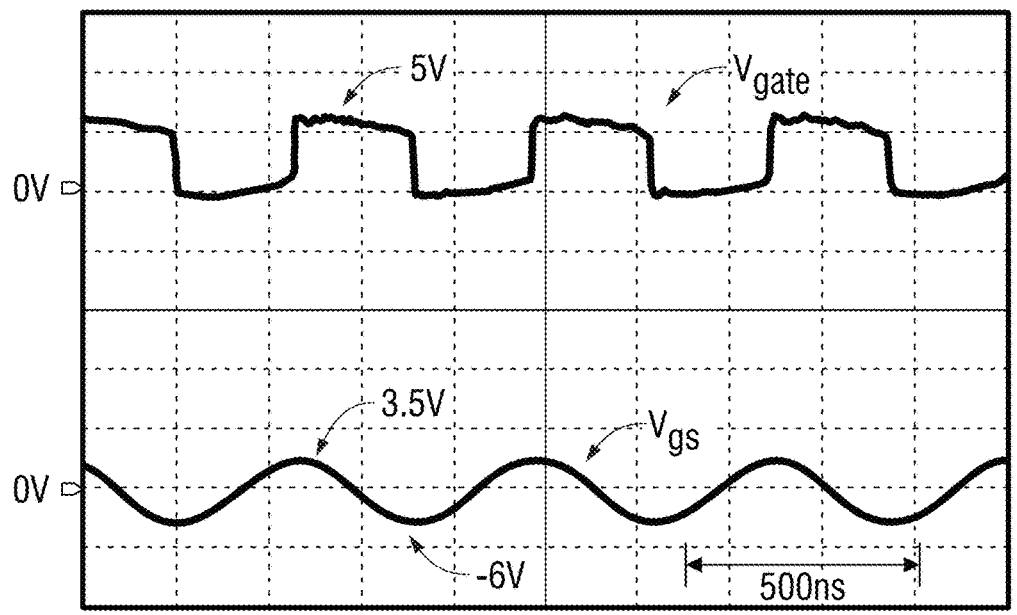
FIG. 16A illustrates experimental waveforms of the Type 1 converter operating with $V_{in}$=3 V (dc), $V_o$=8.1 V (dc), $R_{load}$=100Ω, during 2 MHz switching, for $v_{gate}$ and $u_{gs}$.
Figure 16B:
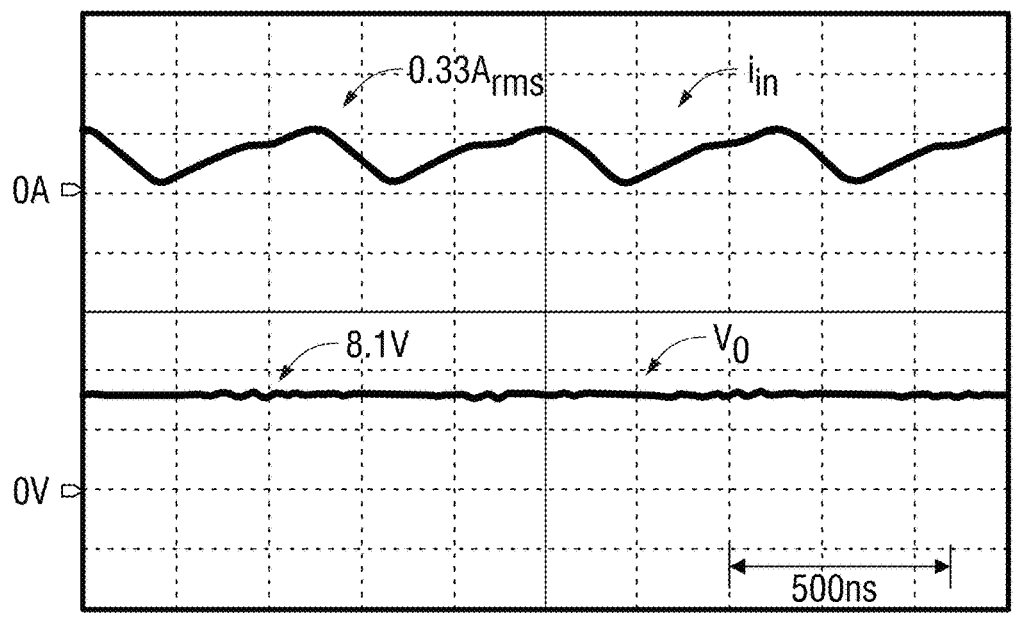
FIG. 16B illustrates experimental waveforms of the Type 1 converter operating with $V_{in}$=3 V (dc), $V_o$=8.1 V (dc), $R_{load}$=100Ω, during 2 MHz switching, for $i_{in}$ and $V_o$.
Figure 17A:
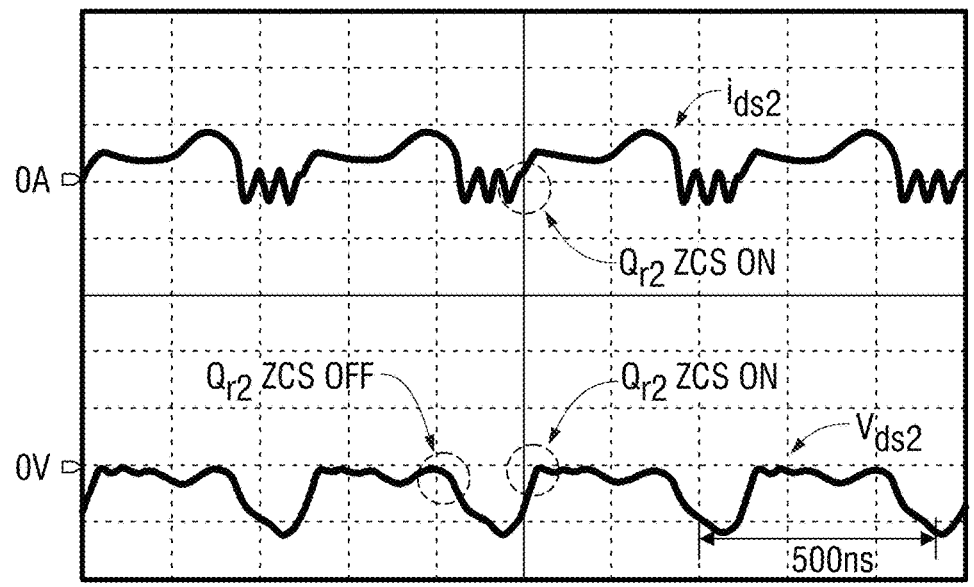
FIG. 17A illustrates experimental waveforms illustrating resonant switching of the Type 1 converter, during 2-MHz switching, for $i_{ds2}$ and $V_{ds2}$.
Figure 17B:
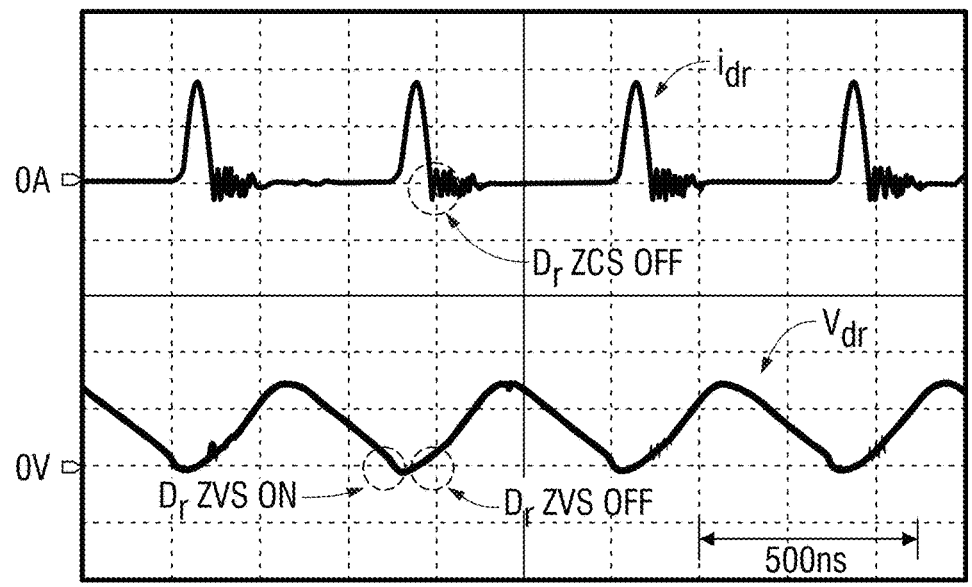
FIG. 17B illustrates experimental waveforms illustrating resonant switching of the Type 1 converter, during 2-MHz switching, for $i_{dr}$ and $V_{dr}$.

Experimental tests are presented in this section to elaborate performance of the proposed converter particularly under light-load condition and limited footprint. As illustrated in FIG. 14, a 5-mm×6-mm, 100-mg prototype of power stage is developed to validate 2-MHz resonant operation of Type 1 converter 100a. Table I below lists parameters of all the components adopted in resonant power stage and resonant gate driver. The resonant switching frequency is set to 2 MHz with consideration of gate charge speed and miniature package of the commercially available transistors. Higher switching frequency can be achieved through radio frequency transistors with larger package sizes. According to the input energy sources referred in Section I, the input voltage is set to a range of 0.25-3 $V_{rms}$ while the maximum average current reaches up to 300 mA. A power amplifier circuit is fabricated to emulate the alternating input energy source.

TABLE I

Component Parameters in Resonant Converter and Driver

| Circuit Component | Nominal Value | Part Number |
|---|---|---|
| $L_{r1}$ | 0.68 µH | Coilcraft PFL1609-681 |
| $L_{r2}$ | 0.68 µH | Coilcraft PFL1609-681 |
| $C_{r1}$, $C_{r2}$ | 4.7 nF | MLCC Array, 50 V |
| $C_o$ | 22 µF | X7R Ceramic, 10 V |
| $Q_{r1}$, $Q_{r2}$ | | AOC2411 (P-channel) |
| $D_r$ | | CDBER0130L |
| $L_s$ | 4.7 µH | Coilcraft PFL1609-472 |
| $L_g$ | 4.7 µH | Coilcraft PFL1609-472 |
| $C_g$ | 3.3 nF | C0G Ceramic, 10 V |
| $C_{bias}$ | 10 nF | C0G Ceramic, 10 V |
| $R_{f1}$ | 100 kΩ | Standard SMD |
| $R_{f2}$ | 22 kΩ | Standard SMD |
| $R_{f3}$ | 10 Ω | Standard SMD |
| $R_{b1}$, $R_{b2}$ | 100 Ω | Standard SMD |
| $T_1$, $T_2$ | | EMZ1T2RCT-ND (NPN/PNP) |
| $D_1$, $D_2$ | | DSF01S30SC |

A. Design Specification for EM Transducer

The kinetic energy harvesters are intended to convert mechanical energy present in the ambient vibration sources into electrical energy [29]. Typically, EM and EAP, including electrostatic, piezoelectric, and dielectric elastomer, transduction mechanisms are used to convert kinetic energy into electrical energy [30]. In comparison to EAP transducers, EM transducers outperform in terms of high output current, high efficiency, and high power density [1], [31] [33].

FIG. 15A illustrates a scheme and electrical model of a permanent magnet (having poles N and S) linear transducer 210', where k is the spring stiffness constant; m is the proof-mass; $D_P$ represents the parasitic damper; $K_E$ denotes the generated voltage coefficient; and $z$ is the relative movement and X is the absolute movement of the linear transducer 210'. The detailed analyses and modeling of the EM transducers are presented in [1], [33]. Typically, the extrinsic vibrations introduce internal spinning or linear oscillation between the electrical damper 21'2 (an armature with coil winding) and the proof-mass (a stator with permanent magnets 214). The internal movement results in a periodically variable magnetic flux in the coil winding, which, in turn, induces a corresponding alternating electromotive force (EMF) input Em in FIG. 11. [34].

Most of these EM transducers share the same characteristics as electrical generators. However, their output voltage and power are erratic and low, which brings challenges in efficient PEI design. The PEIs are required to process the small and irregular voltage/power from EM transducers and then feed the load with a constant voltage/power. The miniaturization of PEI is an important aspect of the design to increase the power density due to the limited space in majority of the systems. The proposed resonant ac-dc converters are intended to convert and step up the alternating low voltage into a dc voltage in the case of EM energy harvesting applications. The switching frequency of the converter is required to be higher than the vibrating frequency of transducers.

Referring to FIG. 15B, the electrical model of an EM transducer 210' can be represented as an induced EMF $E_m$ in series with a self-inductance $L_m$ and an internal resistor $R_m$ of the electrical damper. For the purposes of circuit integration, $L_{r1}$ of the converter 100a can be replaced by of the EM transducer 210. Therefore, the self-inductance of the damper can be used as part of the inductance on the circuit design and operation. In the majority of tiny EM transducers, small output impedance is acquired from winding with a low-permeability core [1], [29]. In such cases, $L_{r2}$ can be set equal to $L_m$ for the impedance matching of multiresonant network. Due to the small inductance, high-frequency switching operation can be achieved by setting high natural frequency. According to (36), the natural frequency $f_r$ is chosen slightly lower than $\sqrt{2}f_s$. The characteristic impedance and resonant capacitors are determined as $$\begin{cases} Z_r = 2\pi f_r L_m & (53) \\ C_r = \dfrac{1}{4\pi f_r Z_r}. & (54) \end{cases}$$

Thus, the Type 1 converter 100a' illustrated in FIG. 15B differs from the Type 1 converter 100a described previously by the presence of the internal resistor Rm in EM transducer 210'

The transistors and diode are selected based on the stress analyses in Section III-B. The steady-state equivalent circuit 100a" is presented in FIG. 15C, where the load voltage reaches $AE_{m,max}$ for a constant $E_{m,rms}$. The PEI design in this section is specified for EM transducers; however, the converters are adaptable for EAP transducers with alternating output voltages. Unlike the case of EM transducers, a discrete inductor $L_{r1}$ is required in the converter for EAP transducers due to their very low self-inductance.

In one embodiment, and not limited thereto, an 8-mg chip inductor (Coilcraft PFL1609-681), with 680 nH at 0.9 $A_{sat}$, is selected as the resonant inductor $L_{r1}$ (or the self-inductance $L_m$ of an EM transducer) due to its low dc resistance, small footprint, and good EMI performance. The ferrite shield of the inductor keeps the magnetic field within the package, thereby reducing the EMI noises. The same inductor is chosen as $L_{r2}$. A 4.7-nF/50-V ceramic capacitor array (MLCC Array) is used as resonant capacitors $C_{r1}$ and $C_{r2}$ while a 22-μF/10-V ceramic capacitor is selected as the output capacitor $C_B$.

The p-channel enhancement mode MOSFET (AOC2411) with ball-grid-array (BGA) surface-mount package is selected due to its fast transient response and compactness. The transistor has capability of handling drain-to-source breakdown voltage of −30 V and continuous current of 3.4 A. Its 52 mΩ excellent on-resistance (tested at −4.5 $V_{gs}$), due to the advanced trench technology, brings benefits in low conduction losses. The low gate charge and low gate voltage (as low as −2.5 V) cause fast transient response and low driver power dissipation. A 2 mg Schottky barrier diode (CDBER0130 L) with 0503 package is selected as the rectifier diode $D_r$ due to its low forward voltage and small footprint.

B. Open Loop

Type 1 converter waveforms during 2 MHz switching with +3 V dc input voltage are presented in FIGS. 16A, 16B and 17A, 17B. According to the experimental waveforms, the topology provides good ZVS and ZCS characteristics with resonant gate drive at 2 MHz switching frequency. Both transistor and diode achieve ZVS turn-on and ZVS turn-off. In addition, ZCS is achieved during transistor turn-on and diode turn-off. A maximum output voltage of 8.1 V is acquired through a 100Ω resistive load, with 66.3% open-loop dc-dc conversion efficiency.

Figure 18A:
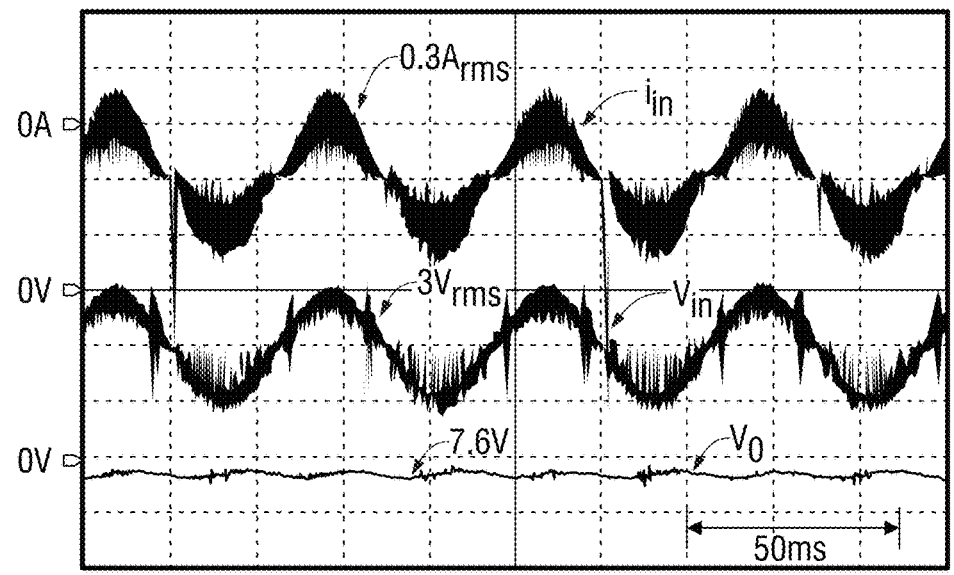
FIG. 18A illustrates open-loop experimental waveforms of the Type 1 converter operating with $V_{in}$=3 $V_{rms}$ (20 Hz, ac), $V_o$=7.6 V (dc), $R_{load}$=100 Ω.
Figure 18B:
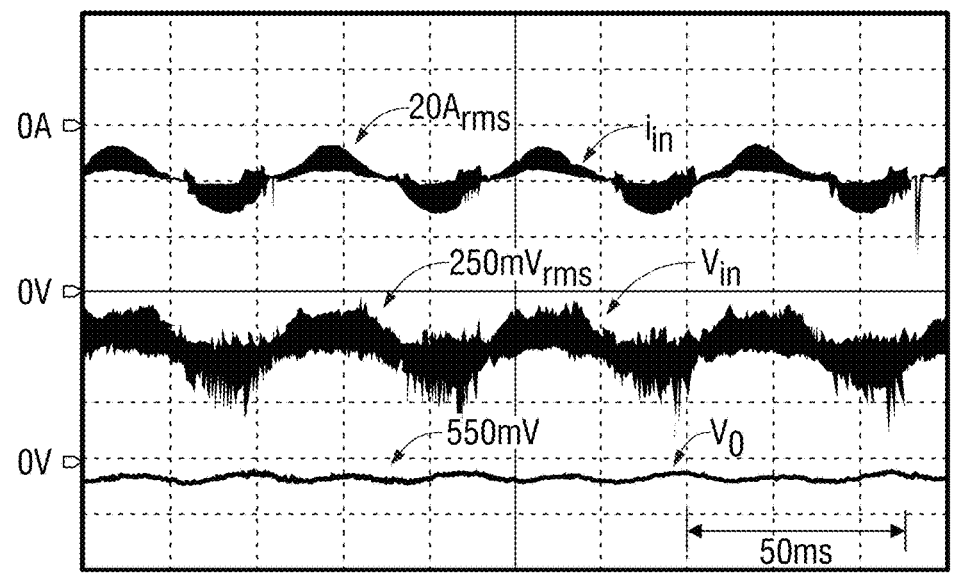
FIG. 18B illustrates open-loop experimental waveforms of the Type 1 converter operating with $V_{in}$=0.25 $V_{rms}$ (20 Hz, ac), $V_o$=0.55 V (dc), $R_{load}$=100Ω, during 2 MHz switching: $i_{in}$, $v_{in}$, and $V_o$.

A power amplifier circuit in conjunction with $L_{r1}$ is utilized to emulate the EM transducer. The open-loop converter waveforms with a 20 Hz alternating input voltage are presented in FIGS. 18A and 18B. The polarity identification module is adopted in the open-loop testing to achieve ac-dc conversion. The 20 Hz frequency corresponding to low mechanical vibration frequency of an EM transducer is selected to investigate the case of ambient energy harvesting. The converter shows good performance on rectification of a wide range of alternating input voltage. The ac-dc conversion efficiency is above 60% under very low input voltages.

C. Closed Loop

Figure 19A:
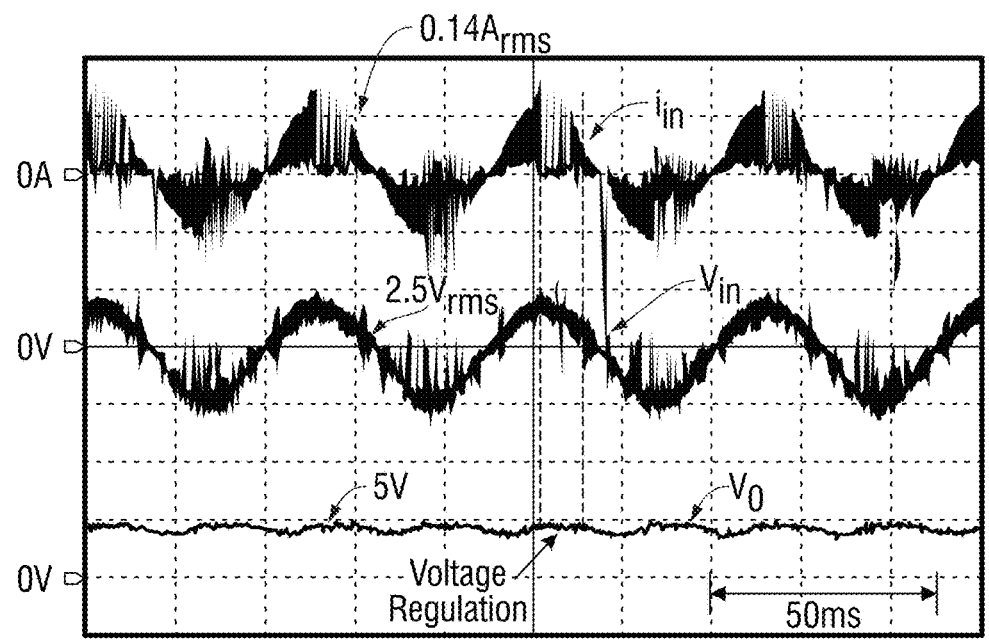
FIG. 19A illustrates closed-loop experimental waveforms of the Type 1 converter operating with voltage regulation for $V_o$=5 V, $R_{load}$=100 Ω.
Figure 19B:
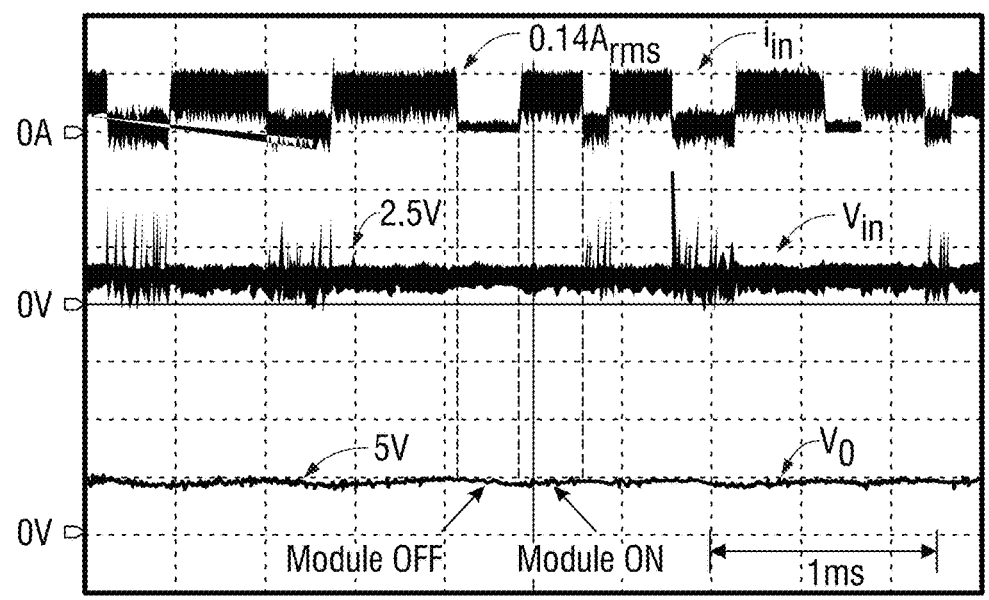
FIG. 19B illustrates closed-loop experimental waveforms of the Type 1 converter operating with module on/off control at 20 kHz modulation frequency.
Figure 20:
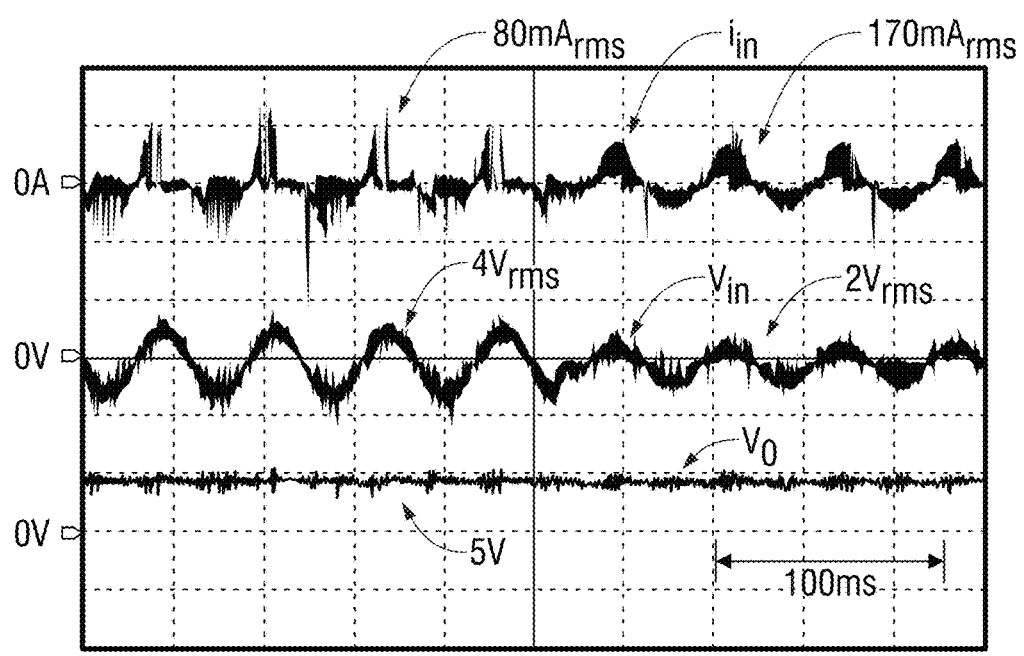
FIG. 20 illustrates the closed-loop dynamic response of the Type 1 converter operating with voltage regulation for $V_o$=5 V, $R_{load}$=100 Ω.

The closed-loop experimental waveforms with output voltage regulation are illustrated in FIGS. 19A and 19B. The output voltage is regulated at 5 V through the module on/off control strategy. When $V_o$ exceeds 5 V, the gate driver pulls the transistor gate to ground and thereby the module is disabled. When $V_o$ is below 5 V, the gate driver returns to the resonant gating condition and the converter starts to transfer energy. Therefore, the input current and power are discontinuous with the module on/off control. The module PWM on/off frequency is set to 20 kHz. The closed-loop voltage regulation indicates a fast dynamic response with an instantaneous step change of input voltage (see FIG. 20).

Figure 21A:
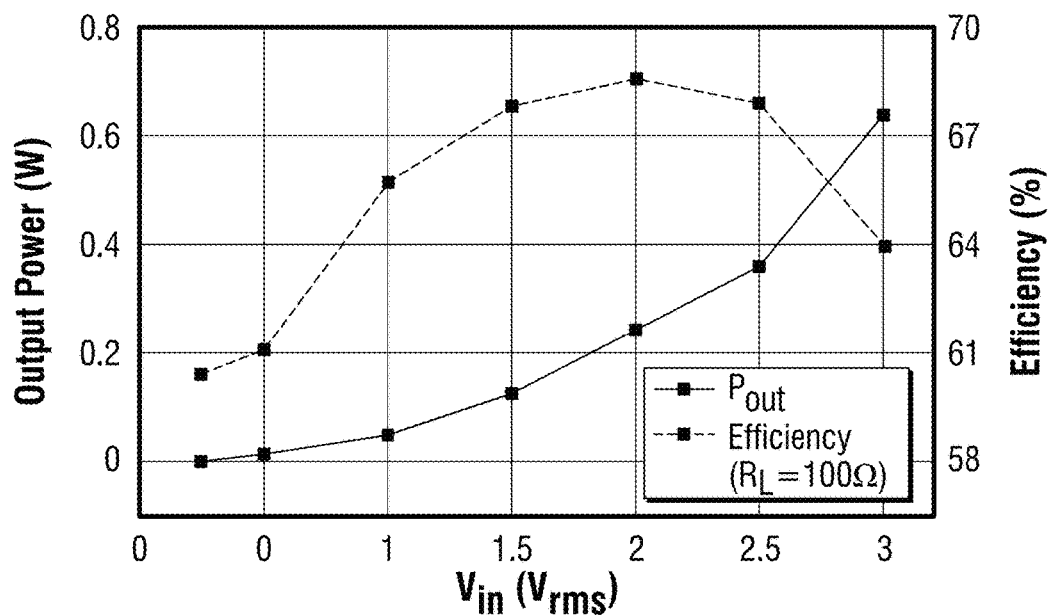
FIG. 21A illustrates the open-loop output power and efficiency over input voltage of the Type 1 converter at $R_{load}$=100 Ω.
Figure 21B:
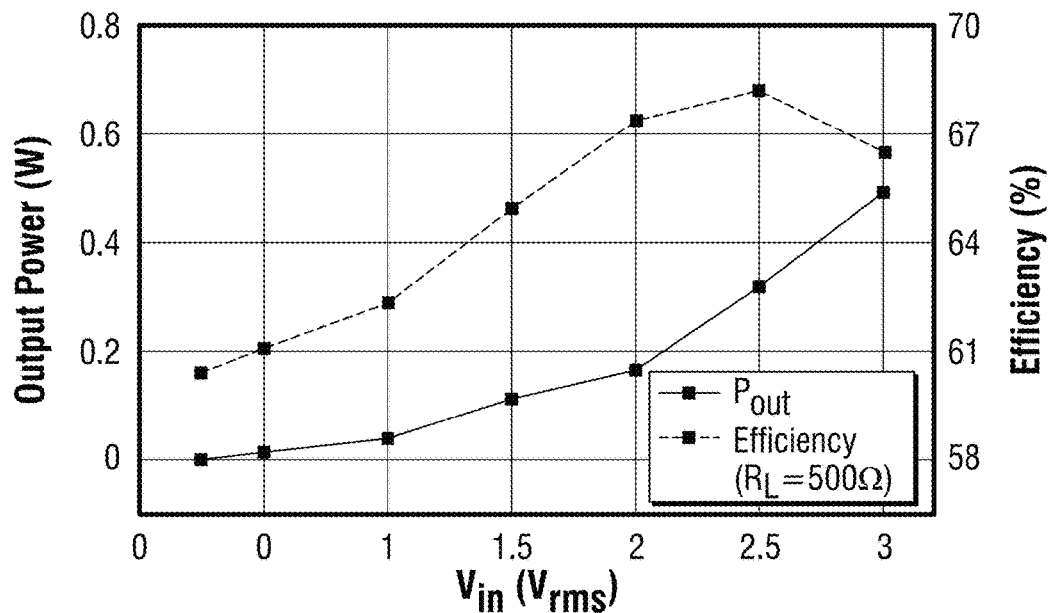
FIG. 21B illustrates the open-loop output power and efficiency over input voltage of the Type 1 converter at $R_{load}$=500 0.

FIGS. 21A and 21B show the open-loop efficiency (including power stage and gate driver) and the output power at different input voltages. The output power is nearly proportional to the square of the input voltage, which thereby matches the steady-state analyses. The conversion efficiency at very-low input voltages is above 60% and increases as the input voltage increases. In the case of very-low alternating input voltages, the converter has a large dead zone where the input voltage is close to zero, and the fundamental resonant component (much higher than the input voltage) is smaller than the forward voltage of the rectifier diode. The rectification of the converter fails at dead zone even though the converter is enabled, which, in turn, degrades the efficiency. On the other hand, the efficiency decreases after the output power exceeds certain value. The conduction losses and inductor core losses increase and become dominant as the current increases. Furthermore, the light-load efficiency is higher than the full-load efficiency at high input voltages, due to the dominant conduction losses and inductor core losses; however, they are close at low input voltages.

Figure 22A:
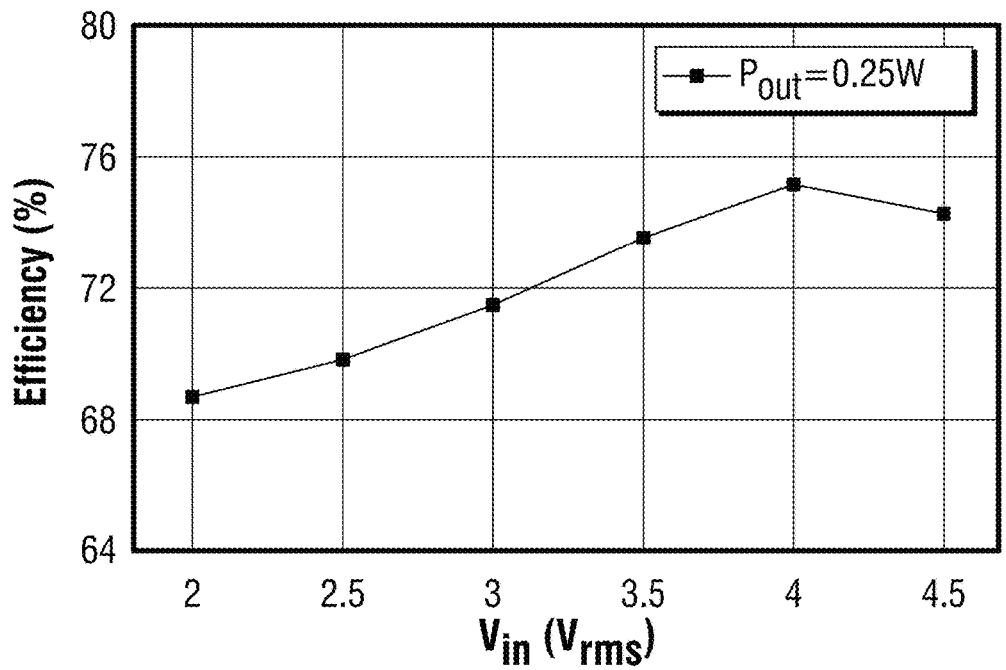
FIG. 22A illustrates closed-loop efficiency versus input voltage (at $P_{out}$=0.25 W)
Figure 22B:
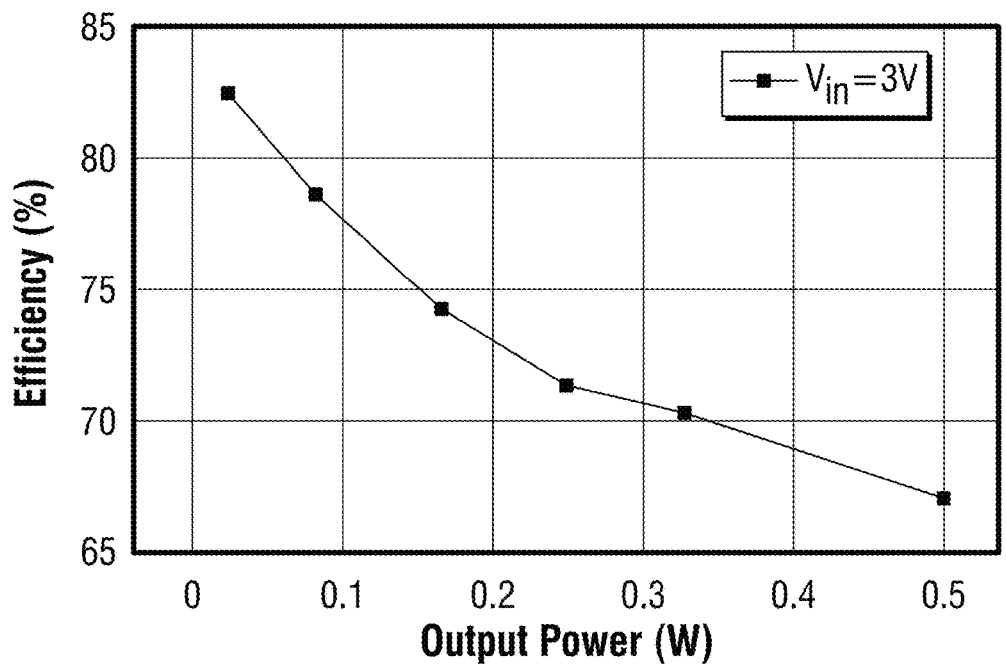
FIG. 22B illustrates closed-loop efficiency versus output power (at $V_{in}$=3 $V_{rms}$)

The closed-loop efficiencies at various input voltages (at $P_{out}$=0.25 W) and output powers (at $V_{in}$=3 $V_{rms}$) are illustrated in FIG. 22. At a constant output power, the average current decreases as the input voltage increases when the converter is enabled. When the converter is disabled, it consumes no power. Therefore, the conduction losses and inductor core losses decrease, which consequently causes higher efficiency in comparison to open loop at the same output power. At a constant input voltage, higher efficiency is acquired at lower output power. The average current decreases as output power decreases, which leads to lower conduction losses and inductor core losses. The efficiency analyses reveal the fact that the conduction losses and inductor core losses dominate over other losses such as switching losses and gating losses. Moreover, the case becomes worse with a smaller size of converter where the conduction resistance is higher and the inductor core is smaller. Despite this, the topology shows promising performance while minimizing the tradeoff between switching losses and miniaturization.

Section VI

Conclusion

The preceding portion of the present disclosure has outlined two bridgeless resonant ac dc step-up/step-down converters suitable for high-frequency operation and low-voltage, low-power ac-dc power conversion. These single-stage topologies provide direct ac-dc power conversion with much fewer number of components, in comparison to other resonant topologies. Both types of converters utilize soft-switched LC networks to convert low-frequency, low-amplitude alternating input voltages into a higher-frequency, higher-amplitude alternating voltage. The higher-frequency alternating signal is then rectified into a dc output voltage through a soft-switched diode. Size miniaturization and high light-load efficiency are achieved through high-frequency soft-switching, resonant gating, and a simple control scheme.

As an example of the embodiments of the present disclosure, the performance of the circuit has been verified through a sample 100-mg, 2-MHz prototype, which converts 3 $V_{rms}$ alternating input voltage into 7.6 V dc output voltage at 650 mW maximum output power. The circuit is designed to acquire high performance and miniature size. In addition to the size miniaturization, the circuit efficiently addresses the low-amplitude voltage rectification with fast transient response. The topology achieves higher than 70% closed-loop efficiency across wide range of input voltages and load conditions. As this paper has elaborated, the topological concept can be adapted into other higher voltage and higher power applications.

Turning now to FIGS. 23A, 23B, 24 and 25, FIG. 23A illustrates a multi-input electromagnet-reed generator (EMR) and diode-bridge DC-DC converter system 20 according to the prior art having at least one or a plurality of or multiple reed inputs 241 . . . 24n that are that are mechanically coupled to receive wind-induced vibrations from a wind cell 22. The reed inputs 241 . . . 24n generate an electrical output 251 . . . 25n from each respective reed input that is each electrically coupled to a diode-bridge D which in turn is electrically coupled to a respective DC-DC converter 261 . . . 26n. Each DC-DC converter 261 . . . 26n is controlled by a dedicated respective controller or processor 281 . . . 28n that is electrically coupled to the electrical output 251 . . . 25n of each reed input 241 . . . 24n. The respective electrical output 271 . . . 27 of each DC-DC converter 261 . . . 26n is each electrically coupled to a load 30.

Figure 23A:
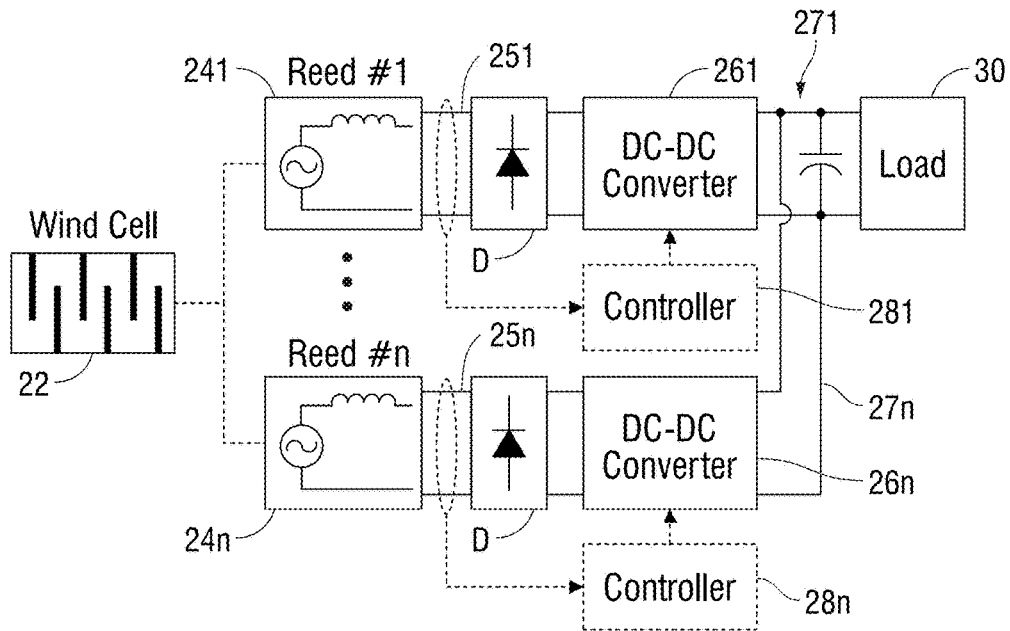
FIG. 23A illustrates multi-channel EMR generators and a conventional PEI system according to the prior art.
Figure 23B:
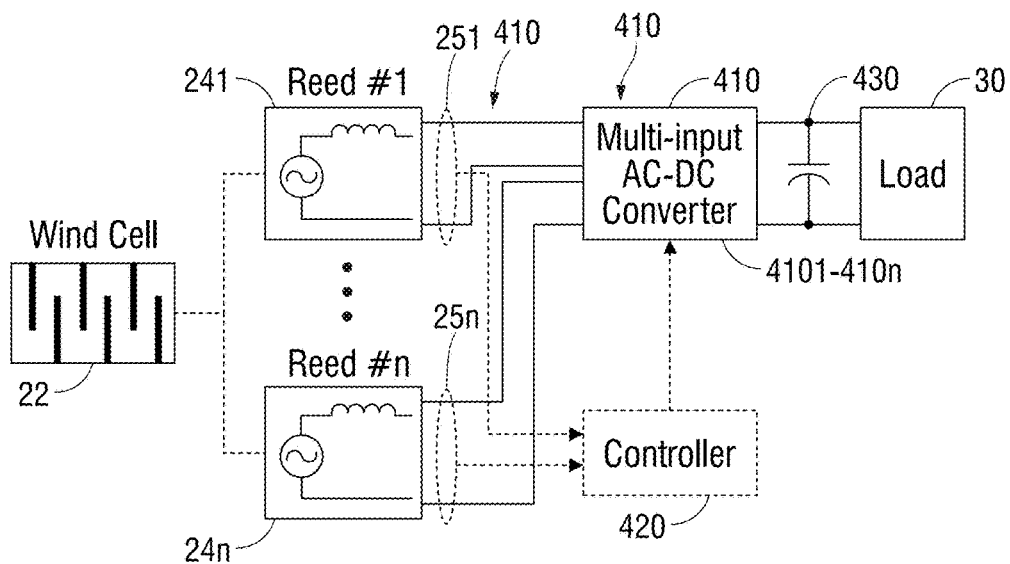
FIG. 23B illustrates multi-channel EMR generators and a multi-input PEI according to embodiments of the present disclosure.

FIG. 23B illustrates a multi-input EMR generator and bridgeless resonant AC-DC converter system 400 for electromagnetic energy harvesting according to one embodiment of the present disclosure which can efficiently convert low-amplitude alternative voltages of multiple EMR generators into a regulated dc output voltage. The topology is capable of interfacing multiple, independent, alternating, input sources without using a diode bridge. Very-low-amplitude voltages can be stepped up to a relatively high voltage. Larger number of input sources result even in higher output voltage. The resonance nature of operation eliminates the switching losses, and allows high frequency switching. It also enables miniaturization through using substantially smaller capacitive and magnetic components. The multi-input converter uses the self-inductance of input sources, and only utilizes one magnetic component and one diode. Furthermore, this topology reduces the voltage stress on power transistors. In summary, the proposed topology has superiorities in terms of: (1) capability of interfacing and conditioning the output power of multiple EMR generators; (2) no need for inefficient diode bridge; (3) small number and value of passive components; (4) high voltage gain at 0.5 switching duty cycle; (5) resonant lossless switching; (6) relatively low stress on transistors; and (7) simple gate drive.

The multi-input bridgeless converter system 400 includes the wind cell 22 that is mechanically coupled to transmit wind-induced vibrations to the plurality of or multiple reed inputs 241 . . . 24n. However, in contrast to DC-DC converter system 20 described above, the electrical output 251 . . . 25n from each respective reed input 241 . . . 24n is directed to a common multi-input bridgeless AC-DC converter 410 that includes internally a plurality of or multiple bridgeless AC-DC converters 4101-410n. The electrical output 251 . . . 25n from each respective reed input 251 . . . 25n is now controlled by a common controller or processor 420 that is electrically coupled to the electrical output 251 . . . 25n of each reed input 241 . . . 24n. The single electrical output 430 of the single, common multi-input bridgeless AC-DC converter 410 is now directed directly to the load 30.

EMR Generator Model

According to the general model of an electromagnetic system, one EMR generator can be modeled as a bipolar time-varying electromotive force (EMF or open-circuit voltage, $v_{emf}$) connected in series with an inner resistance (coil resistance, $r_{EMR}$) and a self-inductance (coil inductance, $L_{EMR}$) [29]. Both the equivalent mechanical and electrical models are presented in FIG. 24. The power electronic interface needs to be designed to achieve (1) rectification, (2) voltage step-up, (3) impedance matching, and (4) high efficiency operation across wide output voltages.

Conventionally, the EMR generators are interfaced with diode bridges for rectification [6]. Due to the rectification, the equivalent open-circuit voltage ($|v_{emf}|$) is equal to the absolute value of electromotive force (EMF). First, since the load is connected in series with the reed, the load root-mean-square (RMS) voltage is lower than RMS value of generator EMF. However, in most of cases, a load voltage higher than EMF is required (i.e. for battery charging). As a result, a switching power converter capable of stepping up the EMF is necessary. Secondly, in order to extract the maximum power from a source, the equivalent input impedance ($Z_{in}$) of the circuit should be set equal to the optimal impedance ($Z_{opt}$) for impedance matching [30]. However, with a wide range of load ($R_L$), it is difficult and impractical to adjust the input impedance to the optimal value by using a diode bridge. A switching power converter should be used to adjust the impedance ($Z_r$) and regulate the input impedance ($Z_{in}$) for optimal impedance matching.

Figure 24:
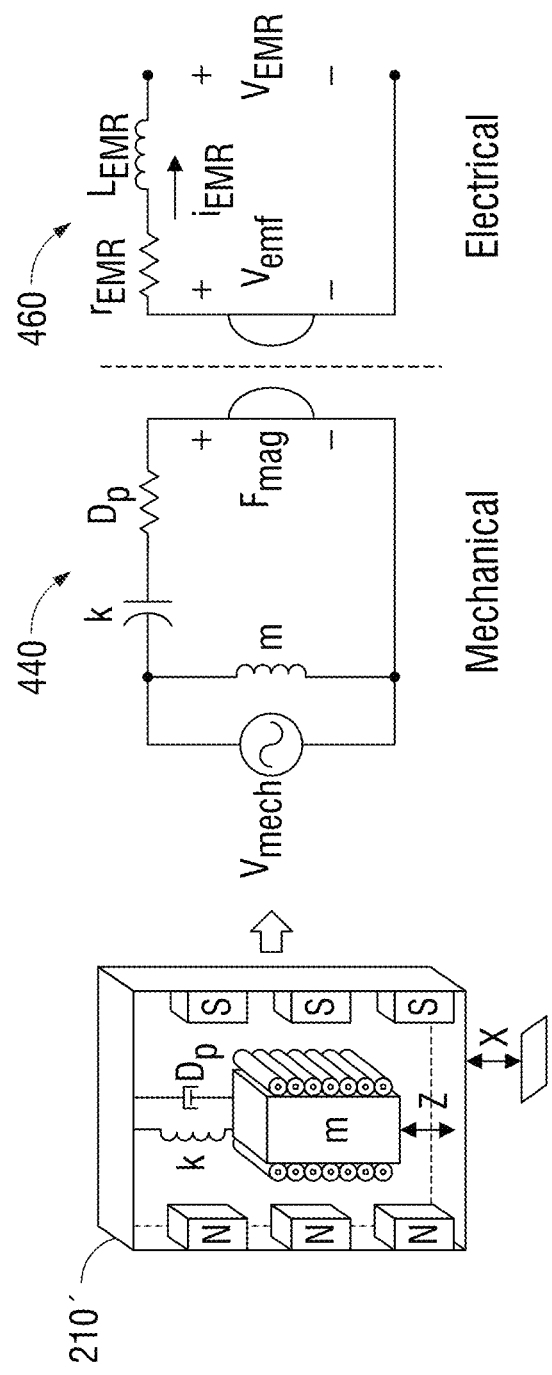
FIG. 24 illustrates an equivalent circuit of one EMR generator ($v_{mech}$: mechanical velocity; m: proof mass; k: spring stiffness; $D_p$: mechanical damping; $F_{mag}$: magnetic force; $v_{emf}$: EMF; $r_{EMR}$: coil resistance; $L_{EMR}$: self-inductance; $i_{EMR}$: reed terminal current; $v_{EMR}$: reed terminal voltage)

More particularly, FIG. 24 illustrates the scheme and both an equivalent electrical circuit of mechanical model 440 of linear transducer 210' described above with respect to FIG. 15 and an electrical model 460 of the permanent magnet (having poles N and S) linear transducer 210' where k is the spring stiffness constant; m is the proof-mass; $D_P$ represents the parasitic damper; $K_E$ denotes the generated voltage coefficient; and ż is the relative movement and X is the displacement of the reed 251 . . . 25n caused by the wind-induced vibration of the mechanical model 440. In the mechanical model 440, Vmechanical represents a voltage input analogous to the wind-induced vibration, the mass m is represented by a resonant inductor, the spring k is represented by a capacitor, the parasitic damper Dp is represented by a resistor and Fmag is analogous to a magnetic force or field that induces a voltage Vemf in the electrical model 460. The induced voltage Vemf creates a current flow $i_{EMR}$ through resistor $r_{EMR}$ and inductor $L_{EMR}$ that are in series in the electrical model 460 to create reed output voltage $V_{EMR}$.

Figure 25:
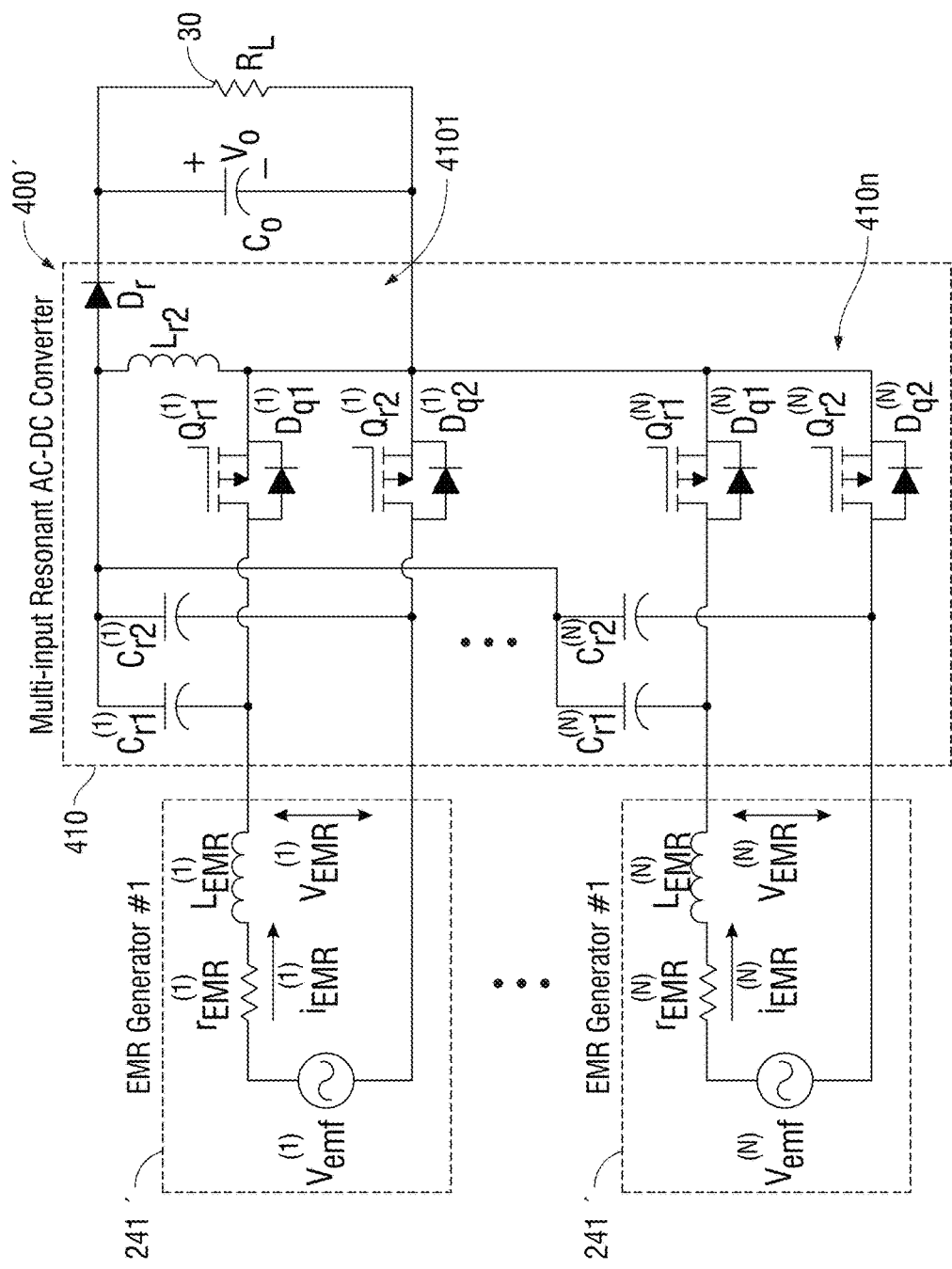
FIG. 25 is a schematic of the multi-input converter of FIGS. 23 and 24 according to embodiments of the present disclosure wherein ($v^{(i)}_{emf}$: EMF of #i reed; $r^{(i)}_{EMR}$: coil resistance; $L^{(i)}_{EMR}$: self-inductance; $i^{(i)}_{EMR}$: reed terminal current; $v^{(i)}_{EMR}$: reed terminal voltage; $C^{(i)}_{rt}=C^{(i)}_{r2}$: resonant capacitors; $L_r$: resonant inductor; $Q^{(i)}_{r1}$, $Q^{(i)}_{r2}$: MOSFETs; $D_r$: output diode; $C_o$: output capacitor).

FIG. 25. is a schematic diagram of the multi-input EMR generator and bridgeless resonant AC-DC converter system 400 described above with respect to FIG. 23B, but designated as multi-input EMR generator and bridgeless resonant AC-DC converter system 400' The multi-input EMR generator and resonant AC-DC converter system 400' is illustrated in FIG. 25 as including a plurality of Type 2 bridgeless resonant AC-DC converters 100b described above with respect to FIG. 2, except that the EMR generator and converter system 400' includes the coil resistance $r_{EMR}$ in series between the voltage input $V_{EMF}$ and the self-inductance $L_{EMR}$. Thus, as opposed to the plurality of or multiple reed inputs designated as 241 . . . 24n in FIG. 23, the plurality of or multiple reed inputs in FIG. 25 are designated as 241' . . . 24n' The EMR generator and converter system 400' also includes $v^{(i)}_{emf}$: EMF of #i reed; $r^{(i)}_{EMR}$: coil resistance; $L^{(i)}_{EMR}$: self-inductance; $i^{(i)}_{EMR}$: reed terminal current; $v^{(i)}_{EMR}$: reed terminal voltage; $C^{(i)}_{r1}=C^{(i)}_{r2}$: resonant capacitors; $L_r$: resonant inductor; $Q^{(i)}_{r1}$, $Q^{(i)}_{r2}$: MOSFETs; $D_r$: output diode; $C_o$: output capacitor.

Thus, the topology is capable of operating with multiple inductive sources. Each inductive source, in this case EMR generators 241 . . . 24n, is numbered with i=1, 2, . . . , N. The first multi-input circuit 4101 is formed by one resonant inductor Lr, one diode Dr and multiple MOSFET-capacitor bridges. Each input source 241' . . . 24n' is connected to two MOSFET-capacitor bridges ($Q^{(i)}_{r1}$, $C^{(i)}_{r1}$ and $Q^{(i)}_{r2}$, $C^{(i)}_{r2}$), which share the resonant inductor Lr and the diode Dr. Thus, the inputs from 242' . . . 24n' connect directly to the single inductor Lr and single diode Dr.

The resonant inductor ($L_r$) is tuned with resonant capacitors ($C^{(i)}_{r1}$ and $C^{(i)}_{r2}$) to resonate at the resonant frequency ($f_r$) near the switching frequency ($f_s$). Ideally, the resonant components ($L_r$, $C^{(i)}_{r1}$ and $C^{(i)}_{r2}$) present a lossless low drain-to-source impedance branch across MOSFETs near $f_s$. The LC network amplifies the EMF. $C^{(i)}_{r1}$ and $C^{(i)}_{r2}$ are in parallel with MOSFETs and the diode Dr to ensure ZVS at turning-on and turning-off. Switching losses are eliminated through the oscillating voltage and current, while the input energy is stored and released to the load 30 through the active LC network. Furthermore, the tuned networks eliminate overvoltage spikes as well as diode reverse recovery issues while simultaneously maintaining low peak voltage stresses on MOSFETs.

MOSFETs ($Q^{(i)}_{r1}$ and $Q^{(i)}_{r2}$) are actively turned on and off with duty cycle close to 0.5 in order to generate drain-to-source pulse voltage ($v^{(i)}_{ds1}$ and $v^{(i)}_{ds2}$) at the input of LC network. The amplitude of drain-to-source pulse voltage is higher than $v_{emf}$ due to the energy stored in $L^{(i)}_{EMR}$. The fundamental component of $v^{(i)}_{ds1}$ and $v^{(i)}_{ds2}$ pass through the LC network and generate an amplified oscillating voltage near $f_s$ across the rectifier diode $D_r$. ZVS and ZCS operation of $Q^{(i)}_{r1}$ and $Q^{(i)}_{r2}$ provide energy recovery to drain-to-source MOSFET parasitic capacitor ($C_{ds}$), which in turn increases the efficiency. The drain-to-source overvoltage spike is eliminated; thereby no snubber circuit is required. The output diode ($D_r$) rectifies the amplified oscillating voltage after the tuned network into a dc output voltage. It generates a freewheeling path for the resonant inductor current as well as a charging path for the resonant capacitors.

The foregoing multi-input EMR generator and bridgeless resonant AC-DC converter systems 400 and 400' are described in "A Multi-Input Bridgeless Resonant AC-DC Converter for Electromagnetic Energy Harvesting", by Y. Tang and A. Khaligh, IEEE Transactions on Power Electronics Volume PP, Issue 99, p. 1-9, 27 Apr. 2015, the entire content of which is incorporated by reference herein.

Additionally, the entire content of "Miniaturized Bridgeless High-Frequency Resonant AC-DC Step-Up/Step-Down Converters", by Y. Tang and A. Khaligh, IEEE Transactions on Power Electronics (Volume 29, Issue 12) p. 6518-6533, December 2014, is incorporated by reference herein.

While several embodiments and methodologies of the present disclosure have been described and shown in the drawings, it is not intended that the present disclosure be limited thereto, as it is intended that the present disclosure be as broad in scope as the art will allow and that the specification be read likewise. Therefore, the above description should not be construed as limiting, but merely as exemplifications of particular embodiments and methodologies. Those skilled in the art will envision other modifications within the scope of the claims appended hereto.

REFERENCES

The entire content of each of the following references is incorporated by reference herein.

1. A. Khaligh, P. Zeng and C. Zheng
"Kinetic energy harvesting using piezoelectric and electromagnetic technologies—State of the art" *IEEE Trans. Ind. Electron.*, vol. 57, no. 3, pp. 850-860, 2010
2. G. D. Szarka, B. H. Stark and S. G. Burrow
"Review of power conditioning for kinetic energy harvesting systems"
*IEEE Trans. Power Electron.*, vol. 27, no. 2, pp. 803-815, 2012
3. G. K. Ottman, H. F. Hofmann, A. C. Bhatt and G. A. Lesieutre
"Adaptive piezoelectric energy harvesting circuit for wireless remote power supply"
*IEEE Trans. Power Electron.*, vol. 17, no. 5, pp. 669-676, 2002
4. B. H. Stark, P. D. Mitcheson, P. Miao, T. C. Green, E. M. Yeatman and A. S. Holmes
"Converter circuit design, semiconductor device selection and analysis of parasitics for micro-power electrostatic generators"

IEEE Trans. Power Electron., vol. 21, no. 1, pp. 27-37, 2006

5. M. Karpelson, J. P. Whitney, G. Wei and R. J. Wood
"Design and fabrication of ultralight high-voltage power circuits for flapping-wing robotic insects" Proc. IEEE Appl. Power Electron. Conf., pp. 2070-2077, 2011

6. H. Wang, Y. Tang and A. Khaligh
"A bridgeless boost rectifier for low voltage energy harvesting applications" IEEE Trans. Power Electron., vol. 28, no. 11, pp. 5206-5214, 2013

7. S. Dwari and L. Parsa
"An efficient ac-dc step-up converter for low-voltage energy harvesting"
IEEE Trans. Power Electron., vol. 25, no. 8, pp. 2188-2199, 2010

8. A. A. Fardoun, E. H. Ismail, A. J. Sabzali and M. A. Al-Saffar
"New efficient bridgeless Cuk rectifiers for PFC applications"
IEEE Trans. Power Electron., vol. 27, no. 7, pp. 3292-3301, 2012

9. J. Kassakian, M. Schlecht and G. Verghese
Principles of Power Electron
1991, Addison-Wesley 10. F. C. Lee
"High-frequency quasi-resonant converter technologies"
Proc. IEEE Conf., vol. 76, no. 4, pp. 377-390, 1988

11. W. Tabisz and F. C. Lee
"Zero-voltage-switching multiresonant technique—A novel approach to improve performance of high-frequency quasiresonant converters"
IEEE Trans. Power Electron., vol. 4, no. 4, pp. 450-458, 1989

12. W. Tabisz and F. C. Lee
"Principles of quasi- and multi-resonant power conversion techniques"
Proc. IEEE Intel. Sym. Circuits Syst., vol. 2, pp. 1053-1056, 1991

13. J. Sebastian, J. A. Martinez, J. M. Alonso and J. A. Cobos
"Voltage-follower control in zero-current-switched quasi-resonant power factor preregulators"
IEEE Trans. Power Electron., vol. 13, no. 4, pp. 727-738, 1998

14. N. Mohan, T. M. Undeland and W. P. Robbins
Power Electronics: Converters, Applications, and Design
1995, Wiley 15. H. Bodur and A. F. Bakan
"A new ZVT-PWM dc-dc converter"
IEEE Trans. Power Electron., vol. 17, no. 1, pp. 40-47, 2002

16. I. Aksoy, H. Bodur and A. F. Bakan
"A new ZVT-ZCT-PWM dc-dc converter"
IEEE Trans. Power Electron., vol. 25, no. 8, pp. 2093-2105, 2010

17. R. Redl, B. Molnar and N. Sokal
"Class E resonant regulated dc/dc power converters: analysis of operations and experimental results at 1.5 MHz"
IEEE Trans. Power Electron., vol. PE-1, no. 2, pp. 111-120, 1986

18. B. Tomescu
"A unified approach to class E versus quasi-resonant switch topologies"
IEEE Trans. Circuits Syst. II: Analog Digit. Signal Process., vol. 45, no. 6, pp. 763-766, 1998

19. J. Hu, A. D. Sagneri, J. M. Rivas, Y. Han, S. M. Davis and D. J. Perreault "High-frequency resonant SEPIC converter with wide input and output voltage ranges"
IEEE Trans. Power Electron., vol. 27, no. 1, pp. 189-200, 2012

20. R. C. N. Pilawa-Podgurski, A. D. Sagneri, J. M. Rivas, D. I. Anderson and D. J. Perreault
"Very-high-frequency resonant boost converters"
IEEE Trans. Power Electron., vol. 24, no. 6, pp. 1654-1665, 2009

21. J. M. Rivas, R. S. Wahby, J. S. Shafran and D. J. Perreault
"New architectures for radio-frequency dc-dc power conversion"
IEEE Trans. Power Electron., vol. 21, no. 2, pp. 380-392, 2006

22. K. Yao and F. C. Lee
"A novel resonant gate driver for high frequency synchronous buck converters"
IEEE Trans. Power Electron., vol. 17, no. 2, pp. 180-186, 2002

23. Y. Chen, F. C. Lee, L. Amoroso and H. Wu
"A resonant MOSFET gate driver with efficient energy recovery"
IEEE Trans. Power Electron., vol. 19, no. 2, pp. 470-477, 2004

24. N. Z. Yahaya, K. M. Begam and M. Awan
"A review on design considerations & limitations of resonant gate drive circuit in VHF operations"
Eng. Lett., vol. 17, no. 2, pp. 54-62, 2009

25. J. T. Strydom, M. A. de Rooji and J. D. van Wyk
"A comparison of fundamental gate-driver topologies for high frequency applications"
Proc. IEEE Appl. Power Electron. Conf. Expo., pp. 1045-1052, 2004

26. Z. Yang, S. Ye and Y. Liu
"A new resonant gate drive circuit for synchronous buck converter"
IEEE Trans. Power Electron., vol. 22, no. 4, pp. 1311-1320, 2007

27. Y. Lee and Y. Cheng
"A 580 kHz switching regulator using on-off control"
J. Inst. Electron. Radio Eng., vol. 57, no. 5, pp. 221-226, 1987

28. B. Song, X. Yang and Y. He
"Class $\phi2$ dc-dc converter with PWM on-off control"
Proc. IEEE 8th Intel. Conf. Power Electron. ECCE Asia, pp. 2792-2796, 2011

29. "S. J. Roundy, "Energy Scavenging for wireless sensor nodes with a focus on vibration to electricity conversion," Ph.D. dissertation, Dept. Mech. Eng., Univ. of California, Berkeley, Calif., USA, 2003.

30. M. El-hami, P. Glynne-Jones, N. M. White, M. Hill, S. Beeby, E. James, A. D. Brown and J. N. Ross
"Design and fabrication of a new vibration-based electromechanical power generator"
Sensors Actuators A: Phys., vol. 92, no. 1-3, pp. 335-342, 2001

31. S. P. Beeby, R. N. Torah, M. J. Tudor, P. Glynne-Jones, T. O'Donnell, C. R. Saha and S. Roy
"A micro electromagnetic generator for vibration energy harvesting"
J. Micromech. Microeng., vol. 17, no. 7, pp. 1257-1265, 2007

32. L. C. Rome, L. Flynn and T. D. Yoo
"Generating electricity while walking with loads"
Science, vol. 309, no. 5741, pp. 1725-1728, 2005

33. Z. Yang, Y. Tang, P. Zeng and A. Khaligh
"Reducing detent force while harvesting energy from center of gravity: an 11-poles, 12-slots generator design"

*Proc. IEEE Energy Convers. Congr. Expo.*, pp. 380-387, 2012

34. S. Cheng, N. Wang and D. P. Arnold
"Modeling of magnetic vibrational energy harvesters using equivalent circuit representations"
*J. Micromech. Microeng.*, vol. 17, no. 11, pp. 2328-2335, 2007

What is claimed is:

1. A control system for an AC-to-DC converter comprising:
   at least two resonant gate drivers that each includes:
   one MOSFET gate configured to transmit a gate voltage signal to an AC-to-DC converter;
   an on/off logic module electrically coupled to the MOSFET gate;
   a resonant tank LC circuit electrically coupled to the on/off logic module; and
   a voltage bias module electrically coupled to the resonant tank LC circuit,
   the on/off logic module including:
   a first bipolar junction transistor and
   a second bipolar junction transistor,
   the first bipolar junction transistor configured to receive a voltage on/off input signal from a pulse-width modulation circuit,
   the second bipolar junction transistor configured to receive a polarity identification voltage input,
   the first bipolar junction transistor electrically coupled to a common bus between the first bipolar junction transistor and the second bipolar junction transistor and the MOSFET gate.

2. The control system according to claim 1,
   further comprising
   an oscillator generating a gate voltage input to the resonant gate driver and
   a pulse width modulation module electrically coupled to a load, the pulse width modulation module generating a voltage on/off input to the resonant gate driver.

3. The control system according to claim 2, wherein the resonant gate driver is electrically coupled to an AC/DC converter to transmit at least a first and second voltage signal to an AC-DC converter.

4. The control system according to claim 3, further comprising a voltage comparator electrically coupled to a voltage input to the AC-DC converter, the voltage comparator electrically coupled to the resonant gate driver to transmit a polarity identification voltage input.

5. The control system according to claim 3, wherein the AC-DC converter is a bridgeless resonant AC/DC converter.

6. An AC-to-DC converter comprising:
   a multi-model, multi-resonant switching circuit including:
   an input inductor and an output inductor in electrical communication to deliver current that varies linearly within a switching cycle, and first, second and third LC resonant networks in electrical communication with one another to convert a source-frequency low-amplitude alternating input voltage into a switching-frequency higher-amplitude alternating voltage,
   wherein the AC-DC converter is configured to electrically couple to an AC voltage source having a first feed in electrical communication with the input inductor, the input inductor in parallel electrical communication with a first resonant capacitor and a second resonant capacitor,
   wherein the input inductor in parallel electrical communication with the first resonant capacitor and the second resonant capacitor is further in parallel communication with a first MOSFET and an output diode, the first MOSFET in parallel with a first body diode having an anode and a cathode and the output diode in parallel with the first resonant capacitor, the anode of the first body diode of the first MOSFET in series communication with the input inductor,
   and wherein the AC voltage source has a second feed in electrical communication with the second resonant capacitor and a second MOSFET, the second MOSFET in parallel with a second body diode having an anode and cathode and the second resonant capacitor in parallel electrical communication with the output inductor, a dc capacitor and a resistive load, the anode of the second body diode of the second MOSFET in series communication with the AC voltage source.

7. The AC-to-DC converter according to claim 6,
   wherein the AC voltage source is in parallel electrical communication with the input inductor, the first MOSFET and the second MOSFET, generating a charge current varying linearly within a switching cycle through the input inductor.

8. The AC-to-DC converter according to claim 7,
   wherein the dc capacitor is in parallel electrical communication with the output inductor and the output diode, generating a discharge current varying linearly within a switching cycle through the output inductor.

9. The AC-to-DC converter according to claim 8,
   wherein the output inductor is in parallel with the dc capacitor, the first MOSFET, the first resonant capacitor, the second MOSFET and the second resonant capacitor, forming the first LC network to convert a source-frequency low-amplitude alternating input voltage into a switching-frequency higher-amplitude alternating voltage.

10. The AC-to-DC converter according to claim 9,
    wherein the input inductor is in parallel with the first MOSFET, the output diode and the second resonant capacitor, forming the second LC network to convert a source-frequency low-amplitude alternating input voltage into a switching-frequency higher-amplitude alternating voltage.

11. The AC-to-DC converter according to claim 10,
    wherein the input inductor is in parallel with the first MOSFET, the dc capacitor, the output inductor, the first resonant capacitor and the second resonant capacitor, forming the third LC network to convert a source-frequency low-amplitude alternating input voltage into a switching-frequency higher-amplitude alternating voltage.

12. The AC-to-DC converter according to claim 11,
    wherein the first LC network, the second LC network and the third LC network generate switching-frequency alternating voltage and current, yielding zero voltage across the first MOSFET and the second MOSFET and zero current through the first MOSFET and the second MOSFET when turned on and zero voltage across the first MOSFET and the second MOSFET when turned off.

13. The AC-to-DC converter according to claim 12,
    wherein the first LC network, the second LC network and the third LC network generate switching-frequency alternating voltage and current, yielding zero voltage across the output diode when turned on and zero voltage across the output diode and zero current through the output diode when turned off.

14. The AC-to-DC converter according to claim 13,
wherein an output-to-input dc voltage conversion ratio is dependent on a quality factor determined as the characteristic impedance of the first LC network over the output load, and a normalized switching frequency determined as the switching frequency over the resonant frequency of the first LC network and wherein the dc voltage conversion ratio increases as either quality factor decreases or normalized switching frequency decreases.

15. The AC-to-DC converter according to claim 14,
wherein voltage stresses on the first MOSFET and the second MOSFET equal to the output voltage, and the maximum voltages of the first resonant capacitor and the second resonant capacitor are less than twice the output voltage and decrease as the switching frequency decreases.

16. An AC-to-DC converter comprising,
a multi-model, multi-resonant switching circuit including,
an input inductor and an output inductor in electrical communication to deliver current that varies linearly within a switching cycle, and first, second and third LC resonant networks in electrical communication with one another to convert a source-frequency low-amplitude alternating input voltage into a switching-frequency higher-amplitude alternating voltage,
wherein the AC-DC converter is configured to electrically couple to an AC voltage source having a first feed in electrical communication with the input inductor, the input inductor in parallel electrical communication with a first resonant capacitor and a second resonant capacitor,
and wherein the input inductor in parallel electrical communication with the first resonant capacitor and the second resonant capacitor is further in parallel communication with a first MOSFET and an output inductor, the first MOSFET in parallel with a first body diode having an anode and a cathode and the output inductor in parallel with the first resonant capacitor, the cathode of the first body diode of the first MOSFET in series communication with the input inductor,
and wherein the AC voltage source has a second feed in electrical communication with the second resonant capacitor and a second MOSFET, the second MOSFET in parallel with a second body diode having an anode and a cathode and the second resonant capacitor in parallel electrical communication with the output diode, a dc capacitor and a resistive load, the cathode of the second body diode of the second MOSFET in series communication with the AC voltage source.

17. The AC-to-DC converter according to claim 16,
wherein the AC voltage source is in parallel electrical communication with the input inductor, the first MOSFET and the second MOSFET, generating a charge current varying linearly within a switching cycle through the input inductor.

18. The AC-to-DC converter according to claim 17,
wherein the dc capacitor is in parallel electrical communication with the output inductor and the output diode, generating a discharge current varying linearly within a switching cycle through the output inductor.

19. The AC-to-DC converter according to claim 18,
wherein the output inductor is in parallel with the first MOSFET, the first resonant capacitor, the second MOSFET and the second resonant capacitor, forming the first LC network to convert a source-frequency low-amplitude alternating input voltage into a switching-frequency higher-amplitude alternating voltage.

20. The AC-to-DC converter according to claim 19,
wherein the input inductor is in parallel with the second MOSFET, the dc capacitor, the output diode and the first resonant capacitor, forming the second LC network to convert a source-frequency low-amplitude alternating input voltage into a switching-frequency higher-amplitude alternating voltage.

21. The AC-to-DC converter according to claim 20,
wherein the input inductor is in parallel with the second MOSFET, the output inductor, the first resonant capacitor and the second resonant capacitor, forming the third LC network to convert a source-frequency low-amplitude alternating input voltage into a switching-frequency higher-amplitude alternating voltage.

22. The AC-to-DC converter according to claim 21,
wherein the first LC network, the second LC network and the third LC network generate switching-frequency alternating voltage and current, yielding zero voltage across the first MOSFET and the second MOSFET and zero current through the first MOSFET and the second MOSFET when turned on and zero voltage across the first MOSFET and the second MOSFET when turned off.

23. The AC-to-DC converter according to claim 22,
wherein the first LC network, the second LC network and the third LC network generate switching-frequency alternating voltage and current, yielding zero voltage across the output diode when turned on and zero voltage across the output diode and zero current through the output diode when turned off.

24. The AC-to-DC converter according to claim 23,
wherein the output-to-input dc voltage conversion ratio is dependent on a quality factor determined as the characteristic impedance of the first LC network over the output load, and a normalized switching frequency determined as the switching frequency over the resonant frequency of the first LC network and wherein the dc voltage conversion ratio increases as either quality factor decreases or normalized switching frequency decreases.

25. The AC-to-DC converter according to claim 24,
wherein the voltage stresses on the first MOSFET and the second MOSFET equal to the output voltage, and the maximum voltages of the first resonant capacitor and the second resonant capacitor are less than output voltage and decrease as the switching frequency decreases.

* * * * *